United States Patent
Park et al.

(10) Patent No.: US 12,388,108 B2
(45) Date of Patent: *Aug. 12, 2025

(54) ELECTRODE ASSEMBLY, CYLINDRICAL BATTERY, AND BATTERY PACK AND VEHICLE INCLUDING THE SAME

(71) Applicant: LG ENERGY SOLUTION, LTD., Seoul (KR)

(72) Inventors: Jong-Sik Park, Daejeon (KR); Kwan-Hee Lee, Daejeon (KR); Myung-An Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/289,711

(22) PCT Filed: Oct. 21, 2022

(86) PCT No.: PCT/KR2022/016195
§ 371 (c)(1),
(2) Date: Nov. 6, 2023

(87) PCT Pub. No.: WO2023/068885
PCT Pub. Date: Apr. 27, 2023

(65) Prior Publication Data
US 2024/0258553 A1      Aug. 1, 2024

(30) Foreign Application Priority Data
Oct. 22, 2021   (KR) .................. 10-2021-0142192

(51) Int. Cl.
*H01M 10/14*   (2006.01)
*H01M 4/131*   (2010.01)
(Continued)

(52) U.S. Cl.
CPC ....... *H01M 10/0431* (2013.01); *H01M 4/131* (2013.01); *H01M 4/525* (2013.01);
(Continued)

(58) Field of Classification Search
None
See application file for complete search history.

(56) References Cited

U.S. PATENT DOCUMENTS

| 6,284,408 B1 | 9/2001 | Akazawa et al. |
| 7,955,736 B2 | 6/2011 | Cheon et al. |

(Continued)

FOREIGN PATENT DOCUMENTS

| CN | 109065839 A | 12/2018 |
| CN | 113113738 A | 7/2021 |

(Continued)

OTHER PUBLICATIONS

English translation of KR 10-2020/0041625 (Year: 2020).*
International Search Report for PCT/KR2022/016195 (PCT/ISA/210) mailed on Feb. 1, 2023.

*Primary Examiner* — Yoshitoshi Takeuchi
(74) *Attorney, Agent, or Firm* — Birch, Stewart, Kolasch & Birch, LLP

(57) ABSTRACT

An electrode assembly having a first electrode, a second electrode, and a separator interposed therebetween are wound, and the first electrode includes an insulation layer that covers a boundary of an uncoated portion and a coated portion along a winding direction of the electrode assembly. A plurality of segments are bent along a radial direction of the electrode assembly to define a bent surface. When a line parallel with the winding direction and passing through a point corresponding to a segment having a smallest height in the region of the uncoated portion of the first electrode is a datum line and the segment with the smallest height among the segments defining the bent surface is a minimum seg- (Continued)

ment, a separation distance between an end of the separator and the datum line along the winding axis is 30% or less of the smallest height of the minimum segment.

27 Claims, 56 Drawing Sheets

(51) Int. Cl.
- *H01M 4/525* (2010.01)
- *H01M 4/62* (2006.01)
- *H01M 10/04* (2006.01)
- *H01M 50/107* (2021.01)
- *H01M 50/213* (2021.01)
- *H01M 50/531* (2021.01)
- *H01M 50/533* (2021.01)
- *H01M 50/538* (2021.01)
- *H01M 4/02* (2006.01)

(52) U.S. Cl.
CPC ......... *H01M 4/625* (2013.01); *H01M 50/107* (2021.01); *H01M 50/213* (2021.01); *H01M 2004/021* (2013.01)

(56) References Cited

U.S. PATENT DOCUMENTS

| | | | |
|---|---|---|---|
| 2005/0287428 A1* | 12/2005 | Cheon | H01M 50/528 429/211 |
| 2005/0287432 A1* | 12/2005 | Cheon | H01M 10/0431 429/211 |
| 2013/0244071 A1 | 9/2013 | Lee et al. | |
| 2015/0147624 A1 | 5/2015 | Yamafuku et al. | |
| 2020/0274150 A1 | 8/2020 | Katayama et al. | |
| 2021/0344033 A1* | 11/2021 | Park | H01M 50/152 |
| 2022/0149443 A1 | 5/2022 | Otani | |
| 2022/0271405 A1* | 8/2022 | Min | H01M 50/183 |
| 2023/0117276 A1* | 4/2023 | Lee | H01M 50/531 429/94 |
| 2023/0117468 A1* | 4/2023 | Lee | C01G 53/50 429/164 |
| 2023/0121815 A1* | 4/2023 | Kim | H01M 4/131 429/209 |
| 2023/0170533 A1* | 6/2023 | Chung | H01M 10/0431 429/163 |
| 2023/0246302 A1* | 8/2023 | Jo | H01M 50/474 429/94 |
| 2024/0006721 A1* | 1/2024 | Jo | H01M 50/477 |
| 2024/0006722 A1* | 1/2024 | Lee | H01M 10/0587 |
| 2024/0055738 A1* | 2/2024 | Min | H01M 50/193 |
| 2024/0079633 A1* | 3/2024 | Lee | H01M 10/0587 |
| 2024/0088425 A1* | 3/2024 | Lee | H01M 50/186 |
| 2024/0105957 A1* | 3/2024 | Park | H01M 4/505 |
| 2024/0128590 A1* | 4/2024 | Min | H01M 50/474 |
| 2024/0128597 A1* | 4/2024 | Hwangbo | H01M 50/152 |
| 2024/0128605 A1* | 4/2024 | Kim | H01M 50/167 |
| 2024/0128608 A1* | 4/2024 | Kang | H01M 50/56 |
| 2024/0136664 A1* | 4/2024 | Jo | H01M 50/567 |
| 2024/0145783 A1* | 5/2024 | Lee | H01M 50/538 |
| 2024/0195025 A1* | 6/2024 | Hwangbo | H01M 10/0431 |
| 2024/0195026 A1* | 6/2024 | Choi | H01M 50/249 |
| 2024/0204260 A1* | 6/2024 | Lim | H01M 50/533 |
| 2024/0234974 A1* | 7/2024 | Kim | H01M 50/188 |
| 2024/0243393 A1* | 7/2024 | Lee | H01M 50/586 |
| 2024/0258553 A1* | 8/2024 | Park | H01M 10/0587 |
| 2024/0258664 A1* | 8/2024 | Choi | H01M 50/586 |
| 2024/0266693 A1* | 8/2024 | Won | H01M 50/193 |
| 2024/0266700 A1* | 8/2024 | Lee | H01M 50/186 |
| 2024/0274995 A1* | 8/2024 | Lee | H01M 50/107 |
| 2024/0313364 A1* | 9/2024 | Lee | H01M 10/0587 |
| 2024/0313368 A1* | 9/2024 | Kwon | H01M 50/131 |
| 2024/0322316 A1* | 9/2024 | Oh | H01M 50/179 |
| 2024/0387833 A1* | 11/2024 | Lee | H01M 50/107 |
| 2024/0396168 A1* | 11/2024 | Woo | H01M 50/446 |
| 2024/0405251 A1* | 12/2024 | Park | H01M 50/249 |
| 2024/0410953 A1* | 12/2024 | Kwon | H01M 50/578 |
| 2024/0421359 A1* | 12/2024 | Kim | H01M 10/052 |

FOREIGN PATENT DOCUMENTS

| | | | |
|---|---|---|---|
| JP | 11-329398 A | 11/1999 | |
| JP | 2000-21435 A | 1/2000 | |
| JP | 2001-28274 A | 1/2001 | |
| JP | 2001-93579 A | 4/2001 | |
| JP | 2004-95487 A | 3/2004 | |
| JP | 2006-147392 A | 6/2006 | |
| JP | 2010-61877 A | 3/2010 | |
| JP | 2011-216403 A | 10/2011 | |
| JP | 2020-136117 A | 8/2020 | |
| JP | 2021-163556 A | 10/2021 | |
| KR | 10-2004-0042373 A | 5/2004 | |
| KR | 10-2005-0121904 A | 12/2005 | |
| KR | 10-2005-0121914 A | 12/2005 | |
| KR | 10-2009-0082561 A | 7/2009 | |
| KR | 10-2016-0009406 A | 1/2016 | |
| KR | 10-2020/0041625 * | 4/2020 | ............ H01M 10/04 |
| KR | 10-2020-0041625 A | 4/2020 | |
| WO | WO 2021/020277 A1 | 2/2021 | |

\* cited by examiner

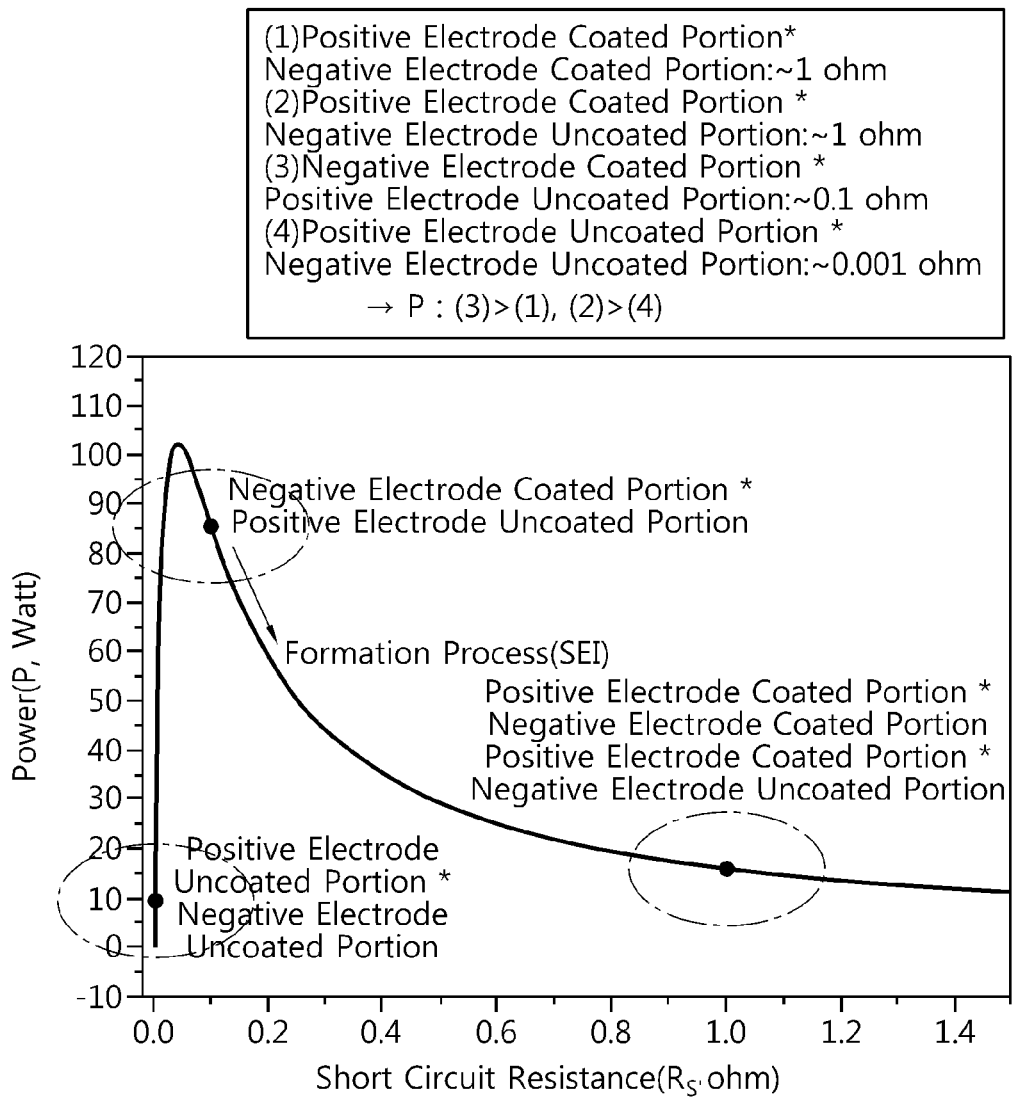

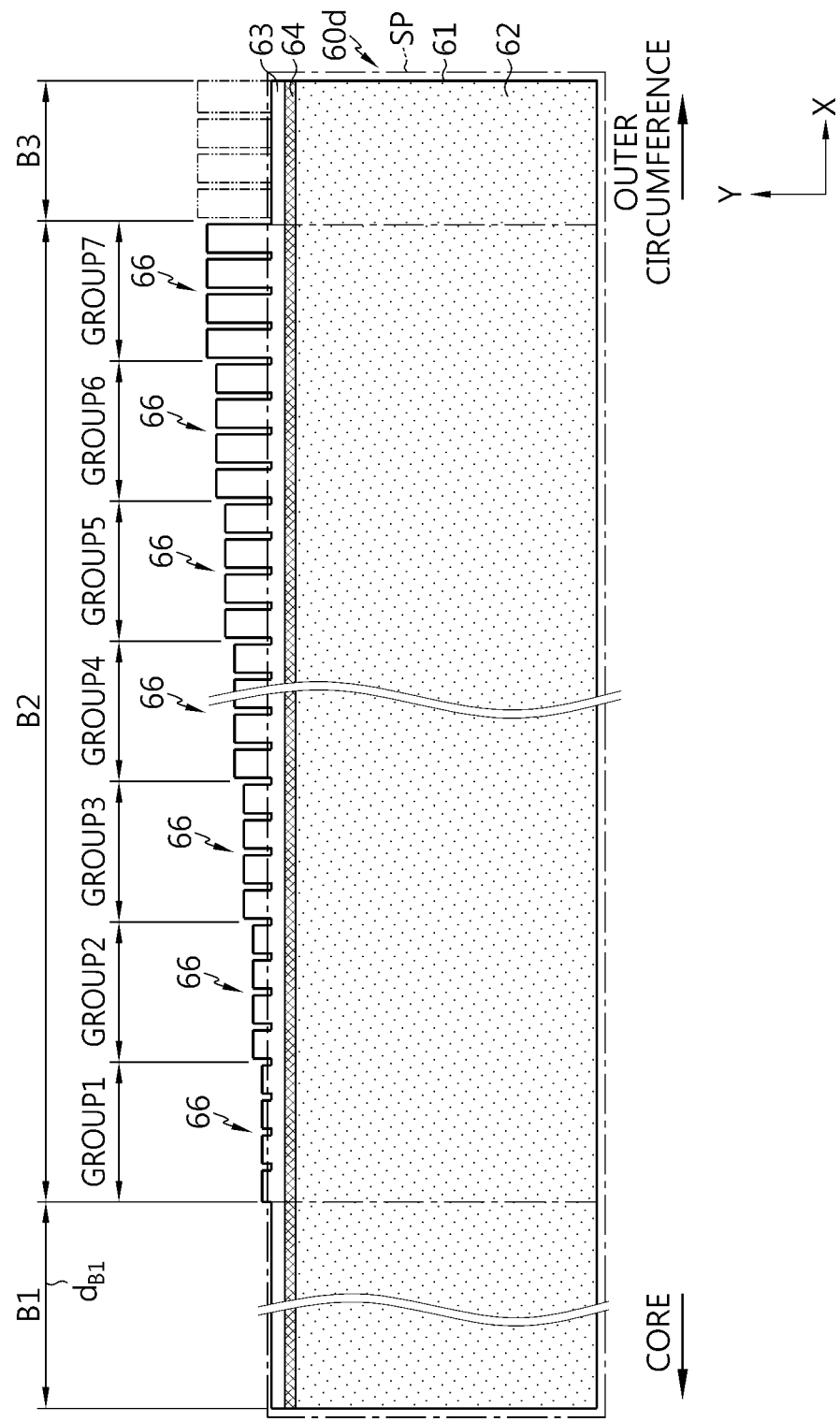

FIG. 36
New CNT
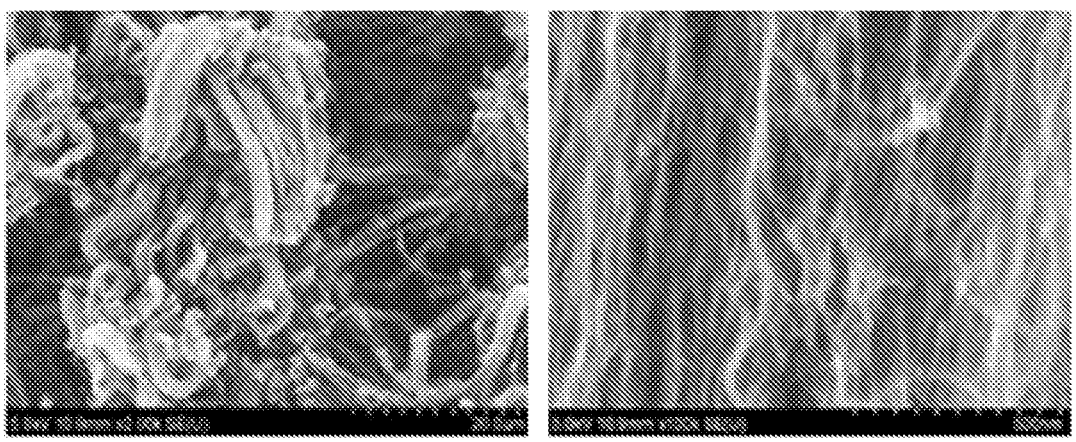
FIG. 37
Existing CNT
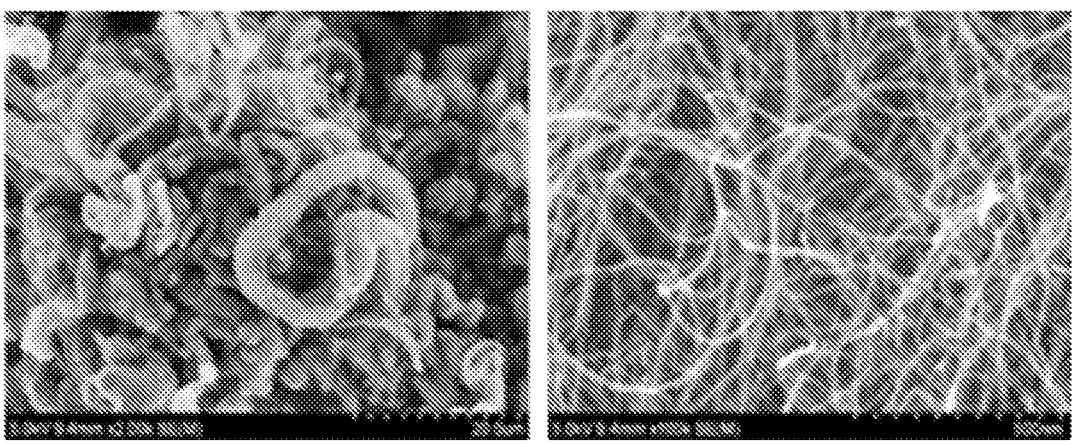
FIG. 38
| Property | | Existing CNT | New CNT |
|---|---|---|---|
| Powder | Specific Surface Area ($m^2/g$) | 200~300 | 300~450 |
| | Diameter(nm) | 10 | 3~6 |
| | Wall Number | 9~14 | 2~5 |

| | #1 | #2 | #3 | #4 | #6 |
|---|---|---|---|---|---|
| Item | Exiting CNT | New CNT | | | |
| Conductive Material Content | 0.90% | 0.45% | 0.50% | 0.55% | 0.6% |
| Solid Content | 67% | 73% | 72% | 71% | 70.5% |
| Viscosity(cp) | 7,000 | 8,500 | 6,400 | 6,900 | 6,600 |
| MP Coating Layer | 10.57 | 13.44 | 13.67 | 10.03 | 9.55 |
| MP Interface Layer | 0.095 | 0.106 | 0.070 | 0.061 | 0.053 |

ELECTRODE ASSEMBLY, CYLINDRICAL BATTERY, AND BATTERY PACK AND VEHICLE INCLUDING THE SAME

CROSS-REFERENCE TO RELATED APPLICATION

The present application claims priority to Korean Patent Application No. 10-2021-0142192 filed on Oct. 22, 2021, in the Republic of Korea, the disclosure of which is incorporated herein by reference.

TECHNICAL FIELD

The present disclosure relates to an electrode assembly, a cylindrical battery, and a battery pack and a vehicle including the cylindrical battery. In addition, the present disclosure relates to an electrode for an electrochemical device having improved electrochemical properties and an electrode assembly including the electrode.

BACKGROUND ART

Secondary batteries that are easily applicable to various product groups and have electrical characteristics such as high energy density are universally applied not only to portable devices but also to electric vehicles (EVs) or hybrid electric vehicles (HEVs) driven by an electric drive source. Hereinafter, the battery allowing repeated charging and discharging will refer to a secondary battery.

These batteries are attracting attention as a new energy source to improve eco-friendliness and energy efficiency because they have the primary advantage that they can dramatically reduce the use of fossil fuels as well as the secondary advantage that no by-products are generated from the use of energy.

Batteries currently widely used in the art include lithium ion batteries, lithium polymer batteries, nickel cadmium batteries, nickel hydrogen batteries, nickel zinc batteries, and the like, and a unit secondary battery has an operating voltage of about 2.5V to 4.5V. When a higher output voltage is required, a battery pack may be configured by connecting a plurality of batteries in series. In addition, a plurality of batteries may be connected in parallel to form a battery pack according to the charge/discharge capacity required for the battery pack. Accordingly, the number of batteries included in the battery pack and the form of electrical connection may be variously set according to the required output voltage and/or charge/discharge capacity.

Meanwhile, as a kind of unit battery, there are known cylindrical, rectangular, and pouch-type batteries. In the case of a cylindrical battery, a separator serving as an insulator is interposed between a positive electrode and a negative electrode, and they are wound to form an electrode assembly in the form of a jelly roll, which is inserted into a battery housing to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap plate of a sealing body that seals the opening of the battery housing, and the negative electrode terminal is the battery housing. However, according to the conventional cylindrical battery having such a structure, since current is concentrated in the strip-shaped electrode tab coupled to the uncoated portion of the positive electrode and/or the uncoated portion of the negative electrode, the current collection efficiency is not good due to large resistance and large heat generation.

For small cylindrical batteries with a form factor of 1865 or 2170, resistance and heat are not a major issue. However, when the form factor is increased to apply the cylindrical battery to an electric vehicle, the cylindrical battery may ignite while a lot of heat is generated around the electrode tab during the rapid charging process.

In order to solve this problem, there is provided a cylindrical battery (so-called tab-less cylindrical battery) in which the uncoated portion of the positive electrode and the uncoated portion of the negative electrode are designed to be positioned at the top and bottom of the jelly-roll type electrode assembly, respectively, and the current collecting plate is welded to the uncoated portion to improve the current collecting efficiency.

FIGS. 1 to 3 are diagrams showing a process of manufacturing a tab-less cylindrical battery. FIG. 1 shows the structure of an electrode, FIG. 2 shows a process of winding the electrode, and FIG. 3 shows a process of welding a current collecting plate to a bent surface of an uncoated portion.

Referring to FIGS. 1 to 3, a positive electrode P and a negative electrode N have a structure in which a sheet-shaped current collector F is coated with an active material layer M, and include an uncoated portion U at one long side along the winding direction X.

An electrode assembly A is manufactured by sequentially stacking the positive electrode P and the negative electrode N together with two sheets of separators S as shown in FIG. 2 and then winding them in one direction X. At this time, the uncoated portions of the positive electrode P of the negative electrode N are arranged in opposite directions.

After the winding process, the uncoated portion Pu of the positive electrode P and the uncoated portion Nu of the negative electrode N are bent toward the core. After that, current collecting plates 30, 31 are welded and coupled to the uncoated portions Pu, Nu, respectively.

An electrode tab is not separately coupled to the positive electrode uncoated portion Pu and the negative electrode uncoated portion Nu, the current collecting plates 30, 31 are connected to external electrode terminals, and a current path is formed with a large cross-sectional area along the winding axis direction of electrode assembly A (see arrow), which has an advantage of lowering the resistance of the battery. This is because resistance is inversely proportional to the cross-sectional area of the path through which the current flows.

In the tab-less cylindrical battery, in order to improve the welding characteristics of the uncoated portions Pu and Nu and the current collecting plates 30 and 31, it is necessary to bend the uncoated portions Pu and Nu as flat as possible by applying a strong pressure to the welding points of the uncoated portions Pu and Nu.

However, when the welding points of the uncoated portions Pu and Nu are bent, the shapes of the uncoated portions Pu and Nu may be irregularly distorted and deformed. In this case, the deformed portion may contact an electrode of opposite polarity to cause an internal short circuit or cause fine cracks in the uncoated portions Pu and Nu. In addition, as the uncoated portion 32 adjacent to the core of the electrode assembly A is bent, all or a significant portion of the cavity 33 in the core of the electrode assembly A is blocked. In this case, a problem arises in the electrolyte injection process. That is, the cavity 33 in the core of the electrode assembly A is used as a passage through which electrolyte is injected. However, when the corresponding passage is blocked, it is difficult to inject the electrolyte. In addition, while an electrolyte injector is being inserted into the cavity 33, interference with the uncoated portion 32 near the core may occur to cause the uncoated portion 32 to be torn.

In addition, the bent portions of the uncoated portions Pu and Nu to which the current collecting plates 30 and 31 are welded must be overlapped in several layers and no empty space (gap) must exist. In this way, a sufficient welding strength can be obtained, and even if the latest technology such as laser welding is used, the problem that laser penetrates into the electrode assembly A and melts the separator or the active material can be prevented.

In the conventional tab-less cylindrical battery, the positive electrode uncoated portion Pu is formed on the electrode assembly A as a whole. Therefore, when the beading portion is formed by pressing the outer circumference of the top of the battery housing inward, the top edge region 34 of the electrode assembly A is pressed by the battery housing. Such pressure may cause partial deformation of the electrode assembly A, and at this time, an internal short circuit may occur as the separator S is torn. If a short circuit occurs inside the battery, the battery may be heated or explode.

Meanwhile, the separator S may be a single-side coated separator in which an inorganic coating layer is formed on only one side of the porous polymer substrate to improve heat shrinkage characteristics of the substrate. Since one side of the separator S is a porous substrate and the other side is an inorganic coating layer, the electrolyte impregnation characteristics are asymmetric. Due to the asymmetry of the electrolyte impregnation characteristics, when the electrode assembly is impregnated with the electrolyte, the pressure/vacuum conditions must be increased, resulting in a cost increase. In addition, if an appropriate impregnation process is not applied, the problem of battery performance deterioration also occurs.

The conventional separator S has a limit in heat resistance because the fabric is exposed on one side. In particular, at a high temperature of 130° C. or above, the shrinkage of the separator is great. Therefore, when a thermal shock of 130° C. or above occurs within the battery, the separator contracts, causing an electrode short circuit, and in this process, the internal temperature of the battery rises rapidly, which may cause an ignition accident.

The upper and lower surfaces of the electrode assembly A are closed due to bending of the uncoated portions Pu and Nu. The bent surface of the uncoated portions Pu and Nu interferes with the flow of the electrolyte, increasing the impregnation time and degrading the impregnation uniformity of the electrolyte. When the impregnation uniformity deteriorates, an unstable solid electrolyte interface (SEI) layer is formed, which increases the resistance distribution of batteries manufactured on the same production line.

In the process of winding the electrode assembly A, the positive electrode and/or the negative electrode may move in the winding axis direction due to meandering. When the electrode moves in the winding axis direction, the end of the positive electrode and/or the negative electrode may be located near the end of the separator. In particular, when the positive electrode and/or the negative electrode protrude outward more than the end of the separator, a short circuit may occur inside the battery due to electrical contact between the positive electrode and the negative electrode. Since an internal short circuit of the battery causes an explosion accident, it is necessary to design an insulation structure to prevent electrical contact between the positive electrode and the negative electrode.

Meanwhile, along with the recent development of electric vehicle technology, there is an increasing demand for large-capacity large-sized cylindrical batteries. Small cylindrical batteries with a form factor of 1865 or 2170 have a small capacity, so heat generated by internal resistance does not have a significant effect on battery performance. However, when the design specifications of a conventional small cylindrical battery are applied as they are to a large cylindrical battery, a serious problem may occur in the safety of the battery.

As the size of the battery increases, the amount of heat generated by the battery also increases. An increase in heat generation increases the possibility of battery ignition. In order to prevent ignition of the battery, the surface area of the battery, which is a passage for discharging heat, must increase according to the increase in the volume of the battery. However, the increase in area of the battery surface does not match the increase in volume. Therefore, as the size of the battery increases, the heat dissipation efficiency decreases, which increases the risk of explosion and lowers the battery output. For this reason, there is a need in the art to develop a cylindrical battery having a high safety while having a large volume so as to implement a high capacity.

On the other hand, by applying a conventional positive electrode active material containing secondary particles, particle breakage may occur during electrode manufacturing, and the amount of gas generated due to internal cracking during charging and discharging may increase, which may cause problems with battery stability.

To solve this problem, a positive electrode active material in the form of a single particle or pseudo-single particle having a relatively large primary particle size has been developed. However, if the positive electrode active material in the form of a single particle or pseudo-single particle is applied to a high loading electrode and then rolling is performed, there is a problem in that the electrode is broken in a state where the electrode porosity is not achieved to a target level, and there is a problem in that the resistance characteristics and charge/discharge efficiency of the lithium secondary battery are not good.

DISCLOSURE

Technical Problem

The present disclosure is designed to solve the problems of the related art, and therefore the present disclosure is directed to providing an electrode assembly having a structure capable of effectively preventing an internal short circuit caused by meandering of electrodes when manufacturing the electrode assembly.

The present disclosure is also directed to providing an electrode assembly having an uncoated portion to which a segment structure is applied so as to relieve a stress applied to the uncoated portion when bending the uncoated portion exposed at both ends of the electrode assembly.

The present disclosure is also directed to providing an electrode assembly in which an electrolyte injection passage is not blocked even when the uncoated portion is bent.

The present disclosure is also directed to providing an electrode assembly with improved electrolyte impregnation characteristics by optimizing the position of the separator around the segmental structure of the uncoated portion.

The present disclosure is also directed to providing an electrode assembly having a structure capable of preventing contact between the top edge of the electrode assembly and the inner surface of the battery housing when the top of the battery housing is beaded.

The present disclosure is also directed to providing an electrode assembly with improved energy density and reduced resistance.

The present disclosure is also directed to providing a cylindrical battery including the electrode assembly of an improved structure, a battery pack including the cylindrical battery, and a vehicle including the battery pack.

The present disclosure is also directed to providing an electrode and an electrode assembly including the same, which may implement excellent thermal stability ad have high electrical conductivity and high rolling characteristics by applying a single particle or pseudo-single particle as a positive electrode active material.

The present disclosure is also directed to providing an electrode assembly with improved energy density by including a silicon-containing negative electrode active material in the negative electrode.

The present disclosure is also directed to providing an electrode assembly in which the range of the positive electrode active material portion is increased without worrying about lithium precipitation.

The present disclosure is also directed to providing a cylindrical battery capable of exhibiting excellent thermal stability even when the volume of the battery increases due to an increase in form factor.

However, the technical object to be solved by the present disclosure is not limited to the above, and other objects not mentioned herein will be clearly understood by those skilled in the art from the following disclosure.

Technical Solution

In one aspect of the present disclosure, there is provided an electrode assembly in which a first electrode, a second electrode, and a separator interposed therebetween are wound around a winding axis in a winding direction to define a core and an outer circumference of the electrode assembly, wherein each of the first electrode and the second electrode includes an uncoated portion not coated with an active material layer at a long side end; and a coated portion coated with the active material layer in a region other than the uncoated portion, the first electrode includes an insulation layer configured to cover a boundary of the uncoated portion and the coated portion along the winding direction; the uncoated portion of the first electrode includes a plurality of segments separated from each other by cutting lines along the winding direction, at least a part of the plurality of segments is bent along a radial direction of the electrode assembly to define a bent surface at an end of the electrode assembly along the winding axis, and when a line parallel to the winding direction and passing through a point having a smallest height of the uncoated portion of the first electrode with respect to the coated portion of the first electrode is a datum line and the segment with the smallest height among the segments defining the bent surface is a minimum segment, a separation distance between one end of the separator and the datum line along the winding axis is 30% or less of the smallest height of the minimum segment.

The position of the datum line may correspond to a bottom position of the cutting line.

The separation distance between the one end of the separator and the datum line may be 1.5 mm or less.

The insulation layer may be provided on opposite surfaces of the first electrode, and one end of the insulation layer along the winding axis may be located at a same height as the end of the separator along the winding axis or is located beyond the one end of the separator along the winding axis.

One end of the second electrode along the winding axis facing the insulation layer with the separator interposed therebetween may not protrude beyond the separator along the winding axis.

The electrode assembly may include a first sliding portion in which a thickness of the active material layer is reduced in a boundary region between the coated portion and the uncoated portion of the first electrode, and a second sliding portion in which a thickness of the active material layer is included in a boundary region between the coated portion and the uncoated portion of the second electrode. The first sliding portion and the second sliding portion may be located in opposite directions along the winding axis.

The coated portion of the first electrode may include a loading reduction portion in which a loading amount of the active material is reduced, and the position of the loading reduction portion may correspond to the position of the second sliding portion.

The insulation layer may cover at least a part of the first sliding portion.

The insulation layer located on a side facing the core among opposite sides of the uncoated portion of the first electrode may extend to an end of the uncoated portion of the first electrode along the winding axis.

The insulation layer located on a side opposite to a side facing the core among opposite sides of the uncoated portion of the first electrode may extend to a bending point of the uncoated portion of the first electrode.

A length of the coated portion of the first electrode along the winding axis may be shorter than a length of the coated portion of the second electrode along the winding axis, opposite ends of the coated portion of the second electrode along the winding axis may be located beyond opposite ends of the coated portion of the first electrode along the winding axis.

At least one of height along the winding axis and width in the winding direction of the plurality of segments may increase stepwise individually or by group from the core toward the outer circumference of the electrode assembly.

The plurality of segments may include a plurality of segment groups from the core toward the outer circumference of the electrode assembly, and the segments belonging to a same segment group of the plurality of segment groups may be identical in terms of at least one of width in the winding direction, height along the winding axis, and separation pitch in the winding direction.

The segments belonging to the same segment group may increase stepwise in terms of at least one of the width in the winding direction, the height along the winding axis, and the separation pitch in the winding direction from the core toward the outer circumference of the electrode assembly.

The plurality of segments may be bent in the radial direction and overlapped in several layers along the winding axis.

The uncoated portion of the first electrode may include a core-side uncoated portion adjacent to the core of the electrode assembly, an outer circumference uncoated portion adjacent to the outer circumference of the electrode assembly, and an intermediate uncoated portion interposed between the core-side uncoated portion and the outer circumference uncoated portion, at least one of the core-side uncoated portion and the outer circumference uncoated portion may have a relatively smaller height along the winding axis than the intermediate uncoated portion, and a radial length of the core-side uncoated portion may be equal to or greater than a bending length of an innermost segment of the intermediate uncoated portion.

A gap may be provided between a bottom of the cutting line of each segment and the active material layer.

The active material layer of the first electrode may include a positive electrode active material including a single particle, a pseudo-single particle, or a combination thereof.

$D_{min}$, which is a minimum particle size in a cumulative volume distribution of the positive electrode active material, may be 1.0 µm or more.

In the cumulative volume distribution of the positive electrode active material, $D_{50}$, which is a particle size when a cumulative volume amount is 50%, may be 5.0 µm or less.

$D_{max}$, which is a maximum particle size in the cumulative volume distribution of the positive electrode active material, may be 12 µm to 17 µm.

The positive electrode active material may have a unimodal particle size distribution showing a single peak in a cumulative volume particle size distribution graph, and a particle size distribution (PSD) represented by the following formula is 3 or less:

$$PSD = (D_{max} - D_{min})/D_{50}. \quad \text{Formula}$$

The single particle, the pseudo-single particle, or the combination thereof may be present in an amount of 95 wt % to 100 wt % based on a total weight of the positive electrode active material present in the active material layer of the first electrode.

The positive electrode active material may include a lithium nickel-containing oxide containing 80 mol % or more of Ni based on a total number of moles of a transition metal.

The active material layer of the first electrode may have a porosity of 15% to 23%.

The active material layer of the first electrode may include flake graphite in a weight ratio of 0.05 wt % to 5 wt %.

The active material layer of the first electrode may further contain carbon nanotubes.

The active material layer of the second electrode may include a silicon-containing negative electrode active material and a carbon-containing negative electrode active material.

The silicon-containing negative electrode active material and the carbon-containing negative electrode active material may be present in the active material layer of the second electrode in a weight ratio of 1:99 to 20:80.

In another aspect of the present disclosure, there is also provided a cylindrical battery, comprising: an electrode assembly including at least one of the above features; a battery housing configured to accommodate the electrode assembly through an opening formed in one side and electrically connected to the uncoated portion of the second electrode; a terminal electrically connected to the uncoated portion of the first electrode and at least partially exposed outside the battery housing; and a sealing body configured to cover the opening of the battery housing.

In another aspect of the present disclosure, there is also provided a battery pack comprising a plurality of cylindrical batteries and a vehicle comprising the battery pack.

Advantageous Effects

According to one aspect of the present disclosure, by preventing electrical contact between the positive electrode and the negative electrode of the electrode assembly, it is possible to effectively prevent a short circuit inside the cylindrical battery.

According to another aspect of the present disclosure, the internal resistance of the battery may be reduced and the energy density may be increased by using the uncoated portions themselves protruding from the upper and lower portions of the electrode assembly as electrode tabs.

According to still another aspect of the present disclosure, by improving the structure of the uncoated portion of the electrode assembly to prevent interference between the electrode assembly and the inner circumference of the battery housing in the process of forming a beading portion of the battery housing, it is possible to prevent an internal short circuit from occurring in the cylindrical battery due to partial deformation of the electrode assembly.

According to still another aspect of the present disclosure, by improving the structure of the uncoated portion of the electrode assembly, it is possible to prevent the uncoated portion from being torn when the uncoated portion is bent, and it is possible to improve the welding strength by sufficiently increasing the number of overlapping layers of the uncoated portion.

According to still another aspect of the present disclosure, by improving the structure of the uncoated portion adjacent to the core of the electrode assembly, it is possible to prevent the cavity in the core of the electrode assembly from being blocked when the uncoated portion is bent, thereby allowing the electrolyte injection process and the process of welding the battery housing and the current collecting plate to be easily performed.

According to still another aspect of the present disclosure, the electrolyte impregnability may be improved by applying a segment structure to the uncoated portion of the electrode assembly and adjusting the position of the separator based on the cut groove of the segment.

According to still another aspect of the present disclosure, it is possible to provide a cylindrical battery having a structure with low internal resistance, prevention of internal short circuit, and improved welding strength between the current collecting plate and the uncoated portion, and a battery pack and a vehicle including the same.

According to still another aspect of the present disclosure, since the positive electrode includes positive electrode active material powder having $D_{min}$ of 1.0 µm or more, thermal safety of the battery may be further improved. According to the study by inventors of the present discloser, even if a single particle and/or pseudo-single particle is applied as the positive electrode active material, the effect of suppressing particle breakage and improving thermal safety after rolling is different depending on the particle size of the positive electrode active material powder. In particular, when particles with a particle diameter of less than 1.0 µm are included in the positive electrode active material powder, the line pressure increases during the rolling process, resulting in increased particle breakage and reduced thermal stability, so it is impossible to sufficiently secure thermal stability when applying a large-sized cylindrical battery. Therefore, in the present disclosure, the effect of improving thermal safety can be maximized by using a positive electrode active material powder having a minimum particle size ($D_{min}$) controlled to 1.0 µm or more.

According to still another aspect of the present disclosure, since the positive electrode contains a positive electrode active material powder whose $D_{50}$, $D_{max}$, and particle size distribution (PSD) are appropriately adjusted so as to minimize the increase in resistance due to single particle application, it is possible to implement excellent capacity characteristics and power characteristics.

According to still another aspect of the present disclosure, the conductivity of the electrode can be improved by including a single particle-based positive electrode active material coated with a conductive coating layer or by containing novel CNT as a conductive material.

According to still another aspect of the present disclosure, since the positive electrode active material layer contains flake graphite, when the positive electrode active material layer is rolled, the flake graphite provides a sliding effect to the positive electrode active material, so that the rolling properties of the electrode are improved, and the electrode porosity can be lowered to the target level. Accordingly, stability, initial resistance characteristics, and charge/discharge efficiency of the cylindrical battery are improved.

According to still another aspect of the present disclosure, a higher energy density can be implemented by including a silicon-containing negative electrode active material with a large capacity in the negative electrode.

According to still another aspect of the present disclosure, since a loading reduction portion with a small loading amount of the positive electrode active material is included in the positive electrode, the range of the positive electrode active material portion can be increased without worrying about lithium precipitation.

According to still another aspect of the present disclosure, compared to a conventional battery having a strip-shaped electrode tab, internal heat generation of the battery can be effectively reduced, so the thermal safety of the battery can be improved.

In addition, the present disclosure may have various other effects, which will be described in each embodiment, or effects that can be easily inferred by those skilled in the art will not be described.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 12 is a graph showing power distribution in several short-circuit cases in the battery.

FIG. 13b is a schematic view showing a vehicle including the battery pack of FIG. 13a.

FIG. 17a is a plan view showing the structure of an electrode according to the fourth embodiment of the present disclosure.

FIG. 36 is a SEM photograph showing a novel CNT according to an embodiment of the present disclosure.

FIG. 37 is a scanning electron microscope (SEM) photograph showing a carbon nanotube (existing CNT) commonly used in the prior art.

FIG. 38 is a table showing the comparison of physical properties of the existing CNT and the new CNT.

BEST MODE

Figure 1:
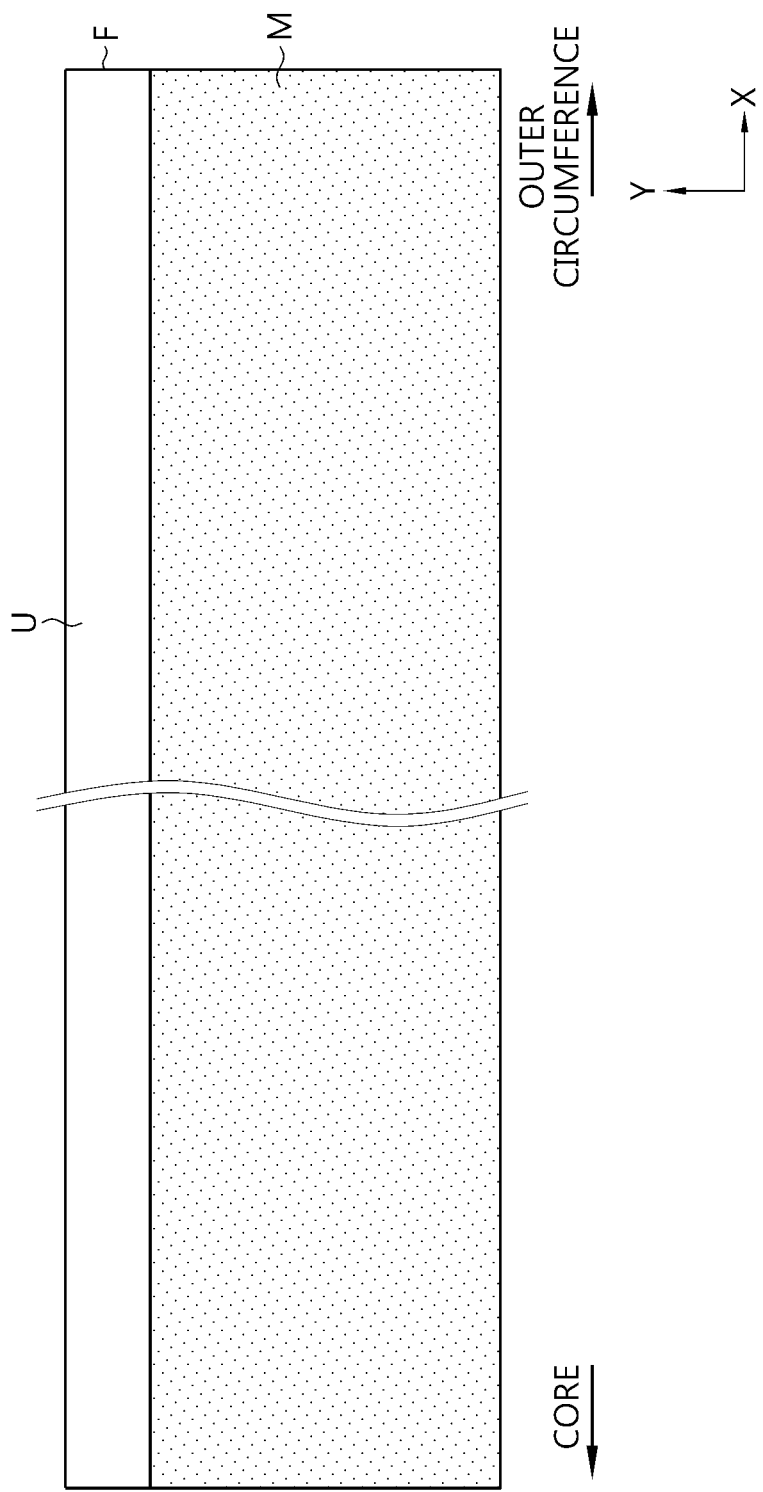
FIG. 1 is a plan view showing a structure of an electrode used for manufacturing a conventional tab-less cylindrical battery.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In addition, in order to help the understanding of the present disclosure, the accompanying drawings are not drawn to scale, but dimensions of some components may be exaggerated. Also, the same reference signs may be assigned to the same components in different embodiments.

Since the size and thickness of each component shown in the drawings are arbitrarily illustrated for convenience of description, the present disclosure is not necessarily limited to the drawings. In the drawings, the thickness is shown enlarged to clearly express the various layers and regions. In addition, in the drawings, for convenience of explanation, the thicknesses of some layers and regions are exaggerated.

In addition, when a part such as a layer, film, region, plate, etc. is described to be "above" or "on" another part, this includes not only the case where it is "directly on" another part, but also the case where still another part exists therebetween. Conversely, when a part is described to be "directly on" another part, it means that there is no other part therebetween. In addition, to be "above" or "on" a reference part means to be located above or below the reference part, and does not mean to be located "above" or "on" in a direction opposite to gravity.

In addition, throughout the specification, when a certain part is described to "include" a certain component, it means that it may further include other components without excluding other components, unless otherwise stated.

In addition, throughout the specification, when it is referred to as "in a planar form", it means when the target part is viewed from above, and when it is referred to as "in a cross-sectional form", it means when the target part is vertically cut and viewed from the side.

Figure 4:
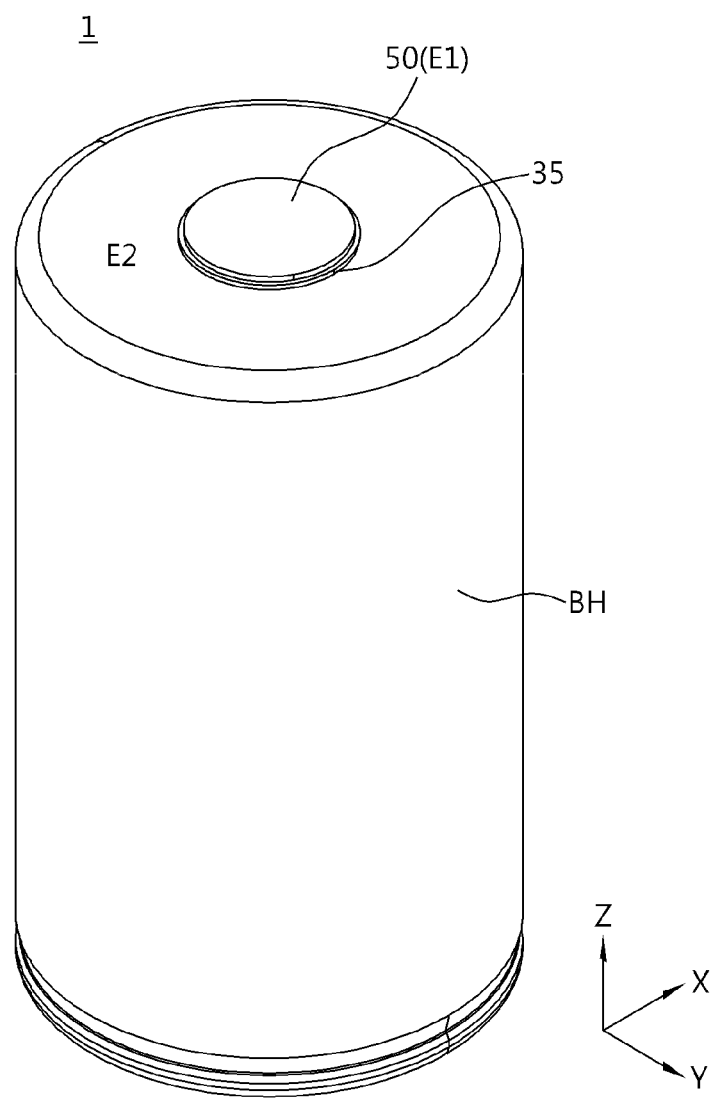
FIG. 4 is a perspective view showing the appearance of a cylindrical battery according to an embodiment of the present disclosure.
Figure 5:
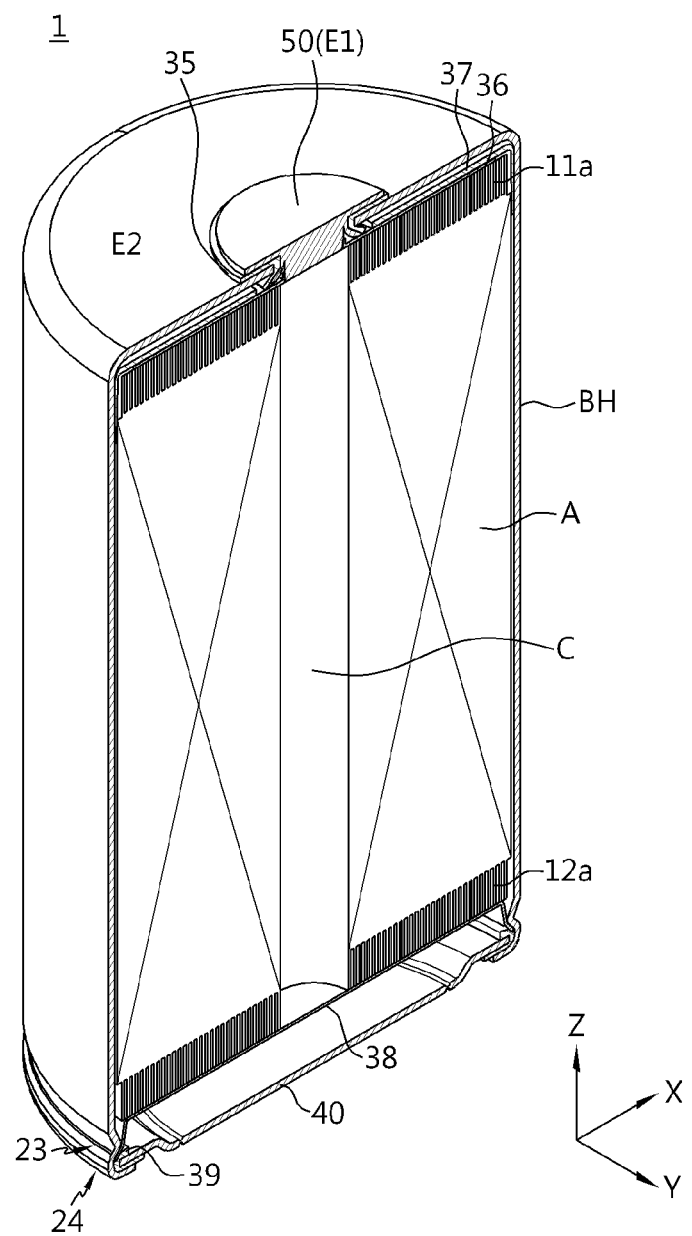
FIG. 5 is a longitudinal cross-sectional view showing the cylindrical battery of FIG. 4.
Figure 6:
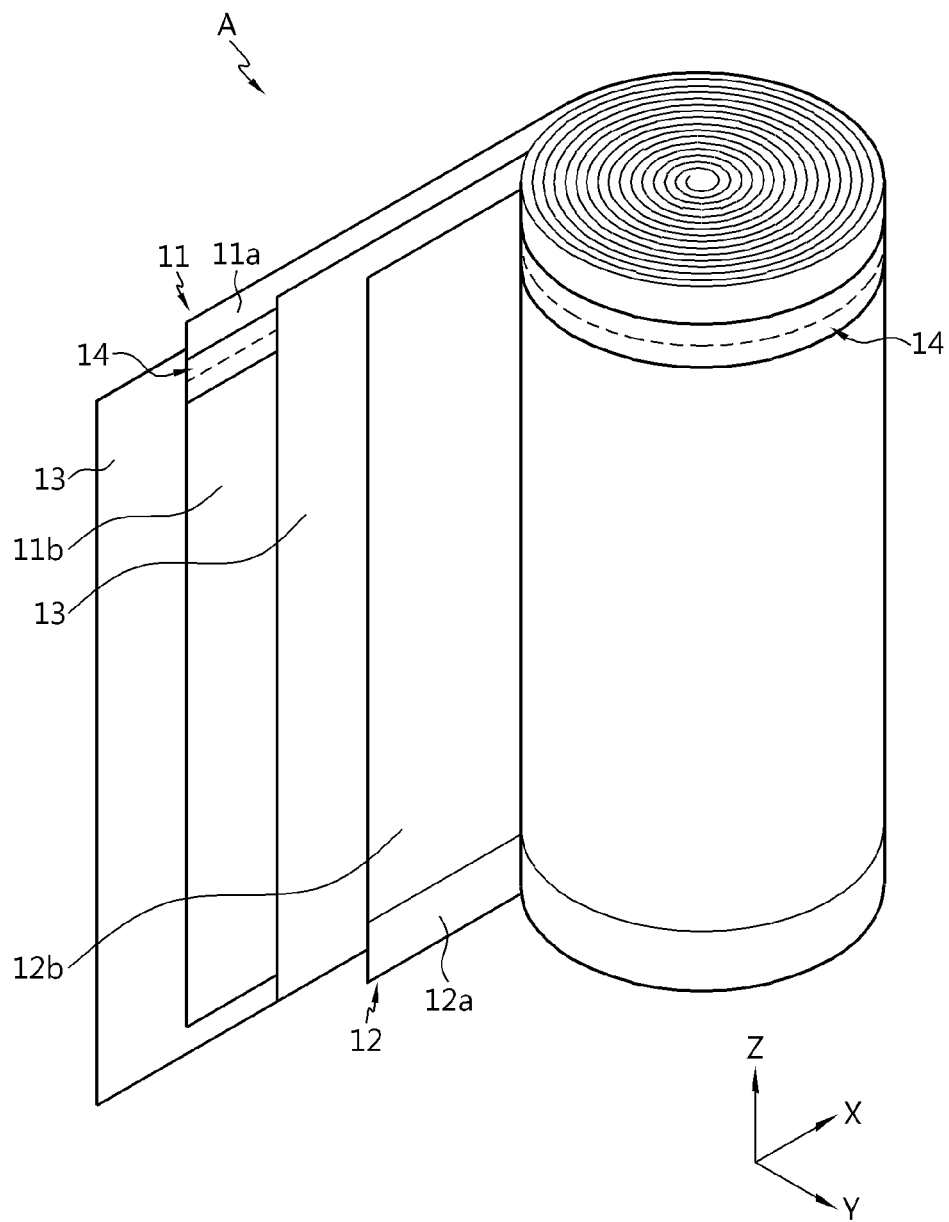
FIG. 6 is a diagram showing the structure of an electrode assembly included in the cylindrical battery of FIG. 4.

Referring to FIGS. 4 to 6, a cylindrical battery 1 according to an embodiment of the present disclosure includes an electrode assembly A, a BH, a sealing body 40, and a terminal 50.

The cylindrical battery 1 may further include a first current collecting plate 36 and/or an insulator 37 and/or an insulating gasket 35 and/or a second current collecting plate 38 and/or a sealing gasket 39 in addition to the above-described components.

Referring to FIGS. 4 to 6, the electrode assembly A includes a first electrode 11 having a first polarity, a second electrode 12 having a second polarity, a separator 13 interposed between the first electrode 11 and the second electrode 12, and an insulation layer 14 for covering at least a part of the first electrode 11.

The first electrode 11 is a positive electrode or a negative electrode, and the second electrode 12 corresponds to an electrode having a polarity opposite to that of the first electrode 11. The first electrode 11 and the second electrode 12 may have a sheet shape. The electrode assembly A may have, for example, a jelly-roll shape. That is, the electrode assembly A may be manufactured by winding a stack, which is formed by sequentially stacking the first electrode 11, the separator 13, the second electrode 12 and the separator 13 at least once, based on the winding center C. In this case, an additional separator 13 may be provided on the outer circumference of the electrode assembly A to insulate the electrode assembly from the battery housing BH. The separator 13 may include a porous substrate and a heat-resistant coating layer formed on at least one surface of the substrate. The heat-resistant coating layer may include inorganic particles and/or heat-resistant polymer particles, and a binder.

The first electrode 11 and the second electrode 12 may include uncoated portions 11a, 12a in which an active material layer is not coated, on long side ends. The first electrode 11 and the second electrode 12 may include coated portions 11b, 12b in which an active material layer is coated, in regions other than the uncoated portions 11a, 12a.

Specifically, the first electrode 11 includes a first electrode current collector and a first electrode active material coated on one surface or both surfaces of the first electrode current collector. A region where the first electrode active material is coated on the first electrode current collector is referred to as a first coated portion 11b provided in the first electrode 11. A first uncoated portion 11a which is not coated with the first electrode active material may be present at one end in the width direction (direction parallel to the Z-axis) of the first electrode current collector. At least a part of the first uncoated portion 11a is used as an electrode tab by itself. The first uncoated portion 11a provided in the first electrode 11 is located in the upper portion in the height direction (direction parallel to the Z-axis) of the electrode assembly A accommodated in the battery housing BH.

The second electrode 12 includes a second electrode current collector and a second electrode active material coated on one surface or both surfaces of the second electrode current collector. A region where the second electrode active material is coated on the second electrode current collector is referred to as a second coated portion 12b provided in the second electrode 12. A second uncoated portion 12a which is not coated with the second electrode active material may be present at the other end in the width direction (direction parallel to the Z-axis) of the second electrode current collector. At least a part of the second uncoated portion 12a is used as an electrode tab by itself. The second uncoated portion 12a provided in the second electrode 12 is located in the lower portion in the height direction (direction parallel to the Z-axis) of the electrode assembly A accommodated in the battery housing BH.

The first uncoated portion 11a provided in the first electrode 11 and the second uncoated portion 12a provided in the second electrode 12 may protrude in opposite directions. For example, referring to FIGS. 6 and 7, the first uncoated portion 11a provided in the first electrode 11 may protrude upward in the height direction (direction parallel to the Z-axis) of the electrode assembly A, and the second uncoated portion 12a provided in the second electrode 12 may protrude downward in the height direction (direction parallel to the Z-axis) of the electrode assembly A. Accordingly, the first uncoated portion 11a provided in the first electrode and the second uncoated portion 12a provided in the second electrode may be in the form of extending and protruding in opposite direction to each other along the width direction of the electrode assembly A, that is, the height direction (direction parallel to the Z-axis) of the cylindrical battery 1.

Meanwhile, the first and second coated portions 11b, 12b may include a sliding portion in which the active material layer has a reduced thickness compared to the central region of the first and second coated portions 11b, 12b. For example, referring to FIG. 7, each of the first electrode 11 and the second electrode 12 may have a sliding portion, which is a region in which the thickness of the active material layer is reduced, at one end or the other end.

The sliding phenomenon means a phenomenon in which an electrode active material is less coated in the slurry-coated boundary region compared to a region other than the slurry-coated boundary region due to the spread of the slurry containing the electrode active material so that the slurry of the coated boundary region has an approximately inclined shape. Here, when the electrode is dried as a whole, the slurry volume decreases as the solvent contained in the slurry evaporates, so the sliding phenomenon may be further intensified near the boundary between the region where the electrode active material is coated and the region where the electrode active material is not coated.

The sliding portion may be formed in a boundary region of the first coated portion 11b and the first uncoated portion 11a and a boundary region of the second coated portion 12b and the second uncoated portion 12a. For example, the sliding portion may be provided at one end of the first electrode 11 and at the other end of the second electrode 12, respectively. That is, the sliding portion of the first coated portion 11b provided in the first electrode 11 and the sliding portion of the second coated portion 12b provided in the second electrode 12 may be provided in opposite directions. For example, referring to FIG. 7, the sliding portion of the first electrode 11 may be formed in the upper portion in the winding axis direction (direction parallel to the Z-axis), and the sliding portion of the second electrode 12 may be formed in the lower portion in the winding axis direction (direction parallel to the Z-axis), which is a direction opposite to the above.

The length in the winding axis direction (direction parallel to the Z-axis) of the first coated portion 11b provided in the first electrode 11 may be shorter than the length in the winding axis direction (direction parallel to the Z-axis) of the second coated portion 12b provided in the second electrode 12. In addition, the first coated portion 11b provided in the first electrode 11 may be located inward in the winding axis direction (direction parallel to the Z-axis) more than the second coated portion 12b provided in the second electrode 12. For example, referring to FIG. 7, the length in the winding axis direction (direction parallel to the Z-axis) of the second coated portion 12b provided on the second electrode 12 may be larger than the length in the winding axis direction (direction parallel to the Z-axis) of the first coated portion 11b provided in the first electrode 11. Furthermore, referring to FIG. 7, the length in the winding axis direction (direction parallel to the Z-axis) of the first coated portion 11b provided in the first electrode 11 may be formed shorter than the length in the winding axis direction (direction parallel to the Z-axis) of a region of the second coated portion 12b provided in the second electrode 12 except for the sliding portion. This structure is to prevent that the NP ratio of the positive/negative electrode is reduced to less than 100% and thus lithium metal is precipitated.

Meanwhile, the first and second coated portions 11b, 12b may not protrude further than the separator 13 in the winding axis direction (direction parallel to the Z-axis). That is, if the first and second coated portions 11b, 12b protrude more than the separator 13 in the winding axis direction (direction parallel to the Z-axis), the possibility of contact between the first electrode 11 and the second electrode 12 may increase. If so, an internal short circuit may occur in the contact area, increasing the risk of ignition. Therefore, it is important that the first and second coated portions 11b, 12b do not protrude in the winding axis direction (direction parallel to the Z-axis) more than the separator 13. That is, the first and second coated portions 11b, 12b are preferably located inner than the separator 13.

In order to minimize the possibility of contact between the first electrode 11 and the second electrode 12, the first electrode 11 of the present disclosure may include at least one insulation layer 14 for simultaneously covering at least a part of the first uncoated portion 11a and at least a part of the first coated portion 11b. Electrical contact between the first electrode 11 and the second electrode 12 may be effectively prevented by the insulation layer 14. More specifically, electrical contact between the first uncoated portion 11a provided in the first electrode 11 and the second coated portion 12b provided in the second electrode 12 may be effectively prevented.

Figure 7:
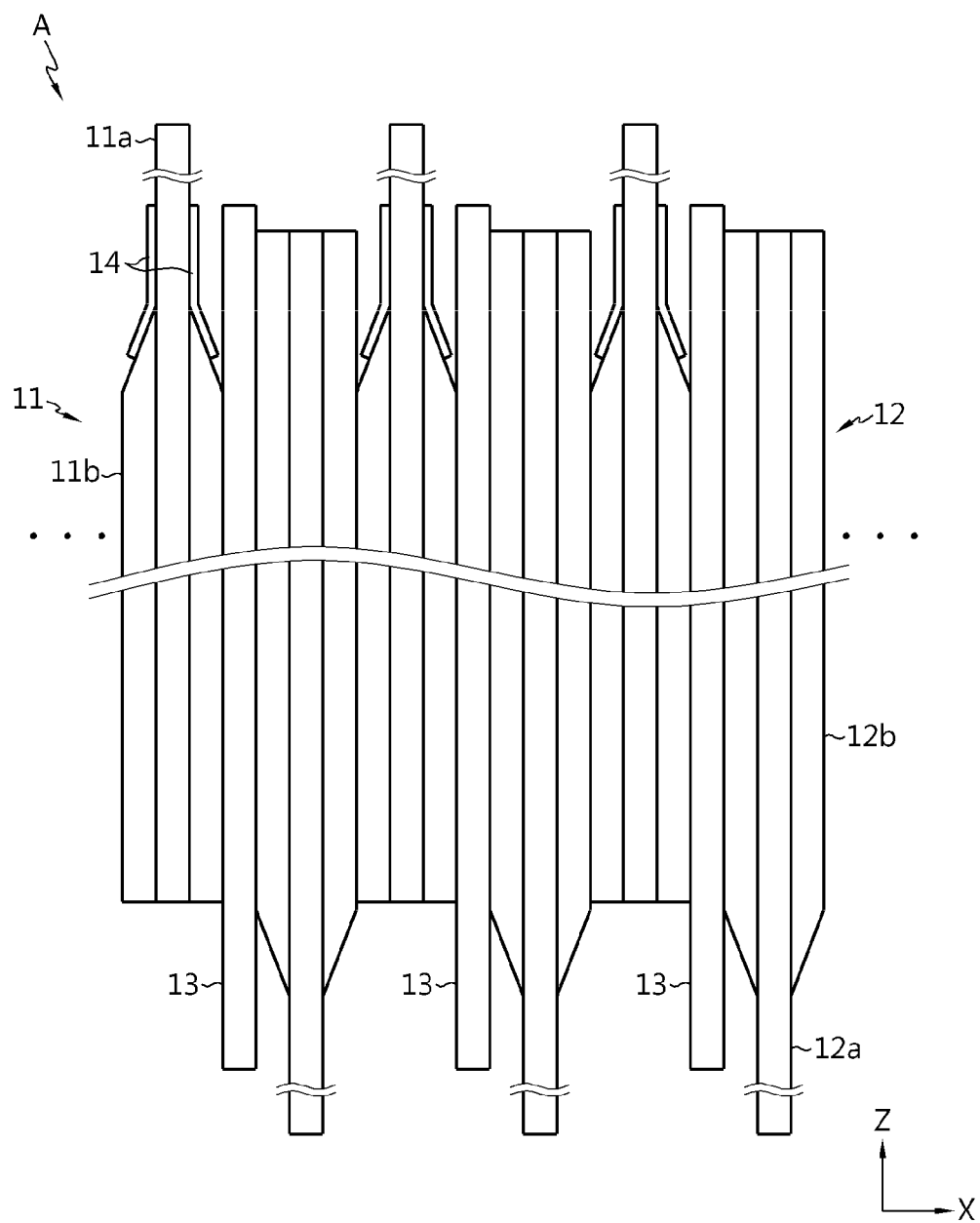
FIG. 7 is a diagram showing a part of a longitudinal cross-sectional view of the electrode assembly of FIG. 6.

The insulation layer 14 may be provided on at least one surface of the first electrode 11. For example, the insulation layer 14 may be provided on both surfaces of the first electrode 11. In FIG. 7, the separator 13 is located on the left side as well as on the right side of the first electrode 11, and another second electrode 12 is located on the left side of the separator 13 located on the left side. Therefore, in order to prevent electrical contact with the second electrodes 12 located on the left and right sides, it is preferable that the insulation layer 14 is provided on both surfaces of the first electrode 11.

The insulation layer 14 may be provided in the entire region that may face the second coated portion 12b provided in the second electrode 12, among the regions of the first electrode 11. For example, one end in the winding axis direction (direction parallel to the Z-axis) of the insulation layer 14 may be located at the same height as one end in the winding axis direction (direction parallel to the Z-axis) of the separator 13 or outside one end. More specifically, referring to FIG. 7 as an example, one end in the winding axis direction (direction parallel to the Z-axis) of the insulation layer 14 may be located at the same height as one end in the winding axis direction of the separator 13. Since the separator 13 protrudes in the winding axis direction (direction parallel to the Z-axis) between the first electrode 11 and the second electrode 12, electrical contact between the first electrode 11 and the second electrode 12 may be prevented to some extent. However, since movement such as meandering of the first electrode 11 or the second electrode 12 may occur inside the cylindrical battery 1, the possibility that the second electrode 12 is located near the end of the separator 13 cannot be ruled out. Therefore, when the second electrode 12 is located even at the end of the separator 13 due to movement such as meandering or when the second electrode 12 protrudes outward more than the end of the separator 13, electrical contact between the first electrode 11 and the second electrode 12 cannot be avoided. Alternatively, if the separator 13 is damaged for some reason, electrical contact between the first electrode 11 and the second electrode 12 cannot be avoided. Therefore, even if this case occurs, in order to prevent electrical contact between the first electrode 11 and the second electrode 12, the insulation layer 14 provided on the first electrode 11 preferably extends to at least the same height as one end of the separator 13 or to the outside of one end.

However, when the insulation layer 14 covers the entire first uncoated portion 11a provided in the first electrode 11, since the first electrode 11 cannot function as an electrode, the insulation layer 14 should cover only a part of the first uncoated portion 11a provided in the first electrode 11. That is, the first uncoated portion 11a may have a shape that protrudes outward more than the insulation layer 14.

The insulation layer 14 may be an insulating coating layer or an insulating tape provided on the boundary region of the first uncoated portion 11a and the first coated portion 11b. However, the form of the insulation layer 14 is not limited thereto, and any form may be employed in the present disclosure as long as the insulation layer 14 can be attached to the first electrode 11 while securing insulation performance. Meanwhile, the insulation layer 14 may include, for example, an oil-based SBR binder and alumina oxide in order to secure insulation performance.

The insulation layer 14 may simultaneously cover at least a part of the first uncoated portion 11a and at least a part of the first coated portion 11b. For example, the insulation layer 14 may be provided on a boundary region of the first coated portion 11b and the first uncoated portion 11a. For example, the insulation layer 14 may cover at least a part of the sliding portion.

For example, the insulation layer 14 may extend to a point of about 0.3 mm to 5 mm from the boundary point between the first uncoated portion 11a and the first coated portion 11b in the entire area of the first uncoated portion 11a provided in the first electrode 11. More preferably, the insulation layer 14 may extend to a point of about 1.5 mm to 3 mm from the boundary point between the first uncoated portion 11a and the first coated portion 11b in the entire area of the first uncoated portion 11a provided in the first electrode 11.

If there is no insulation layer 14, since there is a possibility that an internal short circuit occurs due to the contact between the first electrode 11 and the second electrode 12, the insulation layer 14 is preferably is extended to a position where electrical contact between the first electrode 11 and the second electrode 12 does not occur.

Meanwhile, the insulation layer 14 may extend to a point of about 0.1 mm to 3 mm from the boundary point between the first uncoated portion 11a and the first coated portion 11b in the entire area of the first coated portion 11b provided in the first electrode 11. More preferably, the insulation layer 14 may extend to a point of about 0.2 mm to 0.5 mm from the boundary point between the first uncoated portion 11a and the first coated portion 11b in the entire area of the first coated portion 11b provided in the first electrode 11.

When the insulation layer 14 covers a part of the first coated portion 11b provided in the first electrode 11, a battery capacity loss occurs, and thus there is a need to minimize the length of the insulation layer 14 covering the coated portion. However, since the first coated portion 11b provided in the first electrode 11 has a possibility of contacting the second electrode 12, in order to prevent this problem, the insulation layer 14 must cover at least a part of the first coated portion 11b provided in the first electrode 11.

Referring to FIG. 7, the separator 13 may have a shape protruding outward more than the other end of the first electrode 11 and one end of the second electrode 12. One end means an upper end in the winding axis direction (direction parallel to the Z-axis) on the drawing, and the other end means a lower end in the winding axis direction (direction parallel to the Z-axis) on the drawing. Accordingly, the separator 13 may have a form of protruding outward more than the lower end of the first electrode 11 and protruding outward more than the upper end of the second electrode 12. Meanwhile, the separator 13 does not protrude beyond the upper end of the first electrode 11. This is for the upper end of the first electrode 11, that is, the first uncoated portion 11a, to function as an electrode tab of the first electrode 11 by itself. Similarly, the separator 13 does not protrude beyond the lower end of the second electrode 12. This is for the lower end of the second electrode 12, that is, the second uncoated portion 12a, to function as an electrode tab of the second electrode 12 by itself.

One end of the second electrode 12 facing the insulation layer 14 with the separator 13 interposed therebetween may have a shape that does not protrude outward more than one end of the separator 13. For example, referring to FIG. 7, the insulation layer 14 is provided at one end of the first electrode 11, and one end of the second electrode 12 facing the insulation layer 14 is located toward the inner side of the separator 13. Therefore, even if one end of the first electrode 11 protrudes to the outside of the separator 13, since one end of the second electrode 12 is located inside the separator 13, the possibility of contact between the first electrode 11 and the second electrode 12 is significantly reduced.

Referring to FIGS. 4 and 6, the battery housing BH is a substantially cylindrical container having an open portion formed at a lower end thereof, and is made of, for example, a conductive material such as metal. The material of the battery housing BH may be, for example, aluminum or steel. The bottom portion of the battery housing BH provided with an open portion will be referred to as an opened end. The side surface (outer circumference) and upper surface of the battery housing BH may be integrally formed. The upper surface (parallel to the X-Y plane) of the battery housing BH has a substantially flat shape. The upper surface located on the opposite side of the opened end is referred to as a closed end. The battery housing BH accommodates the electrode assembly A through the open portion formed at a lower side, and also accommodates an electrolyte together.

The battery housing BH is electrically connected to the electrode assembly A. The battery housing BH may be electrically connected to one of the first electrode 11 and the second electrode 12. For example, the battery housing may be electrically connected to the second electrode 12 of the electrode assembly A. In this case, the battery housing BH may have the same polarity as the second electrode 12.

Referring to FIG. 5, the battery housing BH may include a beading portion 23 and a crimping portion 24 formed at a lower end thereof. The beading portion 23 is located in the lower portion of the electrode assembly A. The beading portion 23 is formed by press-fitting the periphery of the outer circumference of the battery housing BH. The beading portion 23 prevents the electrode assembly A, which may have a size approximately corresponding to the width of the battery housing BH, from escaping through the open portion formed at the lower end of the battery housing BH, and functions as a support on which the sealing body 40 is seated.

The crimping portion 24 is formed below the beading portion 23. The crimping portion 24 has an extended and bent shape to surround the outer circumference of the sealing body 40 disposed below the beading portion 23 and a part of the lower surface of the sealing body 40.

However, the present disclosure does not exclude the case where the battery housing BH does not include the beading portion 23 and/or the crimping portion 24. That is, in the present disclosure, when the battery housing BH does not include the beading portion 23 and/or the crimping portion 24, the electrode assembly A may be fixed and/or the battery housing BH may be sealed by, for example, additionally applying a component that may function as a stopper for the electrode assembly A. In addition, if the cylindrical battery 1 of the present disclosure includes the sealing body 40, the electrode assembly A may be fixed and/or the battery housing BH may be sealed by, for example, additionally applying a structure on which the sealing body 40 may be seated and/or welding the battery housing BH and the sealing body 40 to each other. That is, the sealing body may seal the opened end of the battery housing.

Referring to FIG. 5, the sealing body 40 may be made of, for example, a metal material to secure rigidity. The sealing body 40 may cover the opened end formed at the lower end of the battery housing BH. That is, the sealing body 40 forms the lower surface of the cylindrical battery 1. In the cylindrical battery 1 of the present disclosure, the sealing body 40 does not have polarity even when it is made of a metal material having conductivity. Not having polarity may mean that the sealing body 40 is electrically insulated from the battery housing BH and the terminal 50. Accordingly, the sealing body 40 may not function as the positive electrode terminal E1 or the negative electrode terminal E. Accordingly, the sealing body 40 need not be electrically connected to the electrode assembly A and the battery housing BH, and the material does not necessarily have to be a conductive metal.

When the battery housing BH of the present disclosure includes the beading portion 23, the sealing body 40 may be seated on the beading portion 23 formed in the battery housing BH. In addition, when the battery housing BH of the present disclosure includes the crimping portion 24, the sealing body 40 may be fixed by the crimping portion 24. A sealing gasket 39 may be interposed between the sealing body 40 and the crimping portion 24 of the battery housing BH to ensure airtightness of the battery housing BH. Meanwhile, as described above, the battery housing BH of the present disclosure may not include the beading portion 23 and/or the crimping portion 24, and in this case, the sealing gasket 39 may be interposed between a fixing structure provided on the open portion of the battery housing BH and the sealing body 40 to secure the airtightness of the battery housing BH.

Referring to FIGS. 4 and 5, the terminal 50 may be electrically connected to another one of the first electrode 11 and the second electrode 12. That is, the terminal 50 may have a polarity opposite to that of the battery housing BH. For example, the terminal 50 may be electrically connected to the first electrode 11 of the electrode assembly A. Also, the surface of the terminal 50 may be exposed to the outside.

The terminal 50 is made of a conductive metal material. The terminal 50 may pass through approximately the center of the closed end formed on the top of the battery housing BH, for example. A part of the terminal 50 may be exposed to the upper part of the battery housing BH, and the remaining part may be located inside the battery housing BH. The terminal 50 may be fixed on the inner surface of the closed end of the battery housing BH by, for example, riveting. The terminal 50 may pass through the insulator 37 and be coupled with the first current collecting plate 36 or the uncoated portion 11a provided in the first electrode 11. In this case, the terminal 50 may have first polarity. Accordingly, the terminal 50 may function as a first electrode terminal E1 in the cylindrical battery 1 of the present disclosure. When the terminal 50 has the first polarity as above, the terminal 50 is electrically insulated from the battery housing BH having the second polarity. Electrical isolation between the terminal 50 and the battery housing BH may be realized in various ways. For example, the electric insulation may be realized by interposing an insulating gasket 35, explained later, between the terminal 50 and the battery housing BH. Alternatively, the insulation may be realized by forming an insulating coating layer on a part of the terminal 50. Alternatively, a method of structurally firmly fixing the terminal 50 may be applied so that contact between the terminal 50 and the battery housing BH is impossible. Alternatively, several methods among the methods described above may be applied together.

Referring to FIG. 5, the first current collecting plate 36 may be coupled to an upper portion of the electrode assembly A. For example, the first current collecting plate 36 may be coupled to the first uncoated portion 11a provided in the first electrode 11 at the upper portion of the electrode assembly A. The first current collecting plate 36 may be made of a conductive metal material. Although not shown in the drawing, the first current collecting plate 36 may include a plurality of irregularities radially formed on its lower surface. When the irregularities are formed, the irregularities may be press-fitted into the first uncoated portion 11a provided in the first electrode 11 by pressing the first current collecting plate 36.

A cylindrical battery 1 according to another embodiment of the present disclosure may not include the first current collecting plate 36. In this case, the first uncoated portion 11a provided in the first electrode 11 may be directly electrically connected to the terminal 50.

Referring to FIG. 5, the first current collecting plate 36 may be coupled to an end of the first uncoated portion 11a provided in the first electrode 11. The first uncoated portion 11a provided in the first electrode 11 and the first current collecting plate 36 may be coupled by, for example, laser welding. The laser welding may be performed by partially melting the base material of the first current collecting plate 36 or may be performed in a state where a solder for welding is interposed between the first current collecting plate 36 and the first uncoated portion 11a. In this case, the solder preferably has a lower melting point compared to the first current collecting plate 36 and the first uncoated portion 11a. Meanwhile, in addition to laser welding, resistance welding, ultrasonic welding, or the like may be used, but the welding method is not limited thereto.

Figure 8:
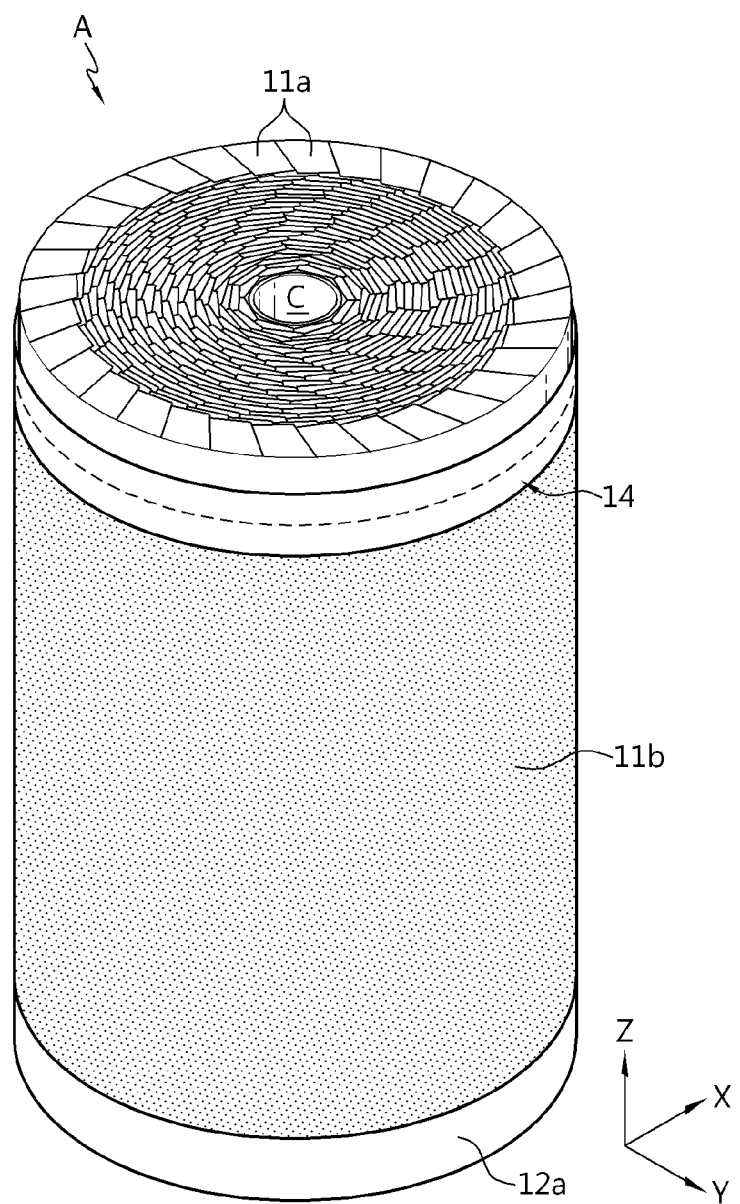
FIG. 8 is a perspective view showing the appearance of an electrode assembly according to another embodiment of the present disclosure.

Referring to FIG. 8, the first current collecting plate 36 may be coupled to a bent surface formed by bending an end of the first uncoated portion 11a provided in the first electrode 11 in a direction parallel to the first current collecting plate 36. A bending direction of the first uncoated portion 11a may be, for example, a direction toward the winding center C of the electrode assembly A. When the first uncoated portion 11a has a bent shape as above, the space occupied by the first uncoated portion 11a may be reduced, resulting in an improvement in energy density. In addition, due to an increase in the coupling area between the first uncoated portion 11a and the first current collecting plate 36, the coupling strength may be improved and resistance may be reduced.

Referring to FIG. 5, the insulator 37 may be provided between the top of the electrode assembly A and the inner surface of the battery housing BH or between the first current collecting plate 36 coupled to the upper portion of the electrode assembly A and the inner surface of the battery housing BH. The insulator 37 prevents contact between the first uncoated portion 11a provided in the first electrode 11 and the battery housing BH and/or contact between the first current collecting plate 36 and the battery housing BH. That is, the insulator 37 is accommodated inside the battery housing BH and is configured to block electrical connection between the first uncoated portion 11a provided in the first electrode 11 and the battery housing BH. Accordingly, the insulator 37 may be made of a material having insulating performance. For example, the insulator 37 may include a polymeric material.

Referring to FIGS. 4 and 5, the insulating gasket 35 is interposed between the battery housing BH and the terminal 50 to prevent contact between the battery housing BH and the terminal 50 having opposite polarities. That is, the insulating gasket 35 blocks electrical connection between the battery housing BH and the terminal 50. As a result, the upper surface of the battery housing BH having a substantially flat shape may function as a second electrode terminal E2 of the cylindrical battery 1.

Referring to FIG. 5, the second current collecting plate 38 may be coupled to the lower portion of the electrode assembly A. The second current collecting plate 38 may be made of a conductive metal material. The second current collecting plate 38 may be connected to the second uncoated portion 12a provided in the second electrode 12. In addition, the second current collecting plate 38 may be electrically connected to the battery housing BH. As shown in FIG. 5, the second current collecting plate 38 may be interposed and fixed between the inner surface of the battery housing BH and the sealing gasket 39. Alternatively, the second current collecting plate 38 may be welded to the inner wall of the battery housing BH.

Although not shown in the drawings, the second current collecting plate 38 may include a plurality of irregularities radially formed on one surface thereof. When the irregularities are formed, the second current collecting plate 38 may be pressed so that the irregularities are press-fitted into the second uncoated portion 12a provided in the second electrode 12.

Referring to FIG. 5, the second current collecting plate 38 is coupled to an end of the second uncoated portion 12a provided in the second electrode 12. The coupling between the second uncoated portion 12a of the second electrode 12 and the second current collecting plate 38 may be performed by, for example, laser welding. The laser welding may be performed by partially melting the base material of the second current collecting plate 38 or by interposing a solder for welding between the second current collecting plate 38 and the second uncoated portion 12a. In this case, the solder preferably has a lower melting point compared to the second current collecting plate 38 and the second uncoated portion 12a. Meanwhile, in addition to laser welding, resistance welding, ultrasonic welding, or the like may be used, but the welding method is not limited thereto.

Similar to FIG. 8, the second current collecting plate 38 may be coupled to a coupling surface formed by bending an end of the second uncoated portion 12a provided in the second electrode 12 in a direction parallel to the second current collecting plate 38. The bending direction of the second uncoated portion 12a provided in the second electrode 12 may be, for example, a direction toward the winding center C of the electrode assembly A. When the second uncoated portion 12a provided in the second electrode 12 has such a bent shape, the space occupied by the second uncoated portion 12a may be reduced, resulting in an improvement in energy density. In addition, due to the increase in the coupling area between the second uncoated portion 12a and the second current collecting plate 38, coupling strength may be improved and resistance may be reduced.

Referring to FIG. 5, the sealing gasket 39 may have a substantially ring shape surrounding the sealing body 40. The sealing gasket 39 may cover the lower surface, the upper surface, and the side surface of the sealing body 40 at the same time. A radial length of a region of the sealing gasket 39 covering the upper surface of the sealing body 40 may be smaller than or equal to a radial length of a region of the sealing gasket 39 covering the lower surface of the sealing body 40. If the radial length of the region of the sealing gasket 39 covering the upper surface of the sealing body 40 is too long, in the sizing process for vertically compressing the battery housing BH, there is a possibility that the sealing gasket 39 pressurizes the second current collecting plate 38 so that the second current collecting plate 38 is damaged or the battery housing BH is damaged. Accordingly, it is necessary to keep the radial length of the region of the sealing gasket 39 covering the upper surface of the sealing body 40 to be small at a certain level.

The electrode assembly A according to the embodiment of FIG. 8 is similar to the electrode assembly A of the embodiment of FIG. 7, so features substantially identical or similar to those of the former embodiment will not be described in detail, and hereinafter, features different from those of the former embodiment will be described in detail.

Referring to FIG. 8, the electrode assembly A according to another embodiment of the present disclosure may have a structure in which at least a part of the first and second uncoated portions 11a, 12a is bent toward the core. For example, referring to FIG. 8, at least a part of the first and second uncoated portions 11a, 12a may be divided into a plurality of segments. Here, the plurality of segments may have a multi-layered overlapping structure while being bent toward the core. For example, a plurality of segments may be formed by laser notching. The segment may be formed by a known metal foil cutting process such as ultrasonic cutting or punching.

In order to prevent damage to the active material layer and/or the insulation layer 14 when bending the first and second uncoated portions 11a, 12a, it is preferable to leave a predetermined gap between the lower end of the cutting line between the segments and the active material layer. This is because stress is concentrated near the lower end of the cutting line when the first and second uncoated portions 11a, 12a are bent. The gap is preferably 0.2 mm to 4 mm. When the gap is adjusted to the corresponding numerical range, it is possible to prevent damage to the active material layer and/or the insulation layer 14 near the lower end of the cutting line due to stress generated when bending the first and second uncoated portions 11a, 12a. In addition, the gap may prevent damage to the active material layer and/or the insulation layer 14 due to tolerances when notching or cutting the segments.

The bending direction of the first and second uncoated portions 11a, 12a may be, for example, toward the winding center C of the electrode assembly A. When the first and second uncoated portions 11a, 12a have such a bent shape, the space occupied by the uncoated portions 11a, 12a is reduced, resulting in an improvement in energy density. In addition, due to the increase in the coupling area between the first and second uncoated portions 11a, 12a and the first and second current collecting plates 36, 38, coupling strength may be improved and resistance may be reduced.

Figure 9:
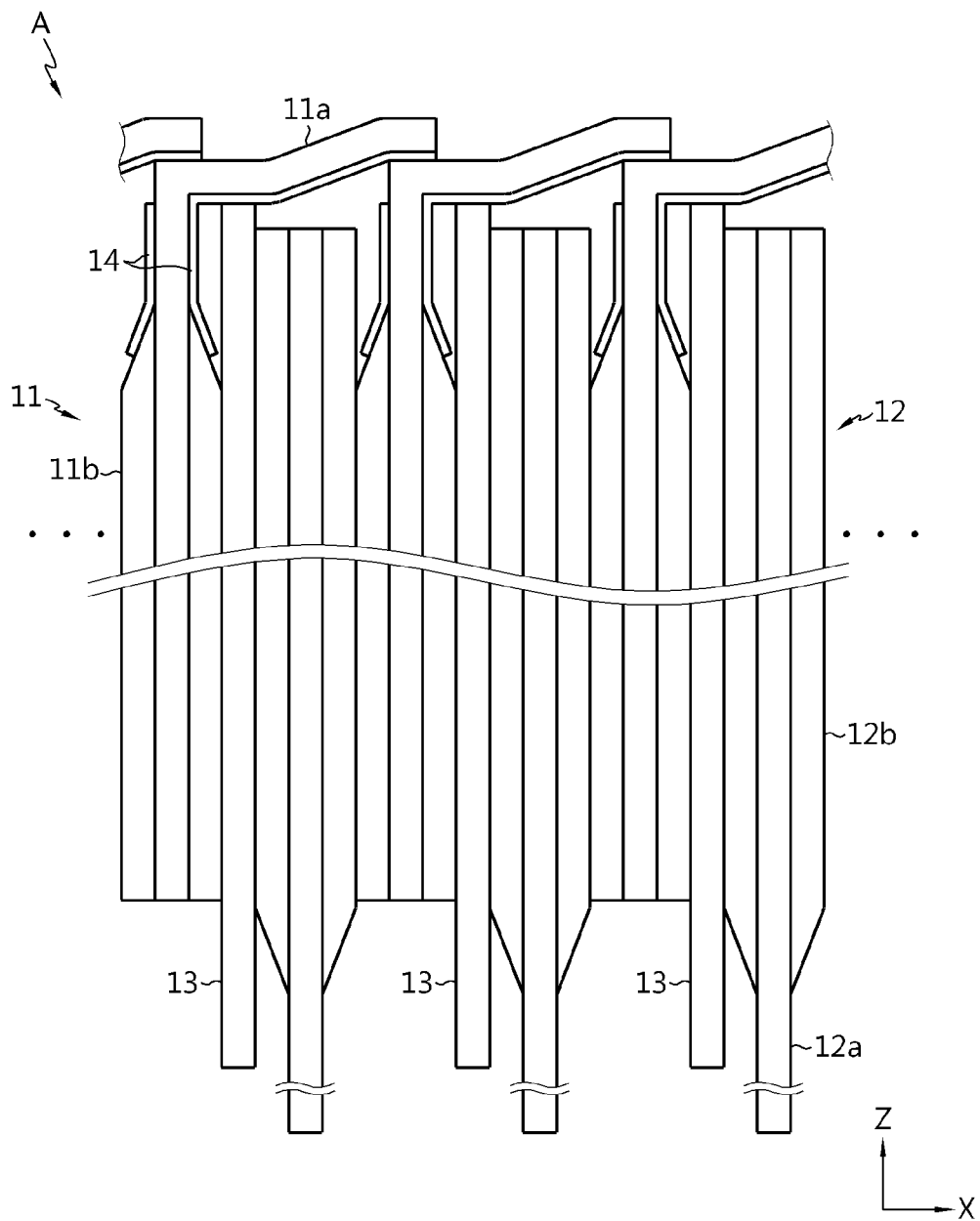
FIG. 9 is a diagram showing a part of the longitudinal cross-sectional view of the electrode assembly of FIG. 8.

Referring to FIGS. 8 and 9, the first uncoated portion 11a provided in the first electrode 11 may be bent in one direction. For example, +X direction in FIG. 9 may be a direction toward the core. When the first uncoated portion 11a is bent toward the core as above, the first uncoated portion 11a of the first electrode 11 may pass over the separator 13 and come closer to the second electrode 12. Therefore, the insulation layer 14 may extend to the end of the first uncoated portion 11a or a location near the end on the surface facing the core among both surfaces of the first uncoated portion 11a provided in the first electrode 11. According to this structure, even if the first uncoated portion 11a is bent toward the core and approaches the second electrode 12 beyond the separator 13, electrical contact between the first electrode 11 and the second electrode 12 may be prevented. Therefore, an internal short circuit of the cylindrical battery 1 may be effectively prevented.

Referring to FIG. 9, the insulation layer 14 may be provided only in a partial area on a surface opposite to the surface facing the core, among both surfaces of the first uncoated portion 11a. That is, the first uncoated portion 11a may be exposed to the outside in a remaining partial area of the surface opposite to the surface facing the core, among both surfaces of the first uncoated portion 11a. Therefore, it is possible to electrically contact the first uncoated portion 11a provided in the adjacent first electrode 11 or the first current collecting plate 36 through the exposed uncoated portion 11a on the opposite surface of the surface facing the core. That is, the first uncoated portion 11a may be electrically coupled to the first current collecting plate 36 in an area not covered by the insulation layer 14 among the entire area of the first uncoated portion 11a. Furthermore, the first uncoated portion 11a may be coupled to the first current collecting plate 36 by welding in an area not covered by the insulation layer 14 among the entire area of the first uncoated portion 11a. The welding may be, for example, laser welding. The laser welding may be performed by partially melting the base material of the first current collecting plate 36 or may be performed in a state where a solder for welding is interposed between the first current collecting plate 36 and the first uncoated portion 11a. In this case, the solder preferably has a lower melting point compared to the first current collecting plate 36 and the first uncoated portion 11a. Meanwhile, resistance welding, ultrasonic welding, or the like is available, in addition to laser welding, but the welding method is not limited thereto.

Figure 10A:
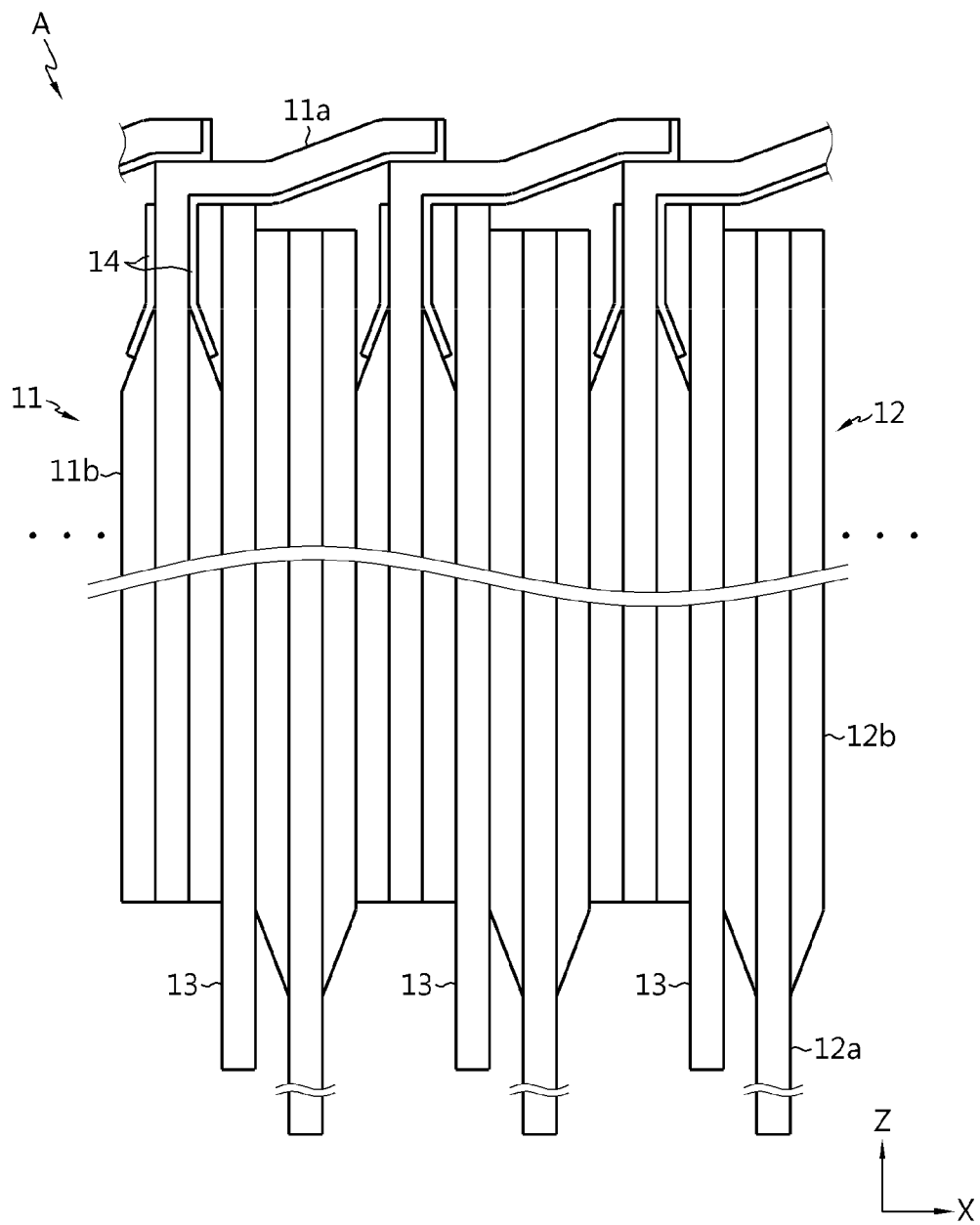
FIGS. 10a and 10b are diagrams showing modified examples of the electrode assembly of FIG. 9.

Referring to FIG. 10a, the insulation layer 14 may have a shape surrounding an end of the first uncoated portion 11a. Specifically, the insulation layer 14 may have a structure surrounding an end surface of the first uncoated portion 11a. For example, when the length of the bent uncoated portion 11a is long, the possibility of contact with the second electrode 12 increases. Furthermore, there is a possibility that the bent uncoated portion 11a is further bent by movement or external pressure. At this time, the possibility that the end surface of the first uncoated portion 11a contacts the second electrode 12 increases. However, according to the above structure of the present disclosure, even if the first uncoated portion 11a is further bent or deformed, since the insulation layer 14 covers even the end surface of the first uncoated portion 11a, electrical contact between the first electrode 11 and the second electrode 12 may be prevented.

Figure 10B:
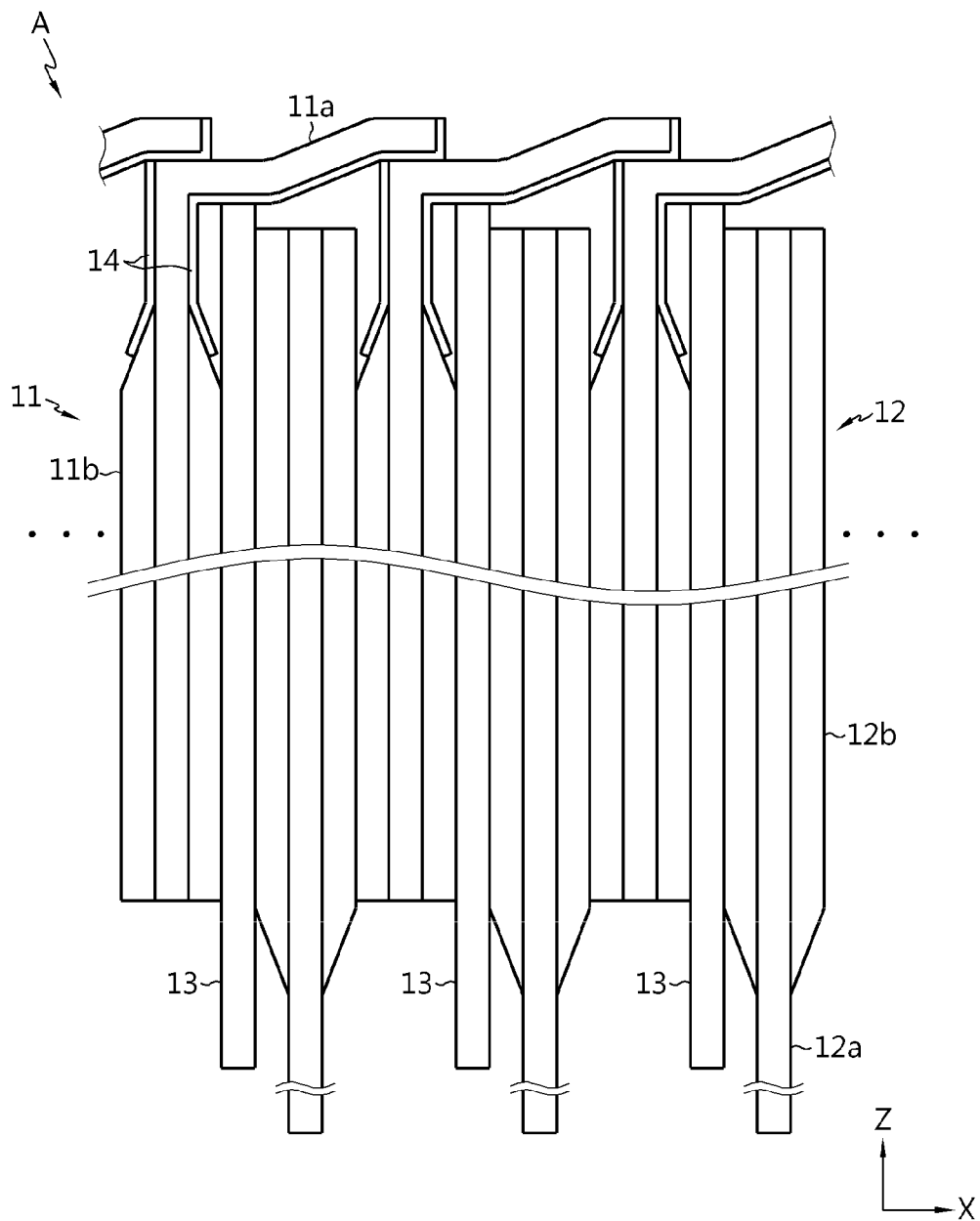

Referring to FIG. 10b, the insulation layer 14 may extend to a bending point of the first uncoated portion 11a on a surface opposite to the surface facing the core, among both surfaces of the first uncoated portion 11a. Another separator 13 and another second electrode 12 are located to the left of the first electrode 11. That is, the first electrode 11 has the possibility of electrically contacting the second electrode 12 located at the left of the first electrode 11 as well as the second electrode 12 located at the right of the first electrode 11. However, according to the above structure of the present disclosure, it is possible to surely prevent the first electrode 11 from electrically contacting the second electrodes 12 located at both sides.

Figure 11:
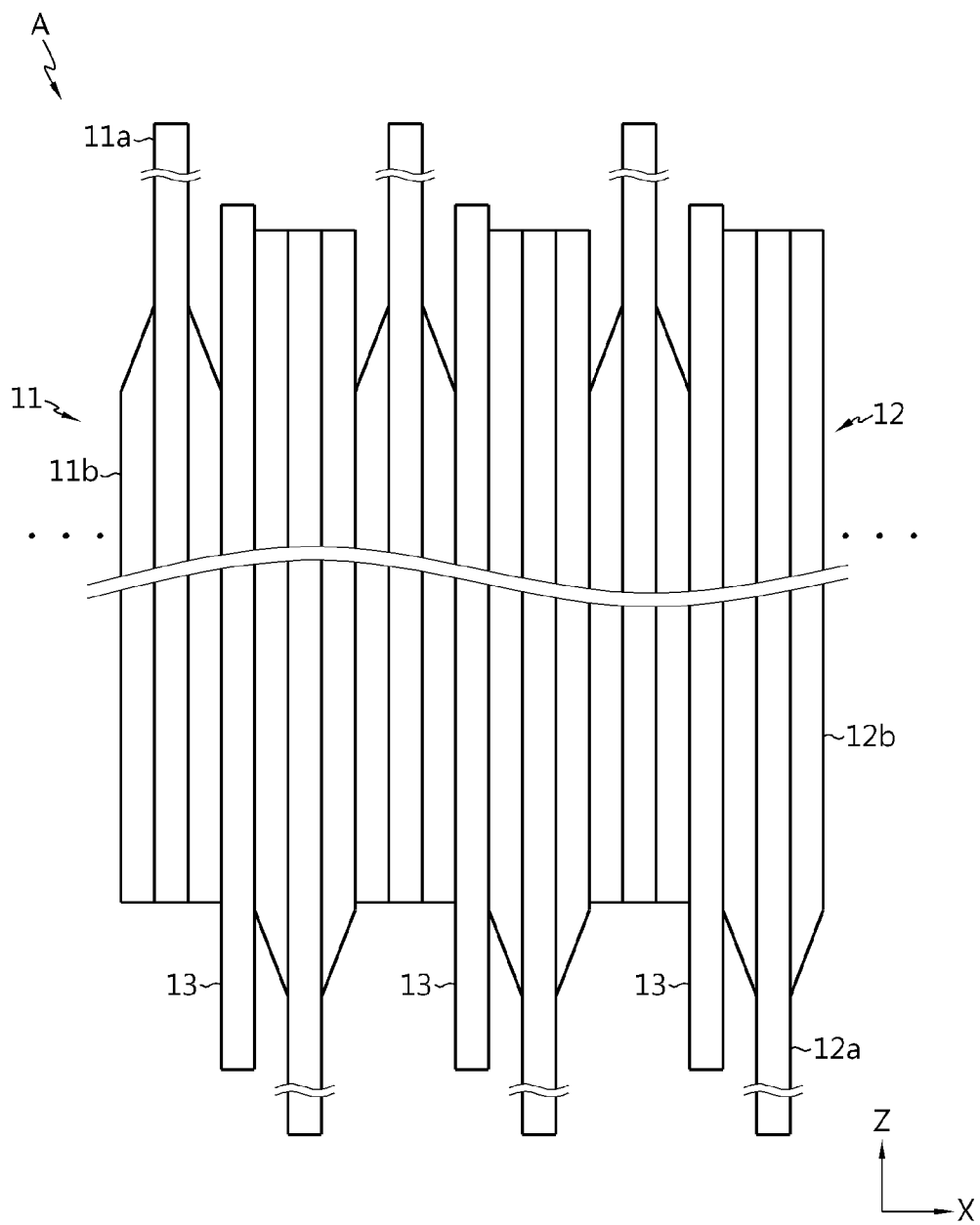
FIG. 11 is a diagram showing the structure of a conventional electrode assembly (comparative example).

FIG. 11 is a diagram showing a cross-section of an electrode assembly A without an insulation layer 14, as a comparative example of the present disclosure. Referring to FIG. 11, a separate insulation layer 14 is not provided in the boundary region of the first uncoated portion 11a and the first coated portion 11b of the first electrode 11. According to this structure, when movement occurs due to meandering of the first electrode 11 or the second electrode 12, the second electrode 12 may be located even at the end of the separator 13 or the second electrode 12 may protrude outward more than the end of the separator 13, which may cause electrical contact between the first electrode 11 and the second electrode 12. Alternatively, if the separator 13 is damaged for some reason, electrical contact between the first electrode 11 and the second electrode 12 may occur. In this case, in the electrode assembly A having the structure shown in FIG. 11, the occurrence of an internal short circuit cannot be avoided due to electrical contact between the first electrode 11 and the second electrode 12. Therefore, the risk of ignition increases.

FIG. 12 is a graph showing power distribution in several short-circuit cases inside the cylindrical battery 1. Referring to FIG. 12, four short circuit cases that may occur inside the cylindrical battery 1 may be assumed as follows.

(i) The case where the coated portion provided in the positive electrode and the coated portion provided in the negative electrode are in electrical contact, (ii) the case where the coated portion provided in the positive electrode and the uncoated portion provided in the negative electrode are in electrical contact, (iii) the case where the coated portion provided in the negative electrode and the uncoated portion provided in the positive electrode electrically contact each other, and (iv) the case where the uncoated portion provided in the positive electrode and the uncoated portion provided in the negative electrode are in electrical contact.

Referring to FIG. 12, it may be found that the power is highest in the case (iii) where the coated portion provided in the negative electrode and the uncoated portion provided in the positive electrode are in electrical contact. That is, in the case (iii) where the coated portion provided in the negative electrode and the uncoated portion provided in the positive electrode are in electrical contact, the possibility of occurrence of ignition was very high. This is because the resistance is very low and the short-circuit current is large, resulting in a rapid rise in temperature.

Therefore, considering the structure of the electrode assembly A of the present disclosure, it is requested to seek a structure capable of preventing electrical contact between the coated portion provided in the negative electrode and the uncoated portion provided in the positive electrode.

As a result of reviewing this task, the inventors have completed the present disclosure after deriving the fact that if the insulation layer 14 is provided on at least a partial region of the uncoated portion provided in the positive electrode, electrical contact with the coated portion provided in the negative electrode may be effectively prevented. That is, the first electrode 11 may be a positive electrode. However, the first electrode 11 is not necessarily limited to a positive electrode and may also be a negative electrode. In addition, in the present disclosure, it is not excluded that the second electrode 12 is provided with an insulation layer 14. That is, the insulation layer 14 may be provided to both the positive electrode and the negative electrode. In this case, all possible short-circuit cases can be prevented.

Preferably, the cylindrical battery may be, for example, a battery whose form factor ratio (defined as a value obtained by dividing the diameter of the battery by height, namely a ratio of height (H) to diameter (D)) is greater than about 0.4.

Here, the form factor means a value indicating the diameter and height of a cylindrical battery. The form factor of the cylindrical battery according to an embodiment of the present disclosure may be, for example, 46110 battery, 4875 battery, 48110 battery, 4880 battery, or 4680 battery. In the numerical value representing the form factor, first two numbers indicate the diameter of the battery and the remaining numbers indicate the height of the battery.

A battery according to an embodiment of the present disclosure may be a battery having an approximately cylindrical shape, whose diameter is approximately 46 mm, height is approximately 110 mm, and form factor ratio is 0.418.

A battery according to another embodiment may be a battery having a substantially cylindrical shape, whose diameter is about 48 mm, height is about 75 mm, and form factor ratio is 0.640.

A battery according to still another embodiment may be a battery having an approximately cylindrical shape, whose diameter is approximately 48 mm, height is approximately 110 mm, and form factor ratio is 0.436.

A battery according to still another embodiment may be a battery having an approximately cylindrical shape, whose diameter is approximately 48 mm, height is approximately 80 mm, and form factor ratio is 0.600.

A battery according to still another embodiment may be a battery having an approximately cylindrical shape, whose diameter is approximately 46 mm, height is approximately 80 mm, and form factor ratio is 0.575.

Conventionally, batteries having a form factor ratio of about 0.4 or less have been used. That is, conventionally, for example, 1865 battery, 2170 battery, etc. were used. The 1865 battery has a diameter of approximately 18 mm, height of approximately 65 mm, and a form factor ratio of 0.277. The 2170 battery has a diameter of approximately 21 mm, a height of approximately 70 mm, and a form factor ratio of 0.300.

The cylindrical battery according to the above embodiment may be used to manufacture a battery pack.

Figure 13A:
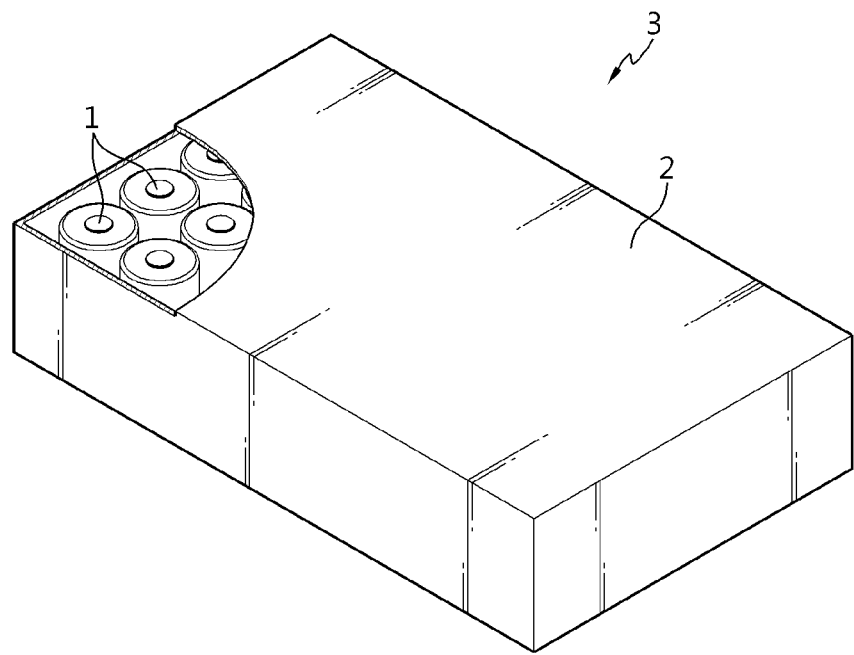
FIG. 13a is a schematic view showing a battery pack including the cylindrical battery according to an embodiment of the present disclosure.

FIG. 13a is a schematic view showing the configuration of a battery pack according to an embodiment of the present disclosure.

Referring to FIG. 13a, the battery pack 3 according to an embodiment of the present disclosure includes an assembly to which the cylindrical batteries 1 are electrically connected and a pack housing 2 for accommodating the assembly. The cylindrical battery 1 may be a battery according to the above embodiment. In the drawing, for convenience of illustration, components such as a bus bar for electrically connecting the cylindrical batteries 1, a cooling unit, and an external terminal are omitted.

The battery pack 3 may be mounted in a vehicle. The vehicle may be, for example, an electric vehicle, a hybrid electric vehicle, or a plug-in hybrid vehicle. The vehicle includes a 4-wheeled vehicle or a 2-wheeled vehicle.

Figure 13B:
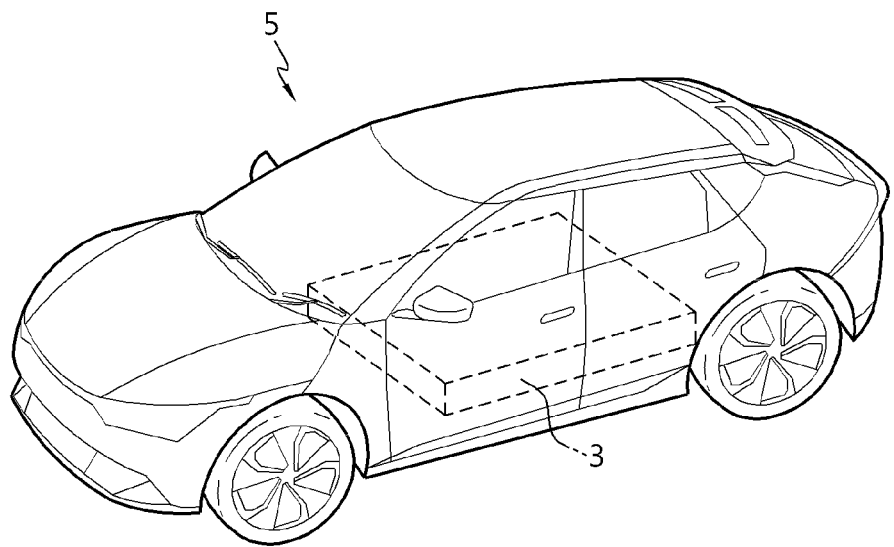

FIG. 13b is a diagram schematically showing a vehicle including the battery pack 3 of FIG. 13a.

Referring to FIG. 13b, the vehicle 5 according to an embodiment of the present disclosure includes the battery pack 3 according to an embodiment of the present disclosure. The vehicle 5 operates by receiving power from the battery pack 3 according to an embodiment of the present disclosure.

In the present disclosure, the uncoated portion of the electrode may have various structures. In addition, when the uncoated portion is divided into a plurality of segments along the winding direction, the position of an end of the separator in the winding axis direction may be set in association with the structure of the segments in consideration of impregnability of the electrolyte. Hereinafter, various structures of the electrode and embodiments related to positioning of the separator will be described in detail.

Figure 14:
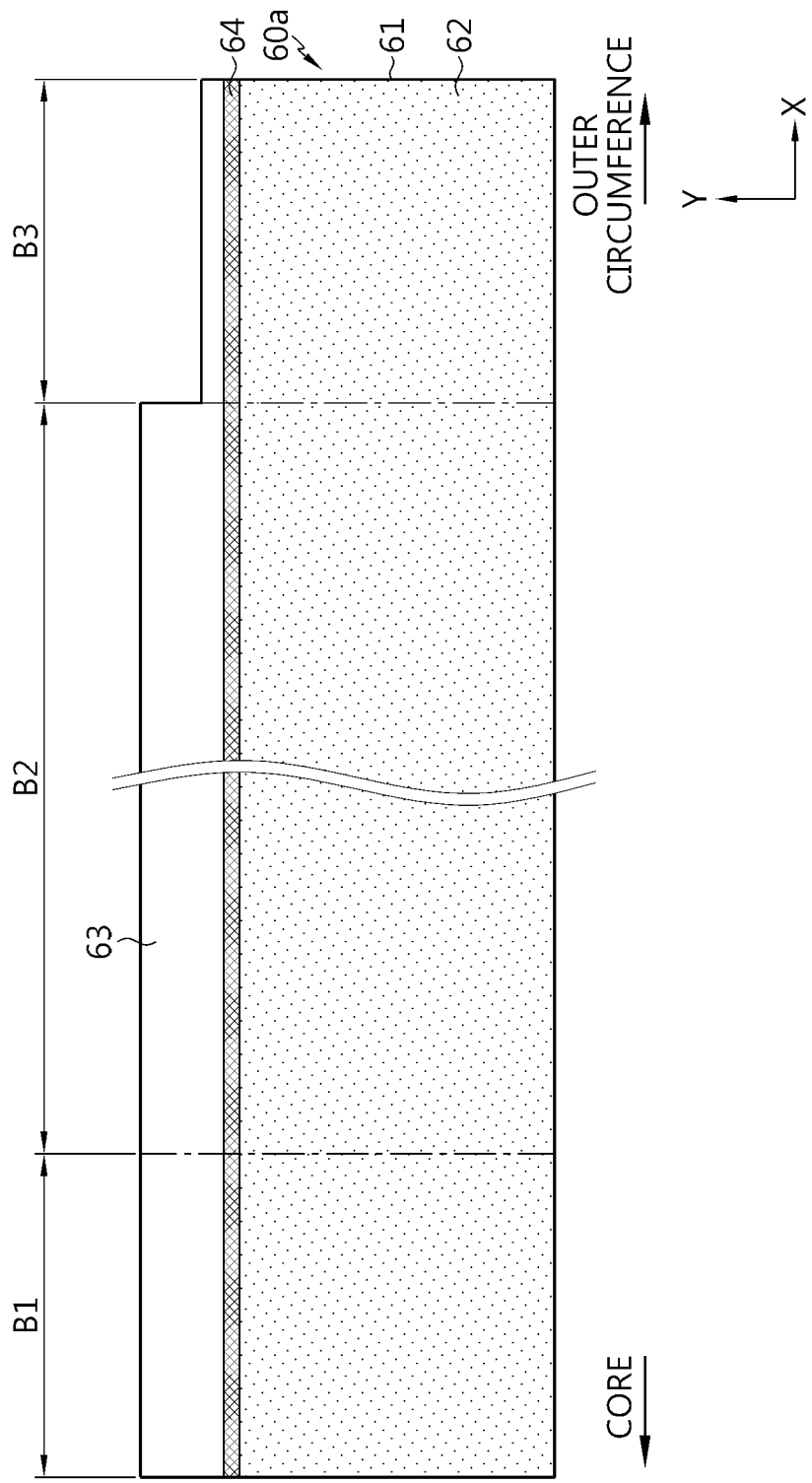
FIG. 14 is a plan view showing the structure of an electrode according to the first embodiment of the present disclosure.

FIG. 14 is a plan view showing the structure of an electrode 60a according to the first embodiment of the present disclosure.

Referring to FIG. 14, the electrode 60a of the first embodiment includes a current collector 61 made of a metal foil and an active material layer 62. The metal foil may be aluminum or copper, and is appropriately selected according to the polarity of the electrode 60a. The active material layer 62 is formed on at least one surface of the current collector 61 and includes an uncoated portion 63 at the long side end in the winding direction X. The uncoated portion 63 is a region that is not coated with an active material. An insulating coating layer 64 may be formed at a boundary between the active material layer 62 and the uncoated portion 63. At least a part of the insulating coating layer 64 is formed to overlap with the boundary between the active material layer 62 and the uncoated portion 63. The insulating coating layer 64 may include a polymer resin and may include an inorganic filler such as $Al_2O_3$.

The uncoated portion 63 includes a core-side uncoated portion B1 adjacent to the core of the electrode assembly, an outer circumference uncoated portion B3 adjacent to the outer circumference of the electrode assembly, and an intermediate uncoated portion B2 interposed between the core-side uncoated portion B1 and the outer circumference uncoated portion B3.

The core-side uncoated portion B1, the outer circumference uncoated portion B3, and the intermediate uncoated portion B3 may be defined as an uncoated portion of a region adjacent to the core, an uncoated portion of a region adjacent to the outer circumference, and an uncoated portion of the other region excluding them, respectively, when the electrode 60a is wound into a jelly-roll type electrode assembly. The boundary of B1/B2 may be appropriately defined as a point at which the height (or change pattern) of the uncoated portion substantially changes as it goes from the core of the electrode assembly to the outer circumference, or a point of a predetermined % based on the radius of the electrode assembly (e.g., 5%, 10%, or 15% point of the radius). The boundary of B2/B3 may be appropriately defined as a point at which the height (or change pattern) of the uncoated portion substantially changes as it goes from the outer circumference of the electrode assembly to the core, or a point of a predetermined % based on the radius of the electrode assembly (e.g., 85%, 90%, or 95% point of the radius). When the boundary of B1/B2 and the boundary of B2/B3 are specified, the intermediate uncoated portion B2 may be specified automatically. If only the boundary of B1/B2 is specified, the boundary of B2/B3 may be appropriately selected at a point near the outer circumference of the electrode assembly. Conversely, when only the boundary of B2/B3 is specified, the boundary of B1/B2 may be appropriately selected at a point near the core of the electrode assembly. In the first embodiment, the height of the uncoated portion 63 is not constant and has a relative difference in the winding direction X. That is, the height (length in the Y-axis direction) of the outer circumference uncoated portion B3 is relatively smaller than the height of the core-side uncoated portion B1 and the intermediate uncoated portion B2.

Figure 15:
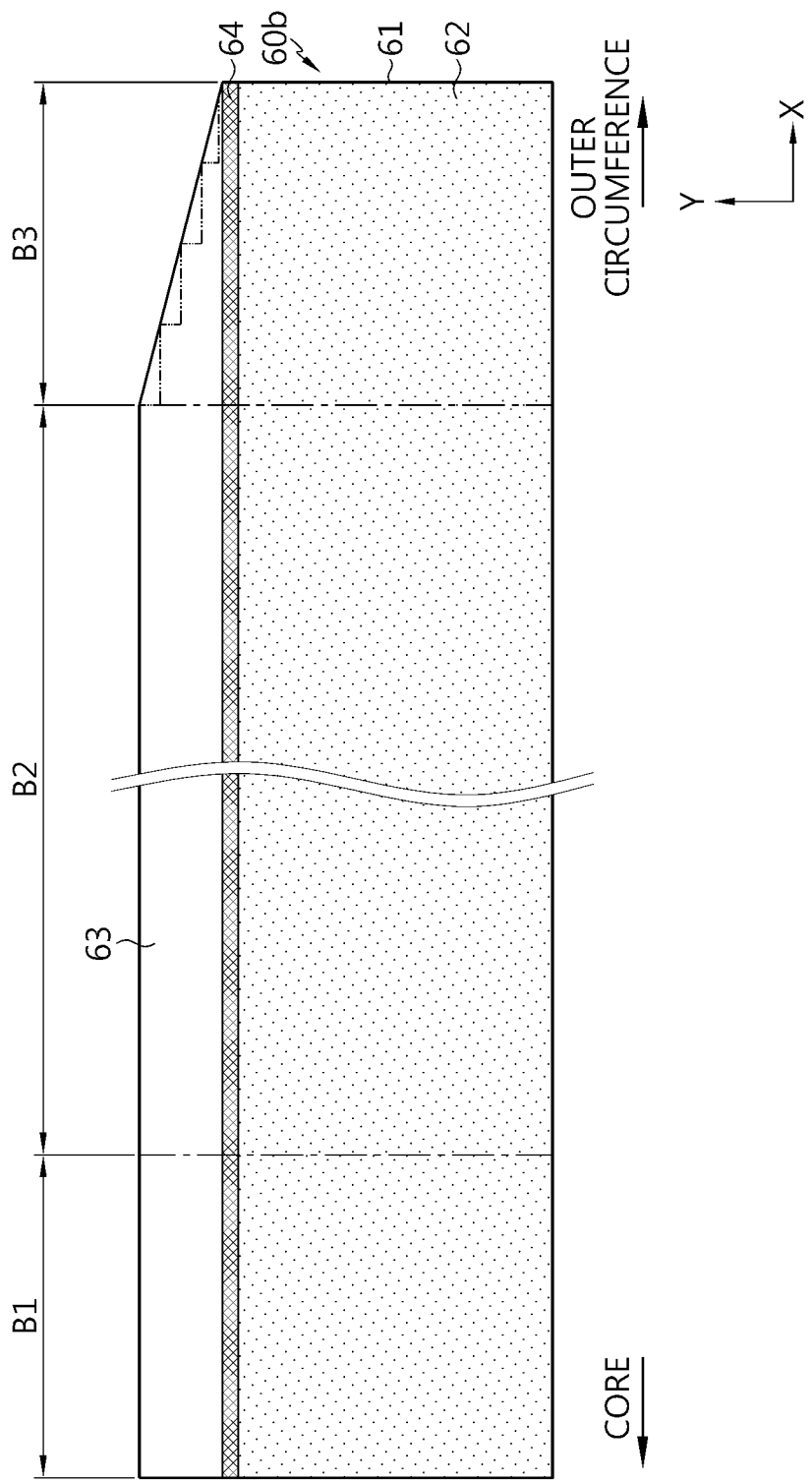
FIG. 15 is a plan view showing the structure of an electrode according to the second embodiment of the present disclosure.

FIG. 15 is a plan view showing the structure of an electrode 60b according to the second embodiment of the present disclosure.

Referring to FIG. 15, the electrode 60b of the second embodiment is substantially identical to the first embodiment, except that the height of the outer circumference uncoated portion B3 gradually decreases toward the outer circumference.

In one modification, the outer circumference uncoated portion B3 may be modified into a step shape (see dotted line) in which the height decreases stepwise.

Figure 16:
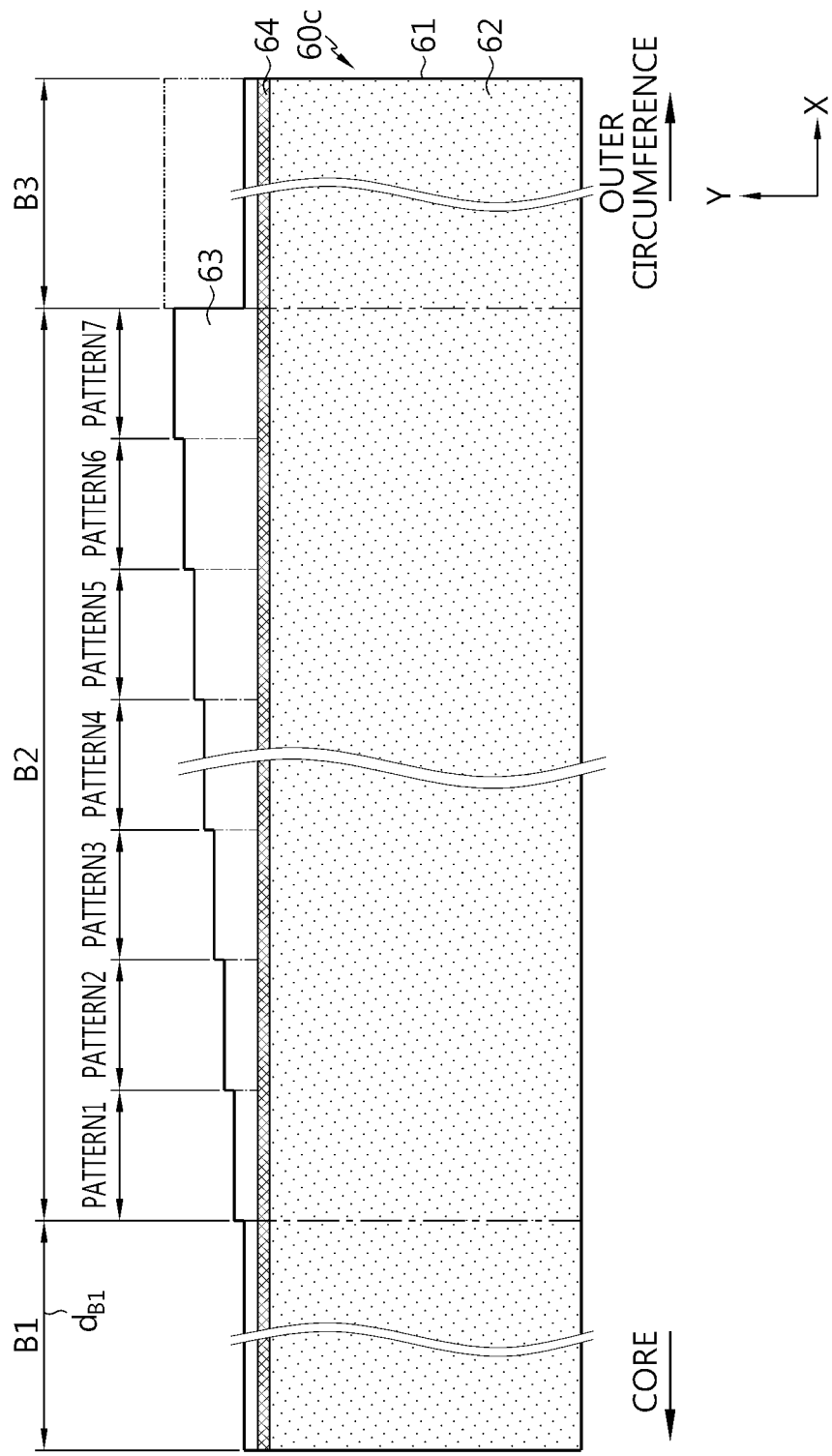
FIG. 16 is a plan view showing the structure of an electrode according to the third embodiment of the present disclosure.

FIG. 16 is a plan view showing the structure of an electrode 60c according to the third embodiment of the present disclosure.

Referring to FIG. 16, in the electrode 60c of the third embodiment, the heights of the core-side uncoated portion B1 and the outer circumference uncoated portion B3 are relatively smaller than the height of the intermediate uncoated portion B2. Also, the heights of the core-side uncoated portion B1 and the outer circumference uncoated portion B3 may be the same or different.

Preferably, the height of the intermediate uncoated portion B2 may have a step shape gradually increasing from the core toward the outer circumference.

Patterns 1 to 7 classify the intermediate uncoated portion B2 based on the position where the height of the uncoated portion 63 changes. Preferably, the number of patterns and the height (length in the Y-axis direction) and width (length in the X-axis direction) of each pattern may be adjusted to distribute stress to the maximum during bending of the uncoated portion 63. The stress distribution is to prevent tearing of the uncoated portion 63.

The width ($d_{B1}$) of the core-side uncoated portion B1 is designed under the condition that the cavity of the core of the electrode assembly is not covered when the patterns of the intermediate uncoated portion B2 are bent to the core.

In one example, the width ($d_{B1}$) of the core-side uncoated portion B1 may increase in proportion to the bending length of Pattern 1. The bending length corresponds to the height of the pattern based on the bending point of the pattern.

In a specific example, when the electrode 60c is used to manufacture an electrode assembly of a cylindrical battery having a form factor of 4680, the width ($d_{B1}$) of the core-side uncoated portion B1 may be set to 180 mm to 350 mm depending on the diameter of the core of the electrode assembly.

In one embodiment, the width of each pattern may be designed to configure the same winding turn of the electrode assembly.

In one modification, the height of the intermediate uncoated portion B2 may have a step shape in which the height increases and then decreases while going from the core to the outer circumference.

In another modification, the outer circumference uncoated portion B3 may be modified to have the same structure as the second embodiment.

In still another modification, the pattern structure applied to the intermediate uncoated portion B2 may be extended to the outer circumference uncoated portion B3 (see dotted line).

Figure 17B:
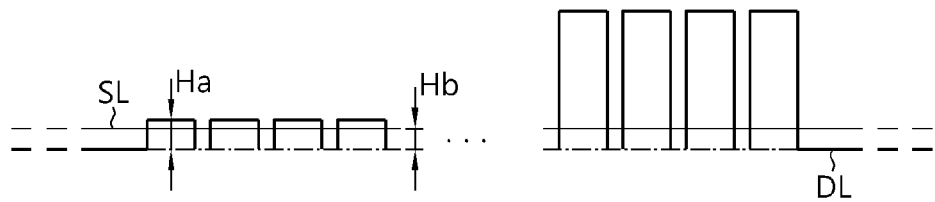
FIG. 17b is a diagram showing an example of the positional relationship between the datum line and the end of the separator based on the electrode according to the fourth embodiment of the present disclosure.
Figure 17C:
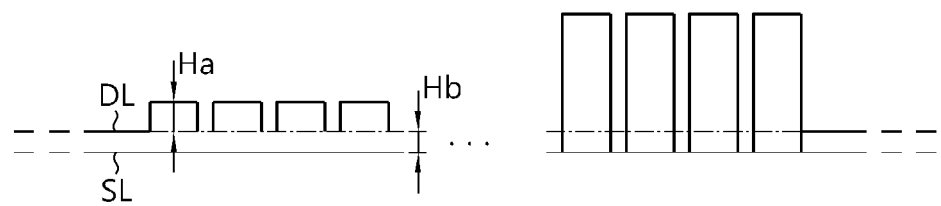
FIG. 17c is a diagram showing another example of the positional relationship between the datum line and the end of the separator based on the electrode according to the fourth embodiment of the present disclosure.

FIG. 17a is a plan view showing the structure of an electrode 60d according to the fourth embodiment of the present disclosure.

Referring to FIG. 17a, in the electrode 60d of the fourth embodiment, the heights of the core-side uncoated portion B1 and the outer circumference uncoated portion B3 are relatively smaller than the height of the intermediate uncoated portion B2. Also, the heights of the core-side uncoated portion B1 and the outer circumference uncoated portion B3 may be the same or different.

Preferably, at least a partial region of the intermediate uncoated portion B2 may include a plurality of segments 66. The heights of the plurality of segments 66 may increase stepwise from the core to the outer circumference.

The segment 66 may be notched by laser. The segment 66 may be formed by a known metal foil cutting process such as ultrasonic cutting or punching.

In the fourth embodiment, in order to prevent damage to the active material layer 62 and/or the insulating coating layer 64 during bending of the uncoated portion 63, it is preferable to leave a predetermined gap between the bottom of the cutting line between the segments 66 and the active material layer 62. This is because stress is concentrated near the bottom of the cutting line when the uncoated portion 63 is bent. The gap is preferably 0.2 mm to 4 mm. When the gap is adjusted to the corresponding numerical range, it is possible to prevent the active material layer 62 and/or the insulating coating layer 64 near the bottom of the cutting line from being damaged by stress generated during bending of the uncoated portion 63. In addition, the gap may prevent damage to the active material layer 62 and/or the insulating coating layer 64 due to tolerance during notching or cutting of the segment 66. Preferably, when the electrode 60d is wound into an electrode assembly, at least a part of the insulating coating layer 64 may be exposed to the outside of the separator. In this case, when the segment 66 is bent, the insulating coating layer 64 may support the bending point.

The plurality of segments 66 may form a plurality of segment groups while going from the core to the outer circumference. The width, height and separation pitch of segments belonging to the same segment group may be substantially the same.

When the electrode 60d of the fourth embodiment is included as a positive electrode or a negative electrode of the jelly-roll type electrode assembly, the separator SP may face the active material layer 62 and/or the insulating coating layer 64.

In order to improve the impregnability of the electrolyte in the process of impregnating the electrode assembly with the electrolyte, the position of the end of the separator SP in the winding axis direction may be set as follows.

In one example, a line passing through a point having the smallest height among the core-side uncoated portion, the outer circumference uncoated portion and the intermediate uncoated portion of the electrode 60d in parallel with the winding direction X is a datum line DL and a segment with the smallest height (Ha) among the segments 66 forming the bent surface is a minimum segment, the end (SL) in the width direction of the separator SP may be located in an outer direction of the electrode assembly within 30% of the height (Ha) of the minimum segment based on the datum line DL. Here, the outer direction of the electrode assembly refers to a direction from the active material layer 62 of the electrode 60d toward the uncoated portion 63. In the drawing, the symbol Hb represents a distance between the end of the separator SP in the width direction and the datum line DL.

Meanwhile, if some of the segments included in the uncoated portion 63 do not form a bent surface, the corresponding segment(s) may be excluded from the minimum segment selection target. If the height of the uncoated portion corresponding to the bottom of the cutting line between the segments 66 is lowest, the datum line DL may pass through the bottom of the cutting line. The bottom of the empty space corresponding to the cutting line may be referred to as a notching valley.

In another example, the end (SL) of the separator SP in the width direction may be located in an inner direction of the electrode assembly within 30% of the height (Ha) of the minimum segment based on the datum line DL. Here, the inner direction of the electrode assembly refers to a direction from the uncoated portion 63 of the electrode 60d toward the active material layer 62.

According to one embodiment of the present disclosure, the end in the width direction of the separator SP is adjusted so that it is located close to the datum line DL. As a result, the electrolyte flows into the electrode assembly along the notched valley, thereby improving the electrolyte impregnability. Specifically, when the electrolyte is introduced into the electrode assembly, the electrolyte moves to the notched valley between the segments 66. After that, the electrolyte is impregnated again to the end of the separator SP located close to the notched valley (or, the datum line DL) and finally impregnated into the active material layer of the electrode. As a result, the uniformity of electrolyte impregnation within the electrode assembly is increased.

As the end of the separator SP in the width direction deviates in the outer direction of the electrode assembly, the welding characteristics may be adversely affected. Conversely, as the end of the separator SP in the width direction enters in the inner direction of the electrode assembly, the risk of short circuit between the positive electrode and the negative electrode may increase.

Therefore, in the present disclosure, the end of the separator SP in the width direction is controlled to be located in the outer direction of the electrode assembly within 30% of the height (Ha) of the minimum segment based on the datum line DL, or the end of the separator SP in the width direction is controlled to be located in the inner direction of the electrode assembly within 30% of the height (Ha) of the minimum segment based on the datum line DL.

According to one embodiment of the present disclosure, the end of the separator SP in the width direction may be located in the outer direction of the electrode assembly within 1.5 mm based on the datum line DL, or the end of the separator SP in the width direction may be located in the inner direction of the electrode assembly within 1.5 mm based on the datum line DL.

Figure 18:
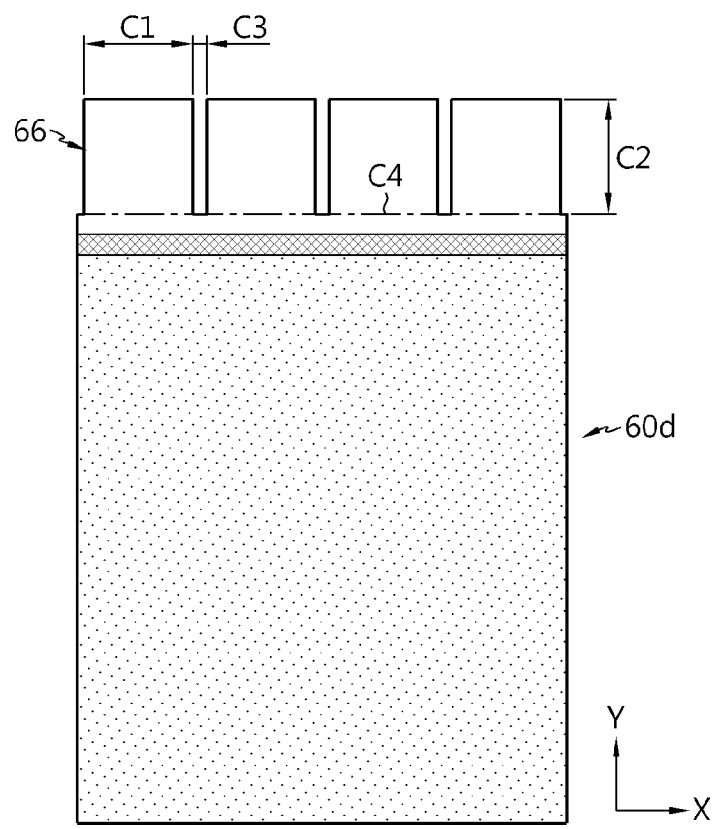
FIG. 18 is a diagram showing definitions of width, height, and separation pitch of a segment included in the electrode according to the fourth embodiment of the present disclosure.

FIG. 18 is a diagram showing definitions of width, height, and separation pitch of a segment 66 according to an embodiment of the present disclosure.

Referring to FIG. 18, the width C1, height C2, and separation pitch C3 of the segment 66 are designed to prevent abnormal deformation of the uncoated portion 63 while sufficiently increasing the number of overlapping layers of the uncoated portion 63 in order to prevent tearing of the uncoated portion 63 during bending and improve welding strength. The abnormal deformation means that the uncoated portion below the bending point C4 does not maintain a straight state and is deformed irregularly while collapsing.

Preferably, the width C1 of the segment 66 may be adjusted in the range of 1 mm to 6 mm. If C1 is less than 1 mm, a non-overlapping region or empty space (gap) occurs, thereby not to secure sufficient welding strength when the segments 66 are bent toward the core. Meanwhile, if C1 exceeds 6 mm, there is a possibility that uncoated portion 63 near the bending point C4 is torn by stress when the segments 66 are bent. In addition, the height of the segment may can be adjusted in the range of 2 mm to 10 mm. If C2 is less than 2 mm, a non-overlapping region or empty space (gap) occurs, thereby not to secure sufficient welding strength when the segments 66 are bent toward the core. Meanwhile, if C2 exceeds 10 mm, it is difficult to manufacture an electrode while maintaining uniform flatness of the uncoated portion in the winding direction X. That is, the height of the uncoated portion 63 increases, resulting in a swell. In addition, the separation pitch C3 of the segments 66 may be adjusted in the range of 0.05 mm to 1 mm. If C3 is less than 0.05 mm, the uncoated portion 63 near the bending point C4 may be torn due to stress when the segments 66 are bent. Meanwhile, if C3 exceeds 1 mm, anon-overlapping region or empty space (gap) may occur in which the segments 66 does not overlap with each other, thereby not to secure sufficient welding strength when the segments 66 are bent.

Referring to FIG. 17a again, the width (dBI) of the core-side uncoated portion B1 is designed under the condition that the cavity of the electrode assembly core is not covered when the segment 66 of the intermediate uncoated portion B2 is bent toward the core.

In one example, the width ($d_{B1}$) of the core-side uncoated portion B1 may increase in proportion to the bending length of the segment 66 of Group 1. The bending length corresponds to the height of the segment 66 based on the bending point (C4 in FIG. 18).

In a specific example, when the electrode 60d is used to manufacture an electrode assembly of a cylindrical battery having a form factor of 4680, the width ($d_{B1}$) of the core-side uncoated portion B1 may be set to 180 mm to 350 mm depending on the diameter of the core of the electrode assembly.

In one embodiment, the width of each segment group may be designed to configure the same winding turn of the electrode assembly.

In one modification, the width and/or height and/or separation pitch of the segments 66 belonging to the same segment group may increase or decrease gradually and/or stepwise and/or irregularly within the group.

Groups 1 to 7 are only examples of the segment groups. The number of groups and the number of segments 66 included in each group may be adjusted so that the segments 66 are overlapped in several layers to maximize the distribution of stress during the bending process of the uncoated portion 63 and to secure sufficient welding strength.

In another modification, the height of the outer circumference uncoated portion B3 may decrease gradually or stepwise as in the first and second embodiments. In addition, the segment structure of the intermediate uncoated portion B2 may be extended to the outer circumference uncoated portion B3 (see dotted line). In this case, the outer circumference uncoated portion B3 may also include a plurality of segments, like the intermediate uncoated portion B2. In this case, the segments of the outer circumference uncoated portion B3 may have a larger width and/or height and/or separation pitch than those of the intermediate uncoated portion B2.

In a specific example, when the electrode 60d is used to manufacture an electrode assembly of a cylindrical battery having a form factor of 4680, segments may be formed in eight groups. At this time, the segments of Groups 1 to 7 may be formed on the intermediate uncoated portion B2, and the segments of Group 8 may be formed on the outer circumference uncoated portion B3 as in the modification described above.

In a specific example, the width ($d_{B1}$) of the core-side uncoated portion B1 may be 180 mm to 350 mm. The width of Group 1 may be 35% to 40% of the width of the core-side uncoated portion B1. The width of Group 2 may be 130% to 150% of the width of Group 1. The width of Group 3 may be 120% to 135% of the width of Group 2. The width of Group 4 may be 85% to 90% of the width of Group 3. The width of Group 5 may be 120% to 130% of the width of Group 4. The width of Group 6 may be 100% to 120% of the width of Group 5. The width of Group 7 may be 90% to 120% of the width of Group 6. The width of Group 8 may be 115% to 130% of the width of Group 7.

The widths of Groups 1 to 8 do not show a constant increase or decrease pattern because the widths of the segments gradually increase from Group 1 to Group 8, but the number of segments included in the group is limited to an integer number. Therefore, the number of segments may be reduced in a specific segment group. Therefore, the width of the group may show an irregular change pattern as shown in the above example while going from the core to the outer circumference.

That is, when the widths in the winding direction of three segment groups consecutively adjacent to each other in the radial direction of the electrode assembly are W1, W2, and W3, respectively, a combination of segment groups in which W3/W2 is smaller than W2/W1 may be included.

In the specific example, Groups 4 to 6 correspond to this. The width ratio of Group to Group 4 is 120% to 130%, and the width ratio of Group 6 to Group 5 is 100% to 120%, which is less than 120% to 130%.

Figure 19A:
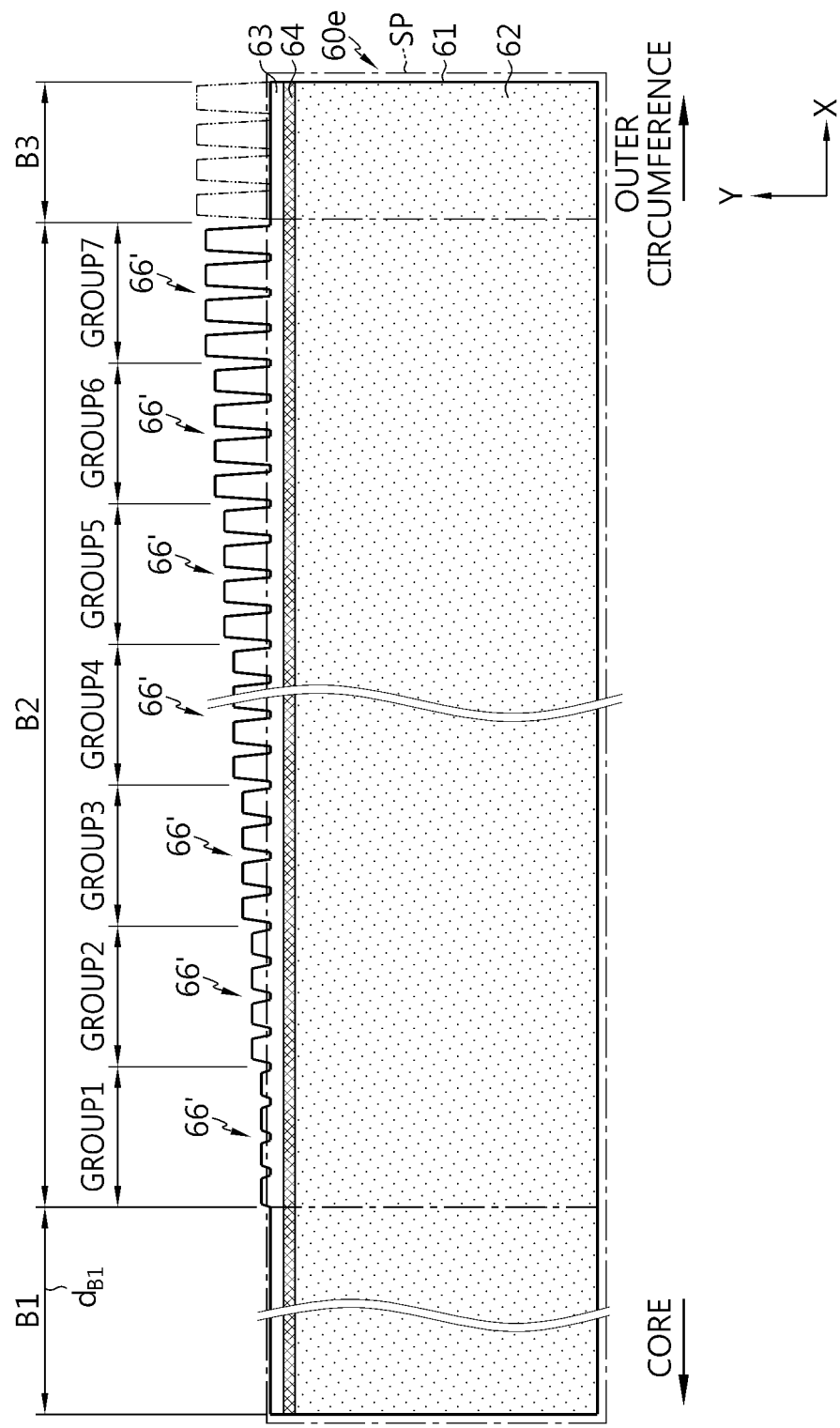
FIG. 19a is a plan view showing the structure of an electrode according to the fifth embodiment of the present disclosure.
Figure 19B:
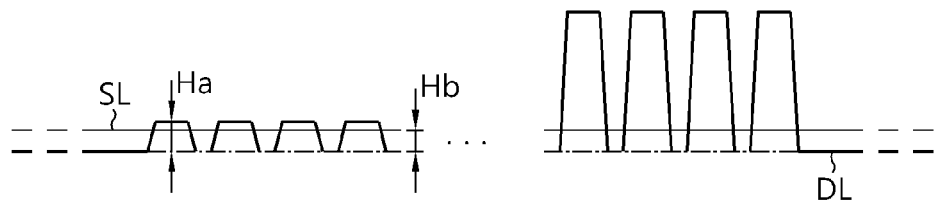
FIG. 19b is a diagram showing an example of the positional relationship between the datum line and the end of the separator based on the electrode according to the fifth embodiment of the present disclosure.
Figure 19C:
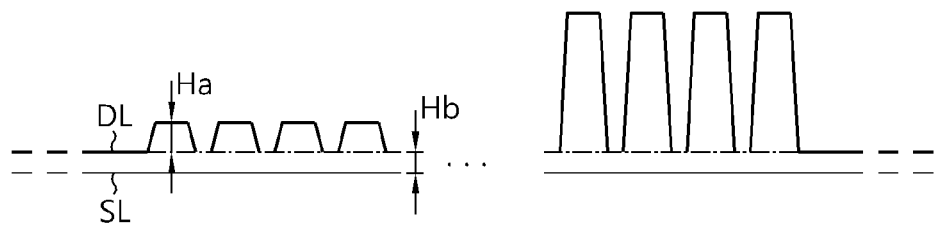
FIG. 19c is a diagram showing another example of the positional relationship between the datum line and the end of the separator based on the electrode according to the fifth embodiment of the present disclosure.

FIG. 19a is a plan view showing the structure of an electrode 60e according to the fifth embodiment of the present disclosure. FIGS. 19b and 19c are diagrams showing an embodiment of setting the position of the end of the separator SP in the width direction based on the datum line DL.

Referring to FIGS. 19a to 19c, the electrode 60e of the fifth embodiment is substantially identical to the fourth embodiment (or the modifications), except that the shape of the segment 66' is changed from a quadrangular shape to a trapezoidal shape.

Figure 20:
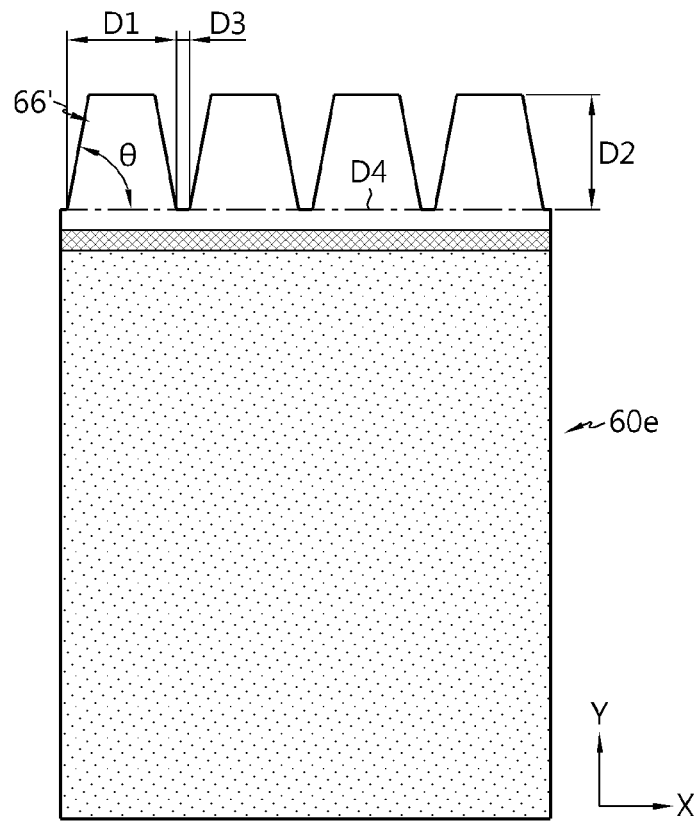
FIG. 20 is a diagram showing definitions of width, height, and separation pitch of a segment included in the electrode according to the fifth embodiment of the present disclosure.

FIG. 20 shows the definition of width, height and separation pitch of a trapezoidal segment 66'.

Referring to FIG. 20, the width D1, height D2, and separation pitch D3 of the segment 66' are designed to prevent the uncoated portion 63 near the bending point D4 from being torn during bending of the uncoated portion 63 and to prevent abnormal deformation of the uncoated portion 63 while sufficiently increasing the number of overlapping of the uncoated portion 63 in order to secure sufficient welding strength.

Preferably, the width D1 of the segment 66' may be adjusted in the range of 1 mm to 6 mm. If D1 is less than 1 mm, when the segments 66' are bent toward the core, a region or empty space (gap) may occur where the segments 66' do not overlap each other, thereby not to secure sufficient welding strength. Meanwhile, if D1 exceeds 6 mm, there is a possibility that the uncoated portion 63 near the bending point D4 is torn by stress when the segments 66' are bent. In addition, the height of the segment 66' may be adjusted in the range of 2 mm to 10 mm. If D2 is less than 2 mm, when the segments 66' are bent toward the core, a region or empty space (gap) may occur where the segments 66' do not overlap each other, thereby not to secure sufficient welding strength. Meanwhile, when D2 exceeds 10 mm, it is difficult to manufacture an electrode while uniformly maintaining the flatness of the uncoated portion 63 in the winding direction. In addition, the separation pitch D3 of the segment 66' may be adjusted in the range of 0.05 mm to 1 mm. If D3 is less than 0.05 mm, the uncoated portion 63 near bending point D4 may be torn due to stress when the segments 66' are bent. Meanwhile, if D3 exceeds 1 mm, a region or empty space (gap) may occur in which the segments 66' do not overlap each other, thereby not to secure sufficient welding strength when the segments 66' are bent.

In the fifth embodiment, the lower interior angle ($\theta$) of a trapezoidal shape may increase from the core to the outer circumference of the plurality of segments 66'. As the radius of the electrode assembly increases, the curvature decreases.

If the lower interior angle ($\theta$) of the segment 66' increases as the radius of the electrode assembly increases, the stress generated in the radial direction and the circumferential direction when the segments 66' are bent may be relieved. In addition, if the lower interior angle ($\theta$) increases, the area overlapping with a segment 66' at an inner side and the number of overlapping layers also increase when the segments 66' are bent, so it is possible to secure uniform welding strength in the radial direction and the circumferential direction and form a flat bent surface.

In one example, when the electrode 60e is used to manufacture an electrode assembly of a cylindrical battery having a form factor of 4680, when the radius of the electrode assembly increases from 4 mm to 22 mm, the inner angle of the segment 66' may be increased stepwise in the range of 60 degrees to 85 degrees.

In one modification, the height of the outer circumference uncoated portion B3 may decrease gradually or stepwise as in the first and second embodiments. In addition, the segment structure of the intermediate uncoated portion B2 may extend to the outer circumference uncoated portion B3 (see dotted line). In this case, the outer circumference uncoated portion B3 may also include a plurality of segments, like the intermediate uncoated portion B2. In this case, the segments of the outer circumference uncoated portion B3 may have a larger width and/or height and/or separation pitch than the intermediate uncoated portion B2.

Like the fourth and fifth embodiments, when the intermediate uncoated portion B2 includes a plurality of segments 66, 66', the shape of each segment 66, 66' may be modified to a triangle, semicircle, semi-ellipse, or parallelogram.

In addition, it is possible to change the shape of the segment 66, 66' differently according to the region of the intermediate uncoated portion B2. In one example, the region where stress is concentrated may have a round shape (e.g., semicircular shape, semi-elliptical shape, etc.) that is advantageous for stress distribution, and the region where the stress is relatively low may have in a polygonal shape (e.g., rectangular shape, trapezoidal shape, parallelogram shape, etc.) with the greatest area as possible.

In the fourth and fifth embodiments, the segment structure of the intermediate uncoated portion B2 is also applicable to the core-side uncoated portion B1. However, if the segment structure is applied to the core-side uncoated portion B1, reverse forming in which the end of the core-side uncoated portion B1 is bent toward the outer circumference when the segments 66, 66' of the intermediate uncoated portion B2 are bent according to the radius of curvature of the core may occur. Therefore, there is no segment structure in the core-side uncoated portion B1, or even if the segment structure is applied, the width and/or height and/or separation pitch of the segments 66, 66' are preferably adjusted to a level where reverse forming does not occur in consideration of the radius of curvature of the core.

The electrode structure of the embodiments (modifications) described above may be applied to at least one of the first electrode and the second electrode having different polarities included in the jelly-roll type electrode assembly. In addition, when the electrode structure of the embodiments (modifications) is applied to any one of the first electrode and the second electrode, a conventional electrode structure may be applied to the other one. In addition, the electrode structures applied to the first electrode and the second electrode may not be the same and may be different.

For example, when the first electrode and the second electrode are a positive electrode and a negative electrode, respectively, any one of the embodiments (modifications) may be applied to the first electrode, and a conventional electrode structure (see FIG. 1) may be applied to the second electrode.

As another example, when the first electrode and the second electrode are a positive electrode and a negative electrode, respectively, any one of the embodiments (modifications) may be selectively applied to the first electrode, and any one of the embodiments (modifications) may be selectively applied to the second electrode.

Hereinafter, the structure of an electrode assembly according to an embodiment of the present disclosure will be described in detail.

Figure 21:
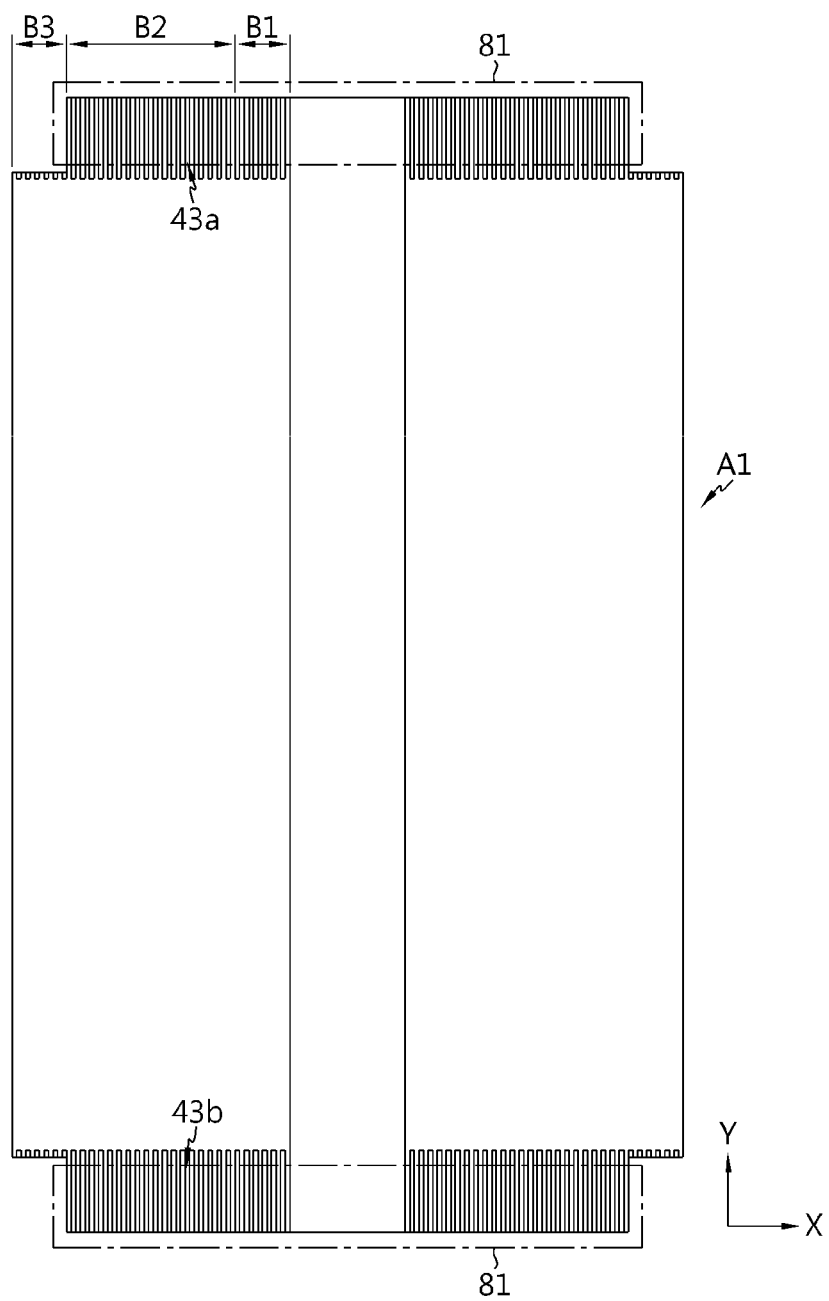
FIG. 21 is a cross-sectional view showing a jelly-roll type electrode assembly in which the electrode of the first embodiment is applied to a first electrode (positive electrode) and a second electrode (negative electrode), taken along the Y-axis direction (winding axis direction).

FIG. 21 is a cross-sectional view showing a jelly-roll type electrode assembly A1 in which the electrode 60a of the first embodiment is applied to a first electrode (positive electrode) and a second electrode (negative electrode), taken along the Y-axis direction (winding axis direction).

Figure 2:
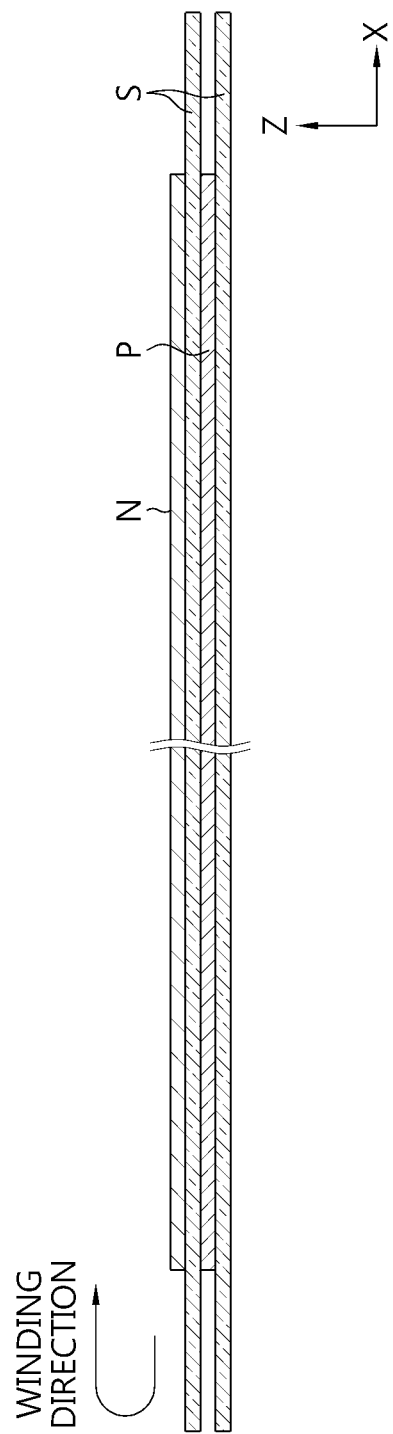
FIG. 2 is a diagram showing a process of winding an electrode of the conventional tab-less cylindrical battery.
Figure 3:
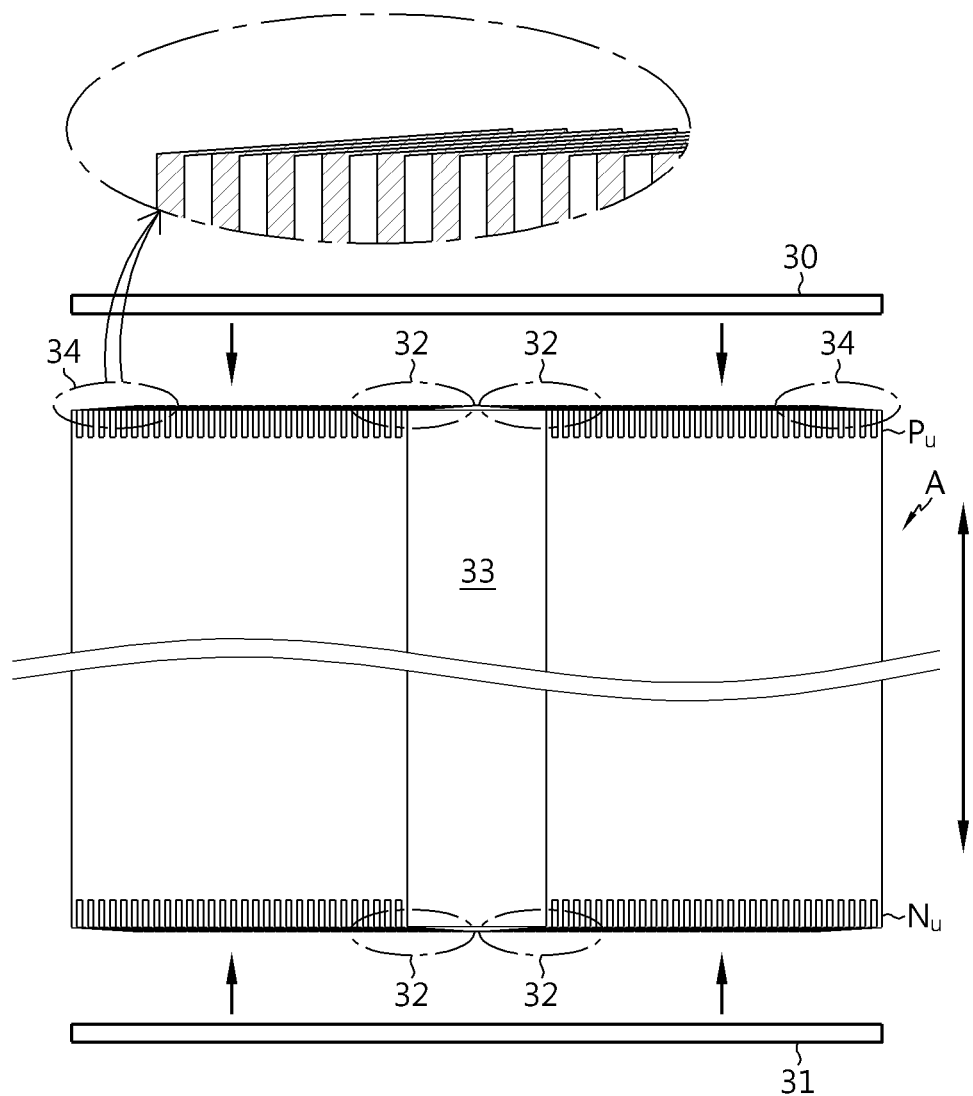
FIG. 3 illustrates a process of welding a current collecting plate to a bent surface of an uncoated portion in the conventional tab-less cylindrical battery.

The electrode assembly A1 may be manufactured by the winding method described through FIG. 2. For convenience of description, the protruding structures of the uncoated portions 43a, 43b extending to the outside of the separator are shown in detail, and the winding structure of the first electrode, the second electrode and the separator is omitted. The uncoated portion 43a that protrudes upward extends from the first electrode, and the uncoated portion 43b that protrudes downward extends from the second electrode.

The pattern in which the heights of the uncoated portions 43a, 43b change is schematically shown. That is, the heights of the uncoated portions 43a, 43b may vary irregularly according to the position where the section is cut. For example, when a side portion of the trapezoidal segment 66, 66' is cut, the height of the uncoated portion in the cross section becomes lower than that of the segment 66, 66'. Accordingly, it should be understood that the heights of the uncoated portions 43a, 43b shown in the cross-sectional views of the electrode assembly correspond to the average of the height (C2 in FIG. 18, D2 in FIG. 20) of the uncoated portion included in each winding turn.

Referring to FIG. 21, the uncoated portion 43a of the first electrode includes a core-side uncoated portion B1 adjacent to the core of the electrode assembly A1, an outer circumference uncoated portion B3 adjacent to the outer circumference of the electrode assembly A1, and an intermediate uncoated portion B2 interposed between the core-side uncoated portion B1 and the outer circumference uncoated portion B3.

The height (length in the Y-axis direction) of the outer circumference uncoated portion B3 is relatively smaller than the height of the intermediate uncoated portion B2. Therefore, it is possible to prevent an internal short circuit from occurring while the outer circumference uncoated portion B3 is pressed against the beading portion of the battery housing.

The lower uncoated portion 43b has the same structure as the upper uncoated portion 43a. In one modification, the lower uncoated portion 43b may have a conventional electrode structure or an electrode structure of other embodiments (modifications).

The ends 81 of the upper uncoated portion 43a and the lower uncoated portion 43b may be bent from the outer circumference of the electrode assembly A1 toward the core. In this case, the outer circumference uncoated portion B3 may not be substantially bent.

Figure 22:
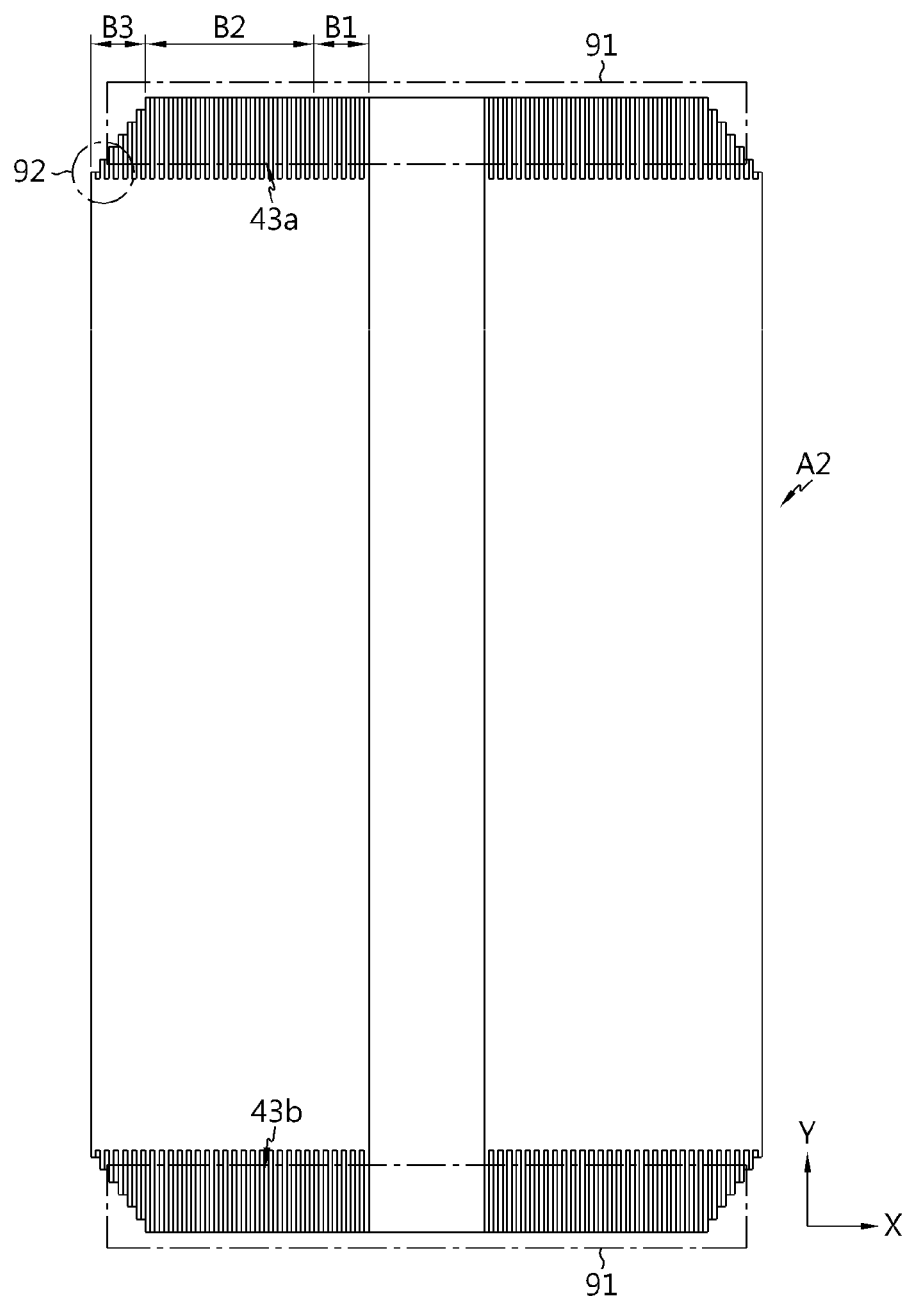
FIG. 22 is a cross-sectional view showing a jelly-roll type electrode assembly in which the electrode of the second embodiment is applied to the first electrode (positive electrode) and the second electrode (negative electrode), taken along the Y-axis direction (winding axis direction).

FIG. 22 is a cross-sectional view showing a jelly-roll type electrode assembly A2 in which the electrode 60b of the second embodiment is applied to the first electrode (positive electrode) and the second electrode (negative electrode), taken along the Y-axis direction (winding axis direction).

Referring to FIG. 22, the uncoated portion 43a of the first electrode includes a core-side uncoated portion B1 adjacent to the core of the electrode assembly A2, an outer circumference uncoated portion B3 adjacent to the outer circumference of the electrode assembly A2, and an intermediate uncoated portion B2 interposed between the core-side uncoated portion B1 and the outer circumference uncoated portion B3.

The height of the outer circumference uncoated portion B3 is relatively smaller than the height of the intermediate uncoated portion B2 and decreases gradually or stepwise from the core to the outer circumference. Therefore, it is possible to prevent an internal short circuit from occurring while the outer circumference uncoated portion B3 is pressed against the beading portion of the battery housing.

The lower uncoated portion 43b has the same structure as the upper uncoated portion 43a. In one modification, the lower uncoated portion 43b may have a conventional electrode structure or an electrode structure of other embodiments (modifications).

The ends 91 of the upper uncoated portion 43a and the lower uncoated portion 43b may be bent from the outer circumference of the electrode assembly A2 to the core. In this case, the outermost side 92 of the outer circumference uncoated portion B3 may not be substantially bent.

Figure 23:
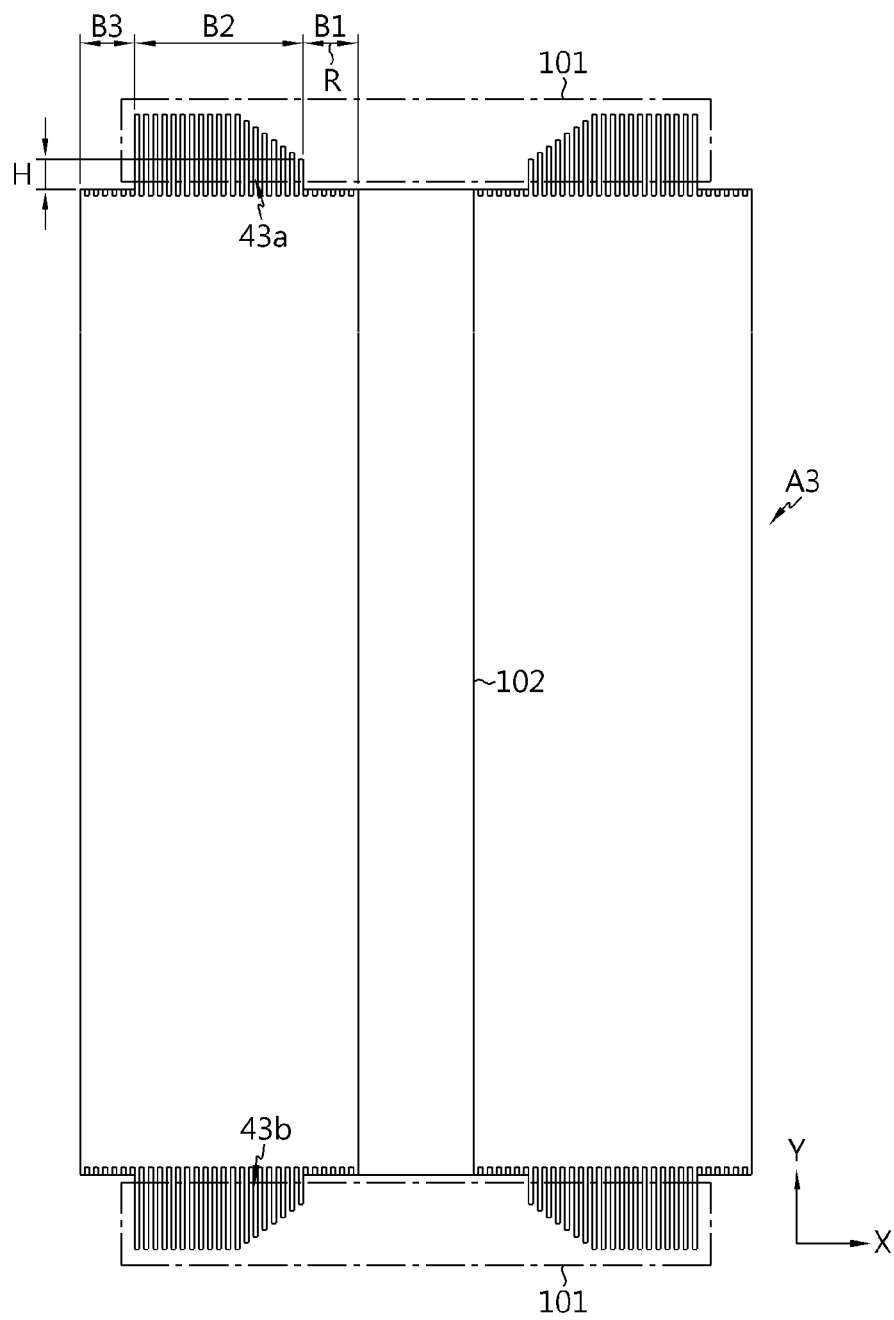
FIG. 23 is a cross-sectional view showing a jelly-roll type electrode assembly in which any one of the electrodes of the third to fifth embodiments (modifications thereof) is applied to the first electrode (positive electrode) and the second electrode (negative electrode), taken along the Y-axis direction (winding axis direction).

FIG. 23 is a cross-sectional view showing a jelly-roll type electrode assembly A3 in which any one of the electrodes 60c, 60d, 60e of the third to fifth embodiments (modifications thereof) is applied to the first electrode (positive electrode) and the second electrode (negative electrode), taken along the Y-axis direction (winding axis direction).

Referring to FIG. 23, the uncoated portion 43a of the first electrode includes a core-side uncoated portion B1 adjacent to the core of the electrode assembly A3, an outer circumference uncoated portion B3 adjacent to the outer circumference of the electrode assembly A3, and an intermediate uncoated portion B2 interposed between the core-side uncoated portion B1 and the outer circumference uncoated portion B3.

The height of the core-side uncoated portion B1 is relatively smaller than the height of the intermediate uncoated portion B2. Also, in the intermediate uncoated portion B2, the bending length of the innermost uncoated portion 43a is equal to or smaller than the radial length R of the core-side uncoated portion B1. The bending length H corresponds to a height of the uncoated portion 43a based on a point at which the uncoated portion 43a is bent (C4 in FIG. 18 and D4 in FIG. 20).

Therefore, even if the intermediate uncoated portion B2 is bent, the bent portion does not block the cavity 102 of the core of the electrode assembly A3. If the cavity 102 is not blocked, there is no difficulty in the electrolyte injection process, and the electrolyte injection efficiency is improved. In addition, by inserting a welding jig through the cavity 102, a welding process between the current collecting plate of the negative electrode and the battery housing may be easily performed.

The height of the outer circumference uncoated portion B3 is relatively smaller than the height of the intermediate uncoated portion B2. Therefore, it is possible to prevent an internal short circuit from occurring while the outer circumference uncoated portion B3 is pressed against the beading portion of the battery housing.

In one modification, the height of the outer circumference uncoated portion B3 may decrease gradually or stepwise, unlike that shown in FIG. 23. Also, in FIG. 23, the height of the intermediate uncoated portion B2 is the same in a partial outer circumference, but the height of the intermediate uncoated portion B2 may increase gradually or stepwise from the boundary between the core-side uncoated portion B1 and the intermediate uncoated portion B2 to the boundary between the intermediate uncoated portion B2 and the outer circumference uncoated portion B3.

The lower uncoated portion 43b has the same structure as the upper uncoated portion 43a. In one modification, the lower uncoated portion 43b may have a conventional electrode structure or an electrode structure of other embodiments (modifications).

The ends 101 of the upper uncoated portion 43a and the lower uncoated portion 43b may be bent from the outer circumference of the electrode assembly A3 toward the core. At this time, the core-side uncoated portion B1 and the outer circumference uncoated portion B3 are not substantially bent.

When the intermediate uncoated portion B2 includes a plurality of segments, bending stress is alleviated, so it is possible to prevent tearing or abnormal deformation of the uncoated portion 43a near the bending point. In addition, when the width and/or height and/or separation pitch of the segments is adjusted according to the numerical range of the above embodiment, the segments do not form an empty hole (gap) in the bent surface (surface viewed in the Y-axis) while being bent toward the core and overlapped in several layers enough to secure sufficient welding strength.

Figure 24:
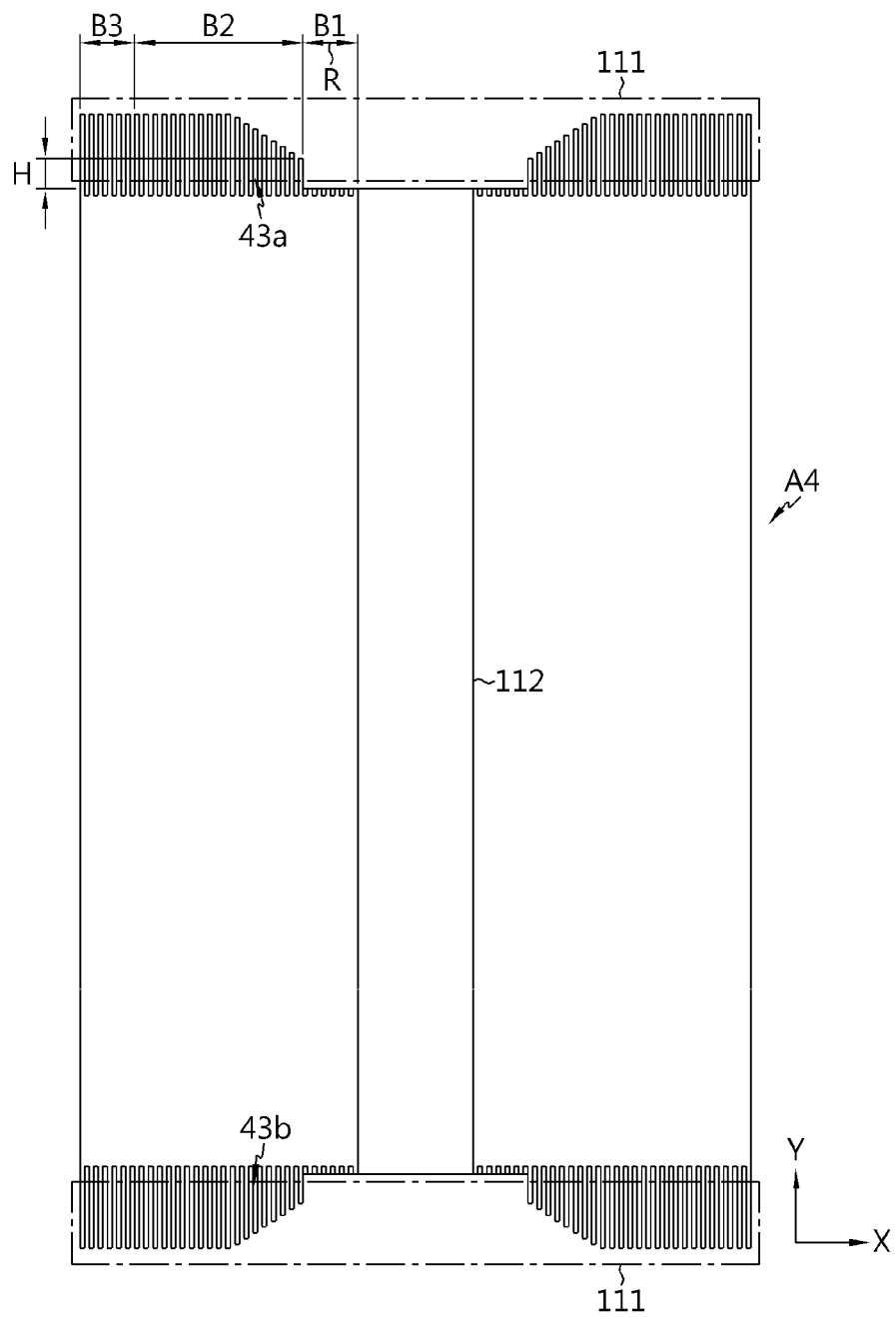
FIG. 24 is a cross-sectional view showing an electrode assembly according to still another embodiment of the present disclosure, taken along the Y-axis direction (winding axis direction).

FIG. 24 is a cross-sectional view showing an electrode assembly A4 according to still another embodiment of the present disclosure, taken along the Y-axis direction (winding axis direction).

Referring to FIG. 24, the electrode assembly A4 has substantially the same configuration as the electrode assembly A3 of FIG. 23, except that the height of the outer circumference uncoated portion B3 is substantially equal to the height of the outermost side of the intermediate uncoated portion B2.

The outer circumference uncoated portion B3 may include a plurality of segments. The fourth and fifth embodiments (modifications) may be substantially identically applied to the configuration of the plurality of segments.

In the electrode assembly A4, the height of the core-side uncoated portion B1 is relatively smaller than the height of the intermediate uncoated portion B2. In addition, in the intermediate uncoated portion B2, the bending length H of the innermost uncoated portion is equal to or smaller than the radial length R of the core-side uncoated portion B1.

Therefore, even if the intermediate uncoated portion B2 is bent, the bent portion does not block the cavity 112 of the core of the electrode assembly A4. If the cavity 112 is not blocked, there is no difficulty in the electrolyte injection process, and the electrolyte injection efficiency is improved. In addition, by inserting a welding jig through the cavity 112, a welding process between the current collecting plate of the negative electrode and the battery housing may be easily performed.

In one modification, a structure in which the height of the intermediate uncoated portion B2 increases gradually or stepwise from the core toward the outer circumference may extend to the outer circumference uncoated portion B3. In this case, the height of the uncoated portion 43a may gradually or stepwise increase from the boundary between the core-side uncoated portion B1 and the intermediate uncoated portion B2 to the outermost side surface of the electrode assembly A4.

The lower uncoated portion 43b has the same structure as the upper uncoated portion 43a. In one modification, the lower uncoated portion 43b may have a conventional electrode structure or an electrode structure of other embodiments (modifications).

The ends 111 of the upper uncoated portion 43a and the lower uncoated portion 43b may be bent toward the core from the outer circumference of the electrode assembly A4. At this time, the core-side uncoated portion B1 is not substantially bent.

When the intermediate uncoated portion B2 and the outer circumference uncoated portion B3 include a plurality of segments, the bending stress is relieved, so it is possible to prevent tearing or abnormal deformation of the uncoated portion 43a, 43b near the bending point. In addition, when the width and/or height and/or separation pitch of the segments is adjusted according to the numerical range of the above embodiment, the segments do not form an empty hole (gap) in the bent surface (surface viewed in the Y-axis) while being bent toward the core and overlapped in several layers enough to secure sufficient welding strength.

Figure 25:
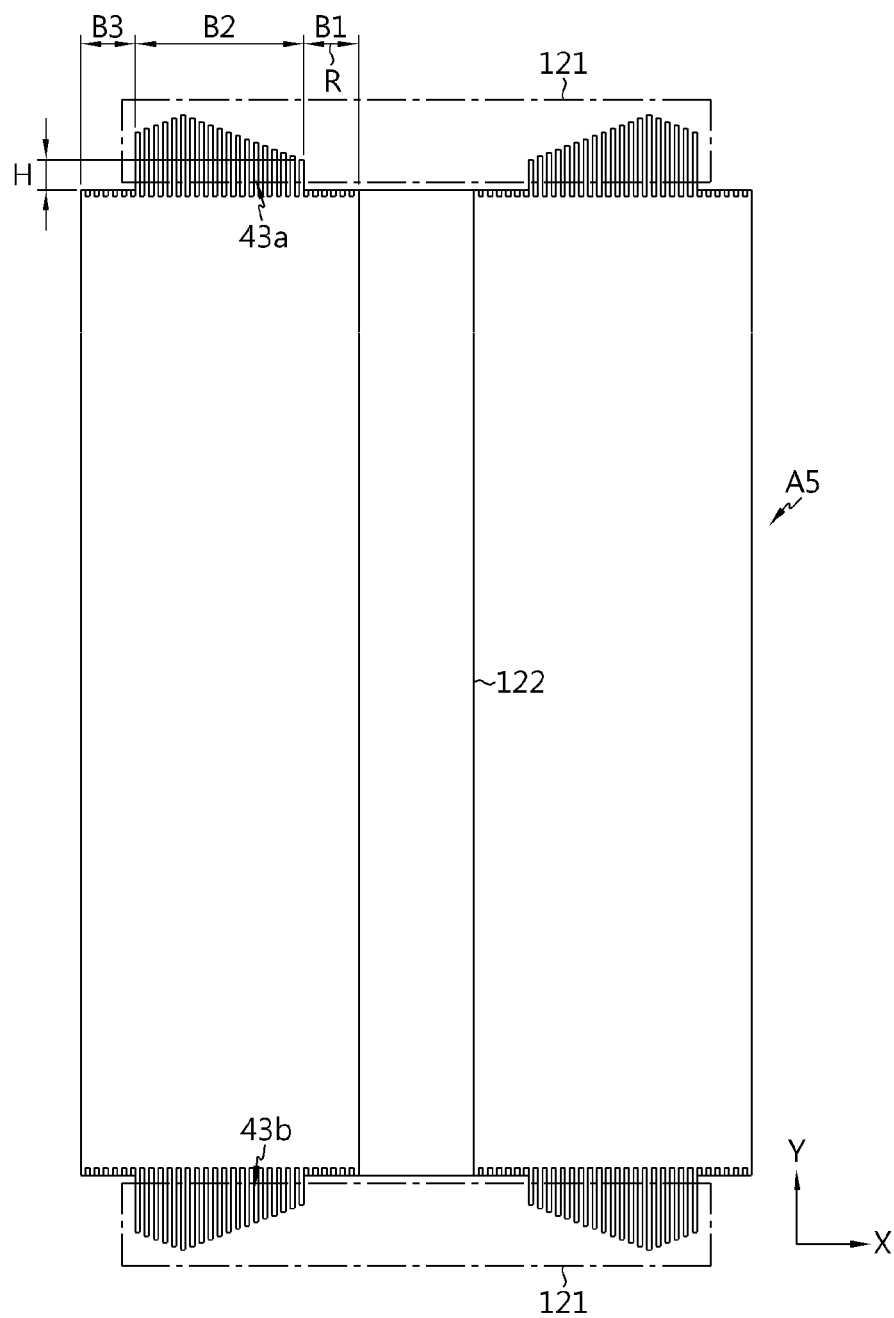
FIG. 25 is a cross-sectional view showing an electrode assembly according to still another embodiment of the present disclosure, taken along the Y-axis direction (winding axis direction).

FIG. 25 is a cross-sectional view showing an electrode assembly A5 according to still another embodiment of the present disclosure, taken along the Y-axis direction (winding axis direction).

Referring to FIG. 25, the electrode assembly A5 has substantially the same configuration as the electrode assembly A3 of FIG. 23, except that it has a pattern in which the height of the intermediate uncoated portion B2 gradually or stepwise increases and then decreases.

Such a change in height of the intermediate uncoated portion B2 may be implemented by adjusting the height of a step pattern (see FIG. 16) or a height of the segment (see FIG. 17a or 19b) included in the intermediate uncoated portion B2.

In the electrode assembly A5, the height of the core-side uncoated portion B1 is relatively smaller than the height of the intermediate uncoated portion B2. In addition, in the intermediate uncoated portion B2, the bending length H of the innermost uncoated portion is equal to or smaller than the radial length R of the core-side uncoated portion B1.

Therefore, even if the intermediate uncoated portion B2 is bent toward the core, the bent portion does not block the cavity 122 of the core of the electrode assembly A5. If the cavity 122 is not blocked, there is no difficulty in the electrolyte injection process, and the electrolyte injection efficiency is improved. In addition, by inserting a welding jig through the cavity 122, a welding process between the current collecting plate of the negative electrode and the battery housing may be easily performed.

Also, the height of the outer circumference uncoated portion B3 is relatively smaller than the height of the intermediate uncoated portion B2. Therefore, it is possible to prevent an internal short circuit from occurring while the outer circumference uncoated portion B3 is pressed against the beading portion of the battery housing. In one modification, the height of the outer circumference uncoated portion B3 may decrease gradually or stepwise toward the outer circumference.

The lower uncoated portion 43b has the same structure as the upper uncoated portion 43a. In a modification, the lower uncoated portion 43b may have a conventional electrode structure or an electrode structure of other embodiments (modifications).

The ends 121 of the upper uncoated portion 43a and the lower uncoated portion 43b may be bent toward the core from the outer circumference of the electrode assembly A5.

At this time, the core-side uncoated portion B1 and the outer circumference uncoated portion B3 are not substantially bent.

When the intermediate uncoated portion B2 includes a plurality of segments, bending stress is alleviated, so it is possible to prevent tearing or abnormal deformation of the uncoated portion 43a, 43b. In addition, when the width and/or height and/or separation pitch of the segments is adjusted according to the numerical range of the above embodiment, the segments do not form an empty hole (gap) in the bent surface (surface viewed in the Y-axis) while being bent toward the core and overlapped in several layers enough to secure sufficient welding strength.

Figure 26:
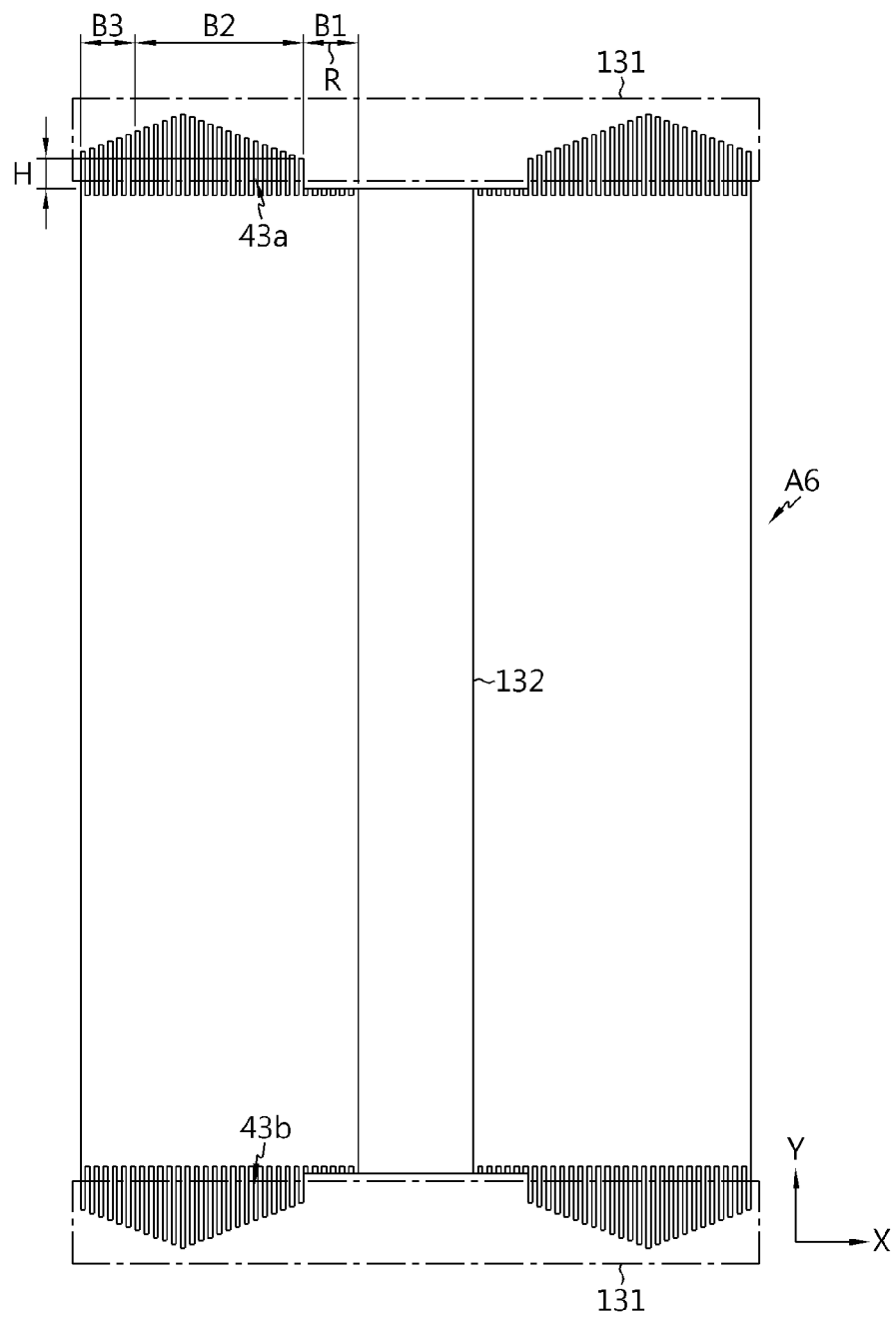
FIG. 26 is a cross-sectional view showing an electrode assembly according to still another embodiment of the present disclosure, taken along the Y-axis direction (winding axis direction).

FIG. 26 is a cross-sectional view showing an electrode assembly A6 according to still another embodiment of the present disclosure, taken along the Y-axis direction (winding axis direction).

Referring to FIG. 26, the electrode assembly A6 is substantially identical to the electrode assembly A5 of FIG. 25, except that the height of the outer circumference uncoated portion B3 has a pattern that gradually or gradually decreases from the boundary point between the outer circumference uncoated portion B3 and the intermediate uncoated portion B2 toward the outermost side surface of the electrode assembly A6.

The change in height of the outer circumference uncoated portion B3 may be implemented by extending the step pattern (see FIG. 16) included in the intermediate uncoated portion B2 to the outer circumference uncoated portion B3 and at the same time gradually or stepwise decreasing the height of the pattern toward the outer circumference. In addition, in another modification, the change in height of the outer circumference uncoated portion B3 may be implemented by extending the segment structure of the intermediate uncoated portion B2 to the outer circumference uncoated portion B3 and at the same time gradually or stepwise decreasing the height of the segment toward the outer circumference.

In the electrode assembly A6, the height of the core-side uncoated portion B1 is relatively smaller than the height of the intermediate uncoated portion B2. In addition, in the intermediate uncoated portion B2, the bending length H of the innermost uncoated portion is equal to or smaller than the radial length R of the core-side uncoated portion B1.

Therefore, even if the intermediate uncoated portion B2 is bent toward the core, the bent portion does not block the cavity 132 of the core of the electrode assembly A5. If the cavity 132 is not blocked, there is no difficulty in the electrolyte injection process, and the electrolyte injection efficiency is improved. In addition, by inserting a welding jig through the cavity 132, a welding process between the current collecting plate of the negative electrode and the battery housing may be easily performed.

The lower uncoated portion 43b has the same structure as the upper uncoated portion 43a. In one modification, the lower uncoated portion 43b may have a conventional electrode structure or an electrode structure of other embodiments (modifications).

The ends 131 of the upper uncoated portion 43a and the lower uncoated portion 43b may be bent toward the core from the outer circumference of the electrode assembly A6. At this time, the core-side uncoated portion B1 is not substantially bent.

When the intermediate uncoated portion B2 and the outer circumference uncoated portion B3 include a plurality of segments, the bending stress is relieved, so it is possible to prevent tearing or abnormal deformation of the uncoated portion 43a, 43b near the bending point. In addition, when the width and/or height and/or separation pitch of the segments is adjusted according to the numerical range of the above embodiment, the segments do not form an empty hole (gap) in the bent surface (surface viewed in the Y-axis) while being bent toward the core and overlapped in several layers enough to secure sufficient welding strength.

Various electrode assembly structures according to embodiments of the present disclosure may be applied to a jelly-roll type cylindrical battery.

Preferably, the cylindrical battery may be, for example, a cylindrical battery having a form factor ratio (defined as a value obtained by dividing the diameter of the cylindrical battery by the height, namely the ratio of the diameter (D) to the height (H)) of greater than about 0.4.

The cylindrical battery according to an embodiment of the present disclosure may be, for example, 46110 battery, 4875 battery, 48110 battery, 4880 battery, or 4680 battery.

When an electrode assembly with a tab-less structure is applied to a cylindrical battery whose form factor ratio exceeds 0.4, the stress applied in the radial direction is large when bending the uncoated portion, so the uncoated portion is easily torn. In addition, when welding the current collecting plate to the bent surface of the uncoated portion, the number of overlapping layers of the uncoated portion must be sufficiently increased in order to sufficiently secure welding strength and lower resistance. These requirements can be achieved by the electrodes and the electrode assemblies according to the embodiments (modifications) of the present disclosure.

Hereinafter, a cylindrical battery according to an embodiment of the present disclosure will be described in detail.

Figure 27:
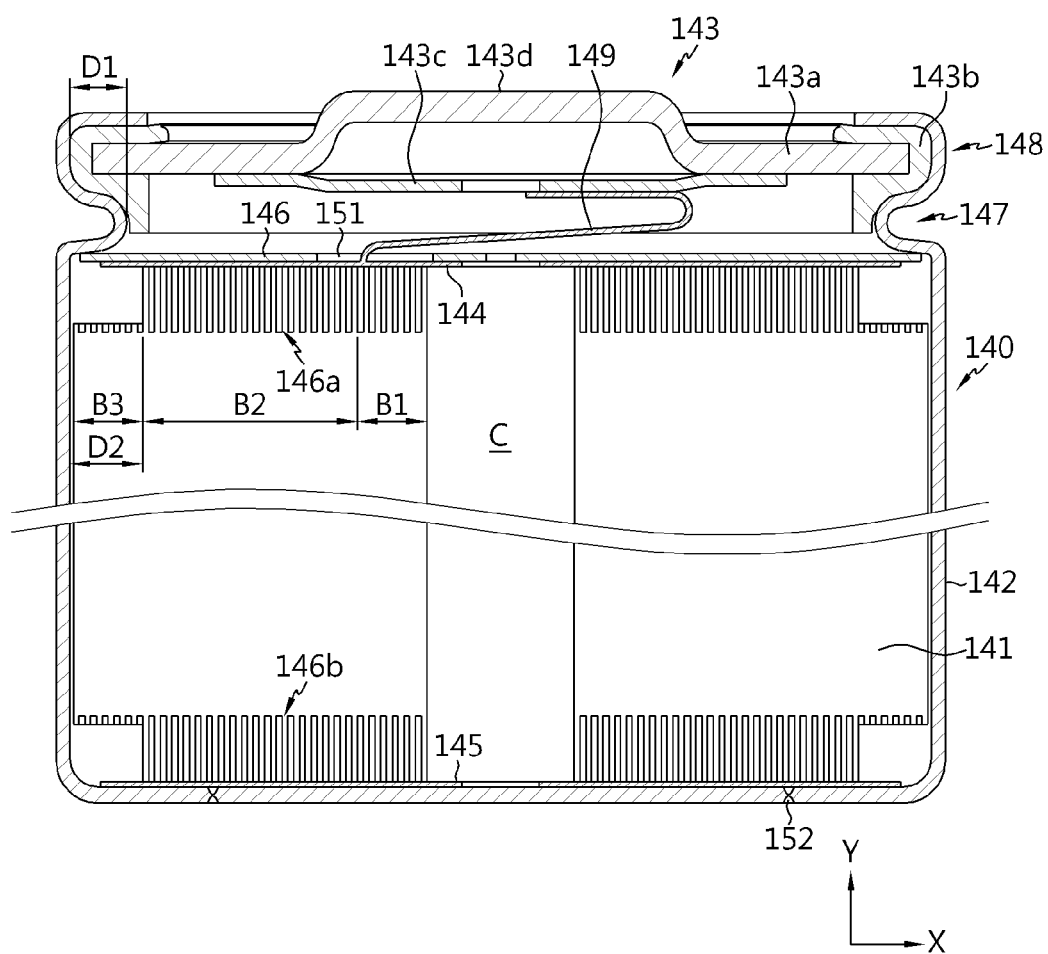
FIG. 27 is a cross-sectional view showing a cylindrical battery according to an embodiment of the present disclosure, taken along the Y-axis direction.

FIG. 27 is a cross-sectional view showing a cylindrical battery 140 according to an embodiment of the present disclosure, taken along the Y-axis direction.

Referring to FIG. 27, the cylindrical battery 140 according to an embodiment of the present disclosure includes an electrode assembly 141 having a first electrode, a separator and a second electrode, a battery housing 142 for accommodating the electrode assembly 141, and a sealing body 143 for sealing the opening of the battery housing 142.

The battery housing 142 is a cylindrical container with an opening formed at an upper side. The battery housing 142 is made of a metal material having conductivity such as aluminum or steel. The battery housing 142 accommodates the electrode assembly 141 in the inner space through the top opening and also accommodates the electrolyte.

The electrode assembly 141 may have a jelly-roll shape. As shown in FIG. 2, the electrode assembly 141 may be manufactured by winding a stack, which is formed by sequentially stacking a lower separator, a first electrode, an upper separator and a second electrode at least eleven times, based on the winding center C.

The first and second electrodes have different polarities. That is, when one has positive polarity, the other has negative polarity. At least one of the first electrode and the second electrode may have an electrode structure according to the above embodiments (modifications). In addition, the other one of the first electrode and the second electrode may have a conventional electrode structure or an electrode structure according to embodiments (modifications).

The uncoated portion 146a of the first electrode and the uncoated portion 146b of the second electrode protrude from the upper and lower portions of the electrode assembly 141, respectively. The first electrode has the electrode structure of the first embodiment (modification). Therefore, in the uncoated portion 146a of the first electrode, the height of the outer circumference uncoated portion B3 is smaller than the height of the uncoated portion of the other region. The outer circumference uncoated portion B3 is spaced apart from the inner circumference of the battery housing 142, particularly the beading portion 147, by a predetermined distance. Therefore, the outer circumference uncoated portion B3 of the first electrode does not come into contact with the battery housing 142 electrically connected to the second electrode, thereby preventing an internal short circuit of the battery 140.

The uncoated portion 146b of the second electrode has the same height. In a modification, the uncoated portion 146b of the second electrode may have the same structure as the uncoated portion 146a of the first electrode. In another modification, the uncoated portion 146b of the second electrode may selectively have an uncoated portion structure of the electrodes according to the embodiments (modifications).

The sealing body 143 may include a cap plate 143a, a first gasket 143b for providing airtightness between the cap plate 143a and the battery housing 142 and having insulation property, and a connection plate 143c electrically and mechanically coupled to the cap plate 143a.

The cap plate 143a is a component made of a conductive metal material and covers the top opening of the battery housing 142. The cap plate 143a is electrically connected to the uncoated portion 146a of the first electrode and electrically insulated from the battery housing 142 through the first gasket 143b. Accordingly, the cap plate 143a may function as a first electrode terminal of the cylindrical battery 140.

The cap plate 143a is seated on the beading portion 147 formed on the battery housing 142 and is fixed by the crimping portion 148. A first gasket 143b may be interposed between the cap plate 143a and the crimping portion 148 to secure airtightness of the battery housing 142 and to electrically insulate the battery housing 142 and the cap plate 143a. The cap plate 143a may have a protrusion 143d protruding upward from the center thereof.

The battery housing 142 is electrically connected to the uncoated portion 146b of the second electrode. Therefore, the battery housing 142 has the same polarity as the second electrode. If the second electrode has a negative polarity, the battery housing 142 also has a negative polarity.

The battery housing 142 has a beading portion 147 and a crimping portion 148 on the top. The beading portion 147 is formed by press-fitting the periphery of the outer circumference of the battery housing 142. The beading portion 147 prevents the electrode assembly 141 accommodated inside the battery housing 142 from escaping through the top opening of the battery housing 142, and may function as a support portion on which the sealing body 143 seats.

The inner circumference of the beading portion 147 is spaced apart from the outer circumference uncoated portion B3 of the first electrode by a predetermined distance. More specifically, the bottom of the inner circumference of the beading portion 147 is spaced apart from the outer circumference uncoated portion B3 of the first electrode by a predetermined distance. In addition, since the outer circumference uncoated portion B3 has a low height, the outer circumference uncoated portion B3 is not substantially affected even when the battery housing 142 is press-fitted from the outside to form the beading portion 147. Therefore, the outer circumference uncoated portion B3 is not pressed by other components such as the beading portion 147, and thus partial shape deformation of the electrode assembly 141 is prevented, thereby preventing a short circuit inside the cylindrical battery 140.

Preferably, when the press-in depth of the beading portion 147 is defined as D1 and the radial length from the inner circumference of the battery housing 142 to the boundary point between the outer circumference uncoated portion B3 and the intermediate uncoated portion B2 is defined as D2, the relation D1; D2 can be satisfied. In this case, when the battery housing 142 is press-fitted to form the beading portion 147, damage to the outer circumference uncoated portion B3 is substantially prevented.

The crimping portion 148 is formed on the upper portion of the beading portion 147. The crimping portion 148 has an extended and bent shape to surround the outer circumference of the cap plate 143a disposed on the beading portion 147 and a part of the upper surface of the cap plate 143a.

The cylindrical battery 140 may further include a first current collecting plate 144 and/or a second current collecting plate 145 and/or an insulator 146.

The first current collecting plate 144 is coupled to the upper portion of the electrode assembly 141. The first current collecting plate 144 is made of a conductive metal material such as aluminum, copper, or nickel and is electrically connected to the uncoated portion 146a of the first electrode. A lead 149 may be connected to the first current collecting plate 144. The lead 149 may extend upward from the electrode assembly 141 and be coupled to the connection plate 143c or directly coupled to the lower surface of the cap plate 143a. The lead 149 may be coupled with other components by welding.

Preferably, the first current collecting plate 144 may be integrally formed with the lead 149. In this case, the lead 149 may have a long plate shape extending outward from the center of the first current collecting plate 144.

The first current collecting plate 144 may have a plurality of irregularities (not shown) radially formed on the lower surface thereof. When the radial irregularities are provided, the irregularities may be press-fitted into the uncoated portion 146a of the first electrode by pressing the first current collecting plate 144.

The first current collecting plate 144 is coupled to the end of the uncoated portion 146a of the first electrode. The coupling between the uncoated portion 146a and the first current collecting plate 144 may be performed by, for example, laser welding. Laser welding may be performed by partially melting the base material of the current collecting plate. In a modification, welding between the first current collecting plate 144 and the uncoated portion 146a may be performed with a solder interposed therebetween. In this case, the solder may have a lower melting point compared to the first current collecting plate 144 and the uncoated portion 146a. The laser welding may be replaced with resistance welding or ultrasonic welding.

The second current collecting plate 145 may be coupled to the lower surface of the electrode assembly 141. One surface of the second current collecting plate 145 may be coupled to the uncoated portion 146b of the second electrode by welding, and the opposite surface may be coupled to the inner bottom surface of the battery housing 142 by welding. The coupling structure between the second current collecting plate 145 and the uncoated portion 146b of the second electrode may be substantially the same as the coupling structure between the first current collecting plate 144 and the uncoated portion 146a of the first electrode.

The uncoated portions 146a, 146b are not limited to the illustrated structure. Accordingly, the uncoated portions 146a, 146b may selectively have an uncoated portion structure of an electrode according to embodiments (modifications) as well as a conventional uncoated portion structure.

The insulator 146 may cover the first current collecting plate 144. The insulator 146 may prevent direct contact between the first current collecting plate 144 and the inner circumference of the battery housing 142 by covering the first current collecting plate 144 on the upper surface of the first current collecting plate 144.

The insulator 146 has a lead hole 151 so that the lead 149 extending upward from the first current collecting plate 144 may be drawn out. The lead 149 is drawn upward through the lead hole 151 and coupled to the lower surface of the connection plate 143*c* or the lower surface of the cap plate 143*a*.

A peripheral region of the edge of the insulator 146 may be interposed between the first current collecting plate 144 and the beading portion 147 to fix the combination of the electrode assembly 141 and the first current collecting plate 144. Accordingly, in the combination of the electrode assembly 141 and the first current collecting plate 144, the movement of the battery 140 in the height direction is restricted, so the assembly stability of the battery 140 may be improved.

The insulator 146 may be made of an insulating polymer resin. In one example, insulator 146 may be made of polyethylene, polypropylene, polyimide or polybutylene terephthalate.

The battery housing 142 may further include a venting portion 152 formed at the lower surface thereof. The venting portion 152 corresponds to a region having a smaller thickness compared to the surrounding region, in the lower surface of the battery housing 142. The venting portion 152 is structurally weak compared to the surrounding region. Therefore, when an abnormality occurs in the cylindrical battery 140 and the internal pressure increases to a predetermined level or more, the venting portion 152 may be ruptured, so that the gas generated inside the battery housing 142 may be discharged to the outside.

The venting portion 152 may be continuously or discontinuously formed while drawing a circle on the lower surface of the battery housing 142. In a modification, the venting portion 152 may be formed in a straight line pattern or other patterns.

Figure 28:
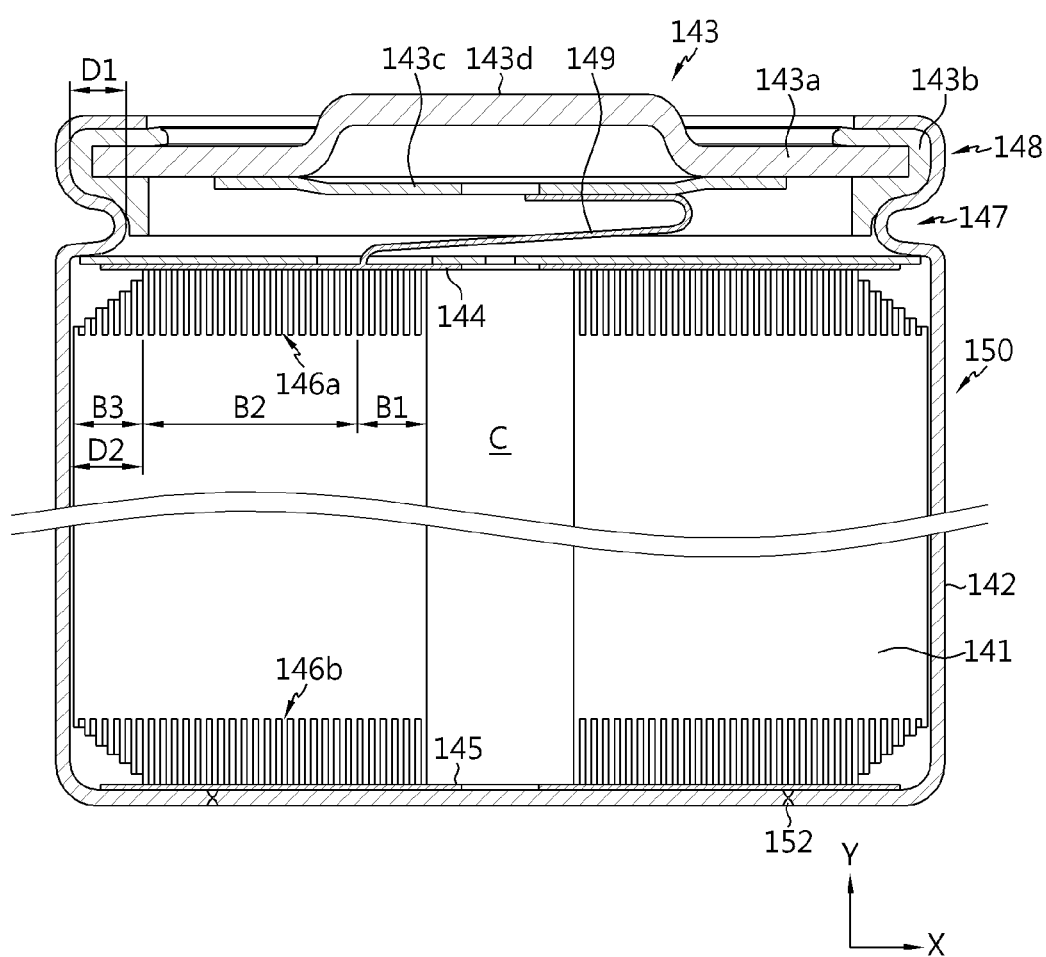
FIG. 28 is a cross-sectional view showing a cylindrical battery according to another embodiment of the present disclosure, taken along the Y-axis direction.

FIG. 28 is a cross-sectional view showing a cylindrical battery 150 according to another embodiment of the present disclosure, taken along the Y-axis direction.

Referring to FIG. 28, the cylindrical battery 150 is substantially identical to the cylindrical battery 140 of FIG. 27, except that the electrode structure of the second embodiment (modification) is employed in the uncoated portion 146*a* of the first electrode.

Referring to FIG. 28, the uncoated portion 146*a* of the first electrode may have a shape in which the height of the outer circumference uncoated portion B3 gradually or stepwise decreases toward the inner circumference of the battery housing 142. Preferably, an imaginary line connecting the top of the outer circumference uncoated portion B3 may have a shape identical or similar to the inner circumference of the beading portion 147.

The outer circumference uncoated portion B3 forms an inclined surface. Therefore, when the battery housing 142 is press-fitted to form the beading portion 147, it is possible to prevent the outer circumference uncoated portion B3 from being compressed and damaged by the beading portion 147. In addition, it is possible to suppress a phenomenon in which the outer circumference uncoated portion B3 contacts the battery housing 142 having a different polarity and causes an internal short circuit.

The other configuration of the cylindrical battery 150 is substantially the same as the embodiment (modification) described above.

The uncoated portions 146*a*, 146*b* are not limited to the illustrated structure. Accordingly, the uncoated portions 146*a*, 146*b* may selectively have an uncoated portion structure of the electrodes according to embodiments (modifications) as well as a conventional uncoated portion structure.

Figure 29:
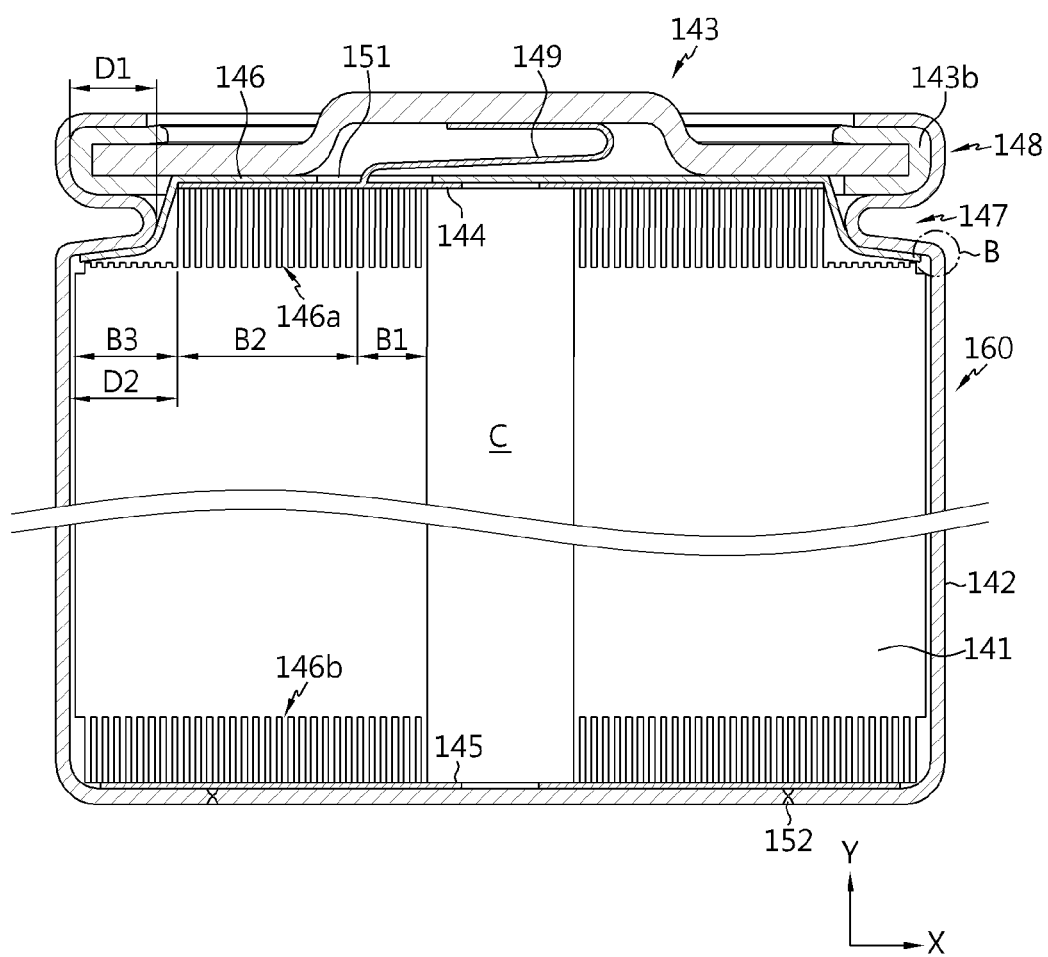
FIG. 29 is a cross-sectional view showing a cylindrical battery according to still another embodiment of the present disclosure, taken along the Y-axis direction.

FIG. 29 is a cross-sectional view showing a cylindrical battery 160 according to still another embodiment of the present disclosure, taken along the Y-axis direction.

Referring to FIG. 29, the cylindrical battery 160 is substantially identical to the cylindrical batteries 140, 150 described above, except that the lead 149 connected to the first current collecting plate 144 is directly connected to the cap plate 143*a* of the sealing body 143 through the lead hole 151 of the insulator 146, and the insulator 146 and the first current collecting plate 144 have a structure closely adhered to the lower surface of the cap plate 143*a*.

In the cylindrical battery 160, the diameter of the first current collecting plate 144 and the diameter of the outermost side of the intermediate uncoated portion B2 are smaller than the minimum inner diameter of the battery housing 142. Also, the diameter of the first current collecting plate 144 may be equal to or greater than the diameter of the outermost side of the intermediate uncoated portion B2.

Specifically, the minimum inner diameter of the battery housing 142 may correspond to the inner diameter of the battery housing 142 at a position where the beading portion 147 is formed. At this time, the diameters of the first current collecting plate 144 and the outermost side of the intermediate uncoated portion B2 are smaller than the inner diameter of the battery housing 142 at the position where the beading portion 147 is formed. Also, the diameter of the first current collecting plate 144 may be equal to or greater than the diameter of the outermost side of the intermediate uncoated portion B2. The peripheral region of the edge of the insulator 146 may be interposed between the outer circumference uncoated portion B3 and the beading portion 147 in a downwardly bent state to fix the combination of the electrode assembly 141 and the first current collecting plate 144.

Preferably, the insulator 146 includes a part covering the outer circumference uncoated portion B3 and a part covering the first current collecting plate 144, and a part connecting the two parts may have a bent shape corresponding to the curved shape of the beading portion 147. The insulator 146 may insulate the outer circumference uncoated portion B3 and the inner circumference of the beading portion 147 and at the same time insulate the first current collecting plate 144 and the inner circumference of the beading portion 147.

The first current collecting plate 144 may be positioned higher than the bottom of the beading portion 147 and may be coupled to the core-side uncoated portion B1 and the intermediate uncoated portion B2. At this time, the press-in depth D1 of the beading portion 147 is equal to or smaller than the distance D2 from the inner circumference of the battery housing 142 to the boundary between the outer circumference uncoated portion B3 and the intermediate uncoated portion B2. Accordingly, the core-side uncoated portion B1, the intermediate uncoated portion B2, and the first current collecting plate 144 coupled thereto may be positioned higher than the bottom of the beading portion 147. The bottom of the beading portion 147 means a bending point B between the portion of the battery housing 142 where the electrode assembly 141 is accommodated and the beading portion 147.

Since the core-side uncoated portion B1 and the intermediate uncoated portion B2 occupy the inner space in the radial direction of the beading portion 147, an empty space between the electrode assembly 141 and the cap plate 143*a* may be minimized. In addition, the connection plate 143*c* located in the empty space between the electrode assembly 141 and the cap plate 143*a* is omitted. Accordingly, the lead 149 of the first current collecting plate 144 may be directly coupled to the lower surface of the cap plate 143*a*. According to the above structure, the empty space in the battery is reduced, and the energy density can be maximized as much as the reduced empty space.

In the cylindrical battery 160, the first current collecting plate 144 and the second current collecting plate 145 may be welded to the ends of the uncoated portions 146*a*, 146*b*, respectively, in the same manner as in the above embodiment.

The uncoated portions 146*a*, 146*b* are not limited to the illustrated structure. Accordingly, the uncoated portions 146*a*, 146*b* may selectively have an uncoated portion structure of an electrode according to embodiments (modifications) as well as a conventional uncoated portion structure.

Figure 30:
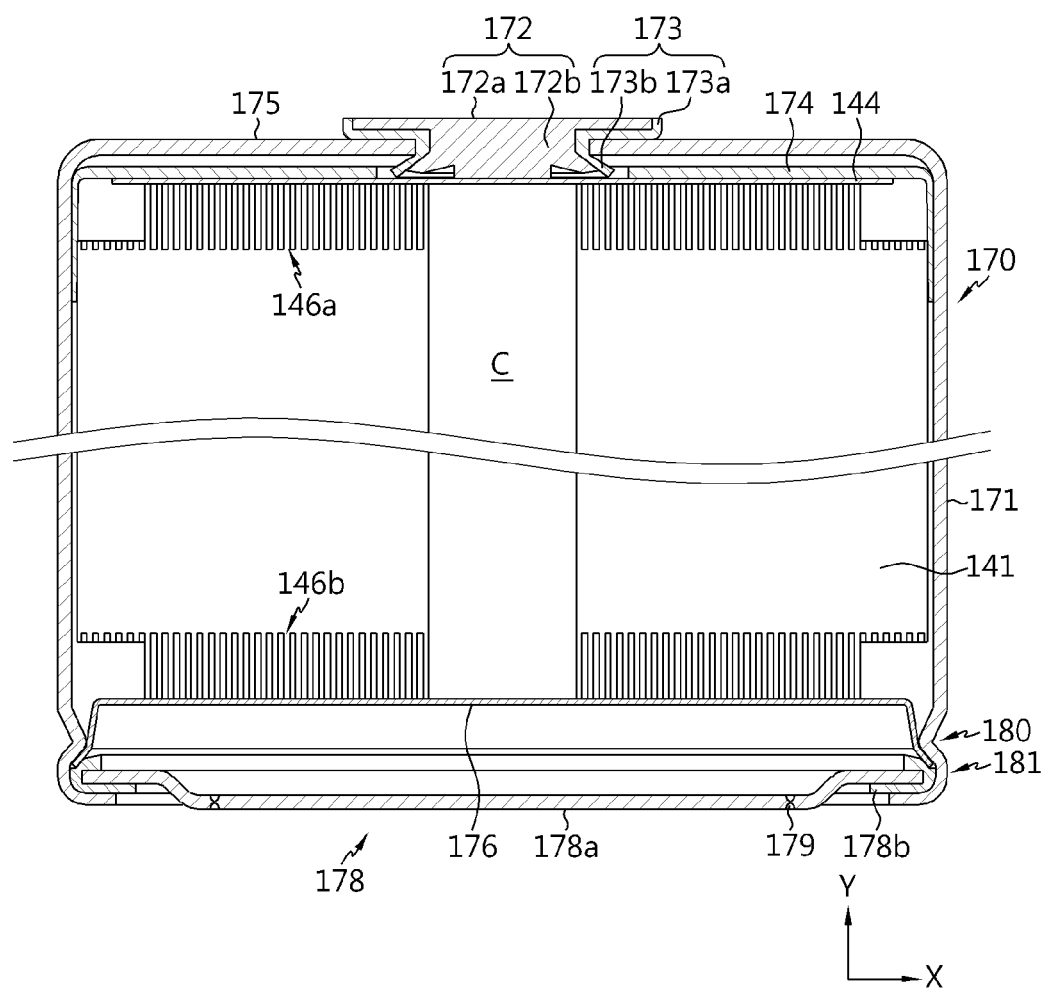
FIG. 30 is a cross-sectional view showing a cylindrical battery according to still another embodiment of the present disclosure, taken along the Y-axis direction.

FIG. 30 is a cross-sectional view showing a cylindrical battery 170 according to still another embodiment of the present disclosure, taken along the Y-axis direction.

Referring to FIG. 30, the structure of the electrode assembly of the cylindrical battery 170 is substantially identical to that of the cylindrical battery 140 shown in FIG. 27, but the structure except for the electrode assembly is changed.

Specifically, the cylindrical battery 170 includes a battery housing 171 through which an external terminal 172 is installed. The external terminal 172 is installed on the closed surface (upper surface in the drawing) of the battery housing 171. The external terminal 172 is riveted to the perforated hole of the battery housing 171 with the insulating second gasket 173 interposed therebetween. The external terminal 172 is exposed to the outside in a direction opposite to the direction of gravity.

The external terminal 172 includes a terminal exposing portion 172*a* and a terminal insert portion 172*b*. The terminal exposing portion 172*a* is exposed to the outside of the closed surface of the battery housing 171. The terminal exposing portion 172*a* may be positioned approximately at the center of the closed surface of the battery housing 171. The maximum diameter of the terminal exposing portion 172*a* may be greater than the maximum diameter of the perforated hole formed in the battery housing 171. The terminal insert portion 172*b* may be electrically connected to the uncoated portion 146*a* of the first electrode through a substantially central portion of the closed surface of the battery housing 171. The terminal insert portion 172*b* may be riveted to the inner surface of the battery housing 171. That is, the lower edge of the terminal insert portion 172*b* may have a curved shape toward the inner surface of the battery housing 171. The maximum diameter of the lower part of the terminal insert portion 172*b* may be greater than the maximum diameter of the perforated hole of the battery housing 171.

The bottom surface of the terminal insert portion 172*b* may be welded to the first current collecting plate 144 connected to the uncoated portion 146*a* of the first electrode. An insulator 174 made of an insulating material may be interposed between the first current collecting plate 144 and the inner surface of the battery housing 171. The insulator 174 covers the upper portion of the first current collecting plate 144 and the top edge of the electrode assembly 141. As a result, it is possible to prevent the outer circumference uncoated portion B3 of the electrode assembly 141 from contacting the inner surface of the battery housing 171 having a different polarity to cause a short circuit. The terminal insert portion 172*b* of the external terminal 172 may be welded to the first current collecting plate 144 through the insulator 174.

The second gasket 173 is interposed between the battery housing 171 and the external terminal 172 to prevent electrical contact between the battery housing 171 and the external terminal 172 having opposite polarities. As a result, the upper surface of the battery housing 171 having a substantially flat shape may function as a second electrode terminal of the cylindrical battery 170.

The second gasket 173 includes a gasket exposing portion 173*a* and a gasket insert portion 173*b*. The gasket exposing portion 173*a* is interposed between the terminal exposing portion 172*a* of the external terminal 172 and the battery housing 171. The gasket insert portion 173*b* is interposed between the terminal insert portion 172*b* of the external terminal 172 and the battery housing 171. The gasket insert portion 173*b* may be deformed together during riveting of the terminal insert portion 172*b* to come into close contact with the inner surface of the battery housing 171. The second gasket 173 may be made of, for example, a polymer resin having insulating properties.

The gasket exposing portion 173*a* of the second gasket 173 may have an extended shape to cover the outer circumference of the terminal exposing portion 172*a* of the external terminal 172. When the second gasket 173 covers the outer circumference of the external terminal 172, it is possible to prevent a short circuit from occurring during a process of coupling an electrical connection component such as a bus bar to the upper surface of the battery housing 171 and/or the external terminal 172. Although not shown in the drawing, the gasket exposing portion 173*a* may have an extended shape to cover not only the outer circumference of the terminal exposing portion 172*a* but also a part of the upper surface.

When the second gasket 173 is made of a polymer resin, the second gasket 173 may be coupled to the battery housing 171 and the external terminal 172 by thermal fusion. In this case, airtightness at the coupling interface between the second gasket 173 and the external terminal 172 and at the coupling interface between the second gasket 173 and the battery housing 171 may be enhanced. Meanwhile, when the gasket exposing portion 173*a* of the second gasket 173 is shaped to extend to the upper surface of the terminal exposing portion 172*a*, the external terminal 172 may be integrally coupled with the second gasket 173 by insert injection.

In the upper surface of the battery housing 171, a region 175 other than a region occupied by the external terminal 172 and the second gasket 173 corresponds to a second electrode terminal having a polarity opposite to that of the external terminal 172.

The second current collecting plate 176 is coupled to the lower portion of the electrode assembly 141. The second current collecting plate 176 is made of a conductive metal material such as aluminum, steel, copper, or nickel, and is electrically connected to the uncoated portion 146*b* of the second electrode.

Preferably, the second current collecting plate 176 is electrically connected to the battery housing 171. To this end, at least apart of the edge of the second current collecting plate 176 may be interposed and fixed between the inner surface of the battery housing 171 and the first gasket 178*b*. In one example, at least a part of the edge of the second current collecting plate 176 may be fixed to the beading portion 180 by welding while being supported on the bottom surface of the beading portion 180 formed on the bottom of the battery housing 171. In a modification, at least a part of the edge of the second current collecting plate 176 may be directly welded to the inner wall surface of the battery housing 171.

The second current collecting plate 176 may include a plurality of irregularities (not shown) radially formed on a surface facing the uncoated portion 146b. When the irregularities are formed, the irregularities may be press-fitted into the uncoated portion 146b by pressing the second current collecting plate 176.

Preferably, the second current collecting plate 176 and the end of the uncoated portion 146b may be coupled by welding, for example laser welding.

The sealing body 178 sealing the lower opening of the battery housing 171 includes a cap plate 178a and a first gasket 178b. The first gasket 178b electrically separates the cap plate 178a and the battery housing 171. The crimping portion 181 fixes the edge of the cap plate 178a and the first gasket 178b together. A venting portion 179 is provided to the cap plate 178a. The configuration of the venting portion 179 is substantially the same as the embodiment (modification) described above.

Preferably, the cap plate 178a is made of a conductive metal material. However, since the first gasket 178b is interposed between the cap plate 178a and the battery housing 171, the cap plate 178a does not have an electrical polarity. The sealing body 178 seals the opening of the lower portion of the battery housing 171 and functions to discharge gas when the internal pressure of the battery 170 increases to a critical value or above.

Preferably, an external terminal 172 electrically connected to the uncoated portion 146a of the first electrode is used as the first electrode terminal. In addition, in the upper surface of the battery housing 171 electrically connected to the uncoated portion 146b of the second electrode through the second current collecting plate 176, a portion 175 excluding the external terminal 172 is used as a second electrode terminal having a different polarity from the first electrode terminal. When two electrode terminals are located on the upper portion of the cylindrical battery 170 as above, it is possible to dispose electrical connection components such as bus bars on only one side of the cylindrical battery 170. This may lead to simplification of the battery pack structure and improvement of energy density. In addition, since the portion 175 used as the second electrode terminal has a substantially flat shape, sufficient bonding area may be secured for coupling electrical connection components such as bus bars. Accordingly, the cylindrical battery 170 may lower the resistance at the bonding portion of the electrical connecting components to a desirable level.

The structure of the electrode assembly 141 and the structure of the uncoated portion are not limited to those shown, and may be replaced with structures of the above embodiments (modifications).

Figure 31:
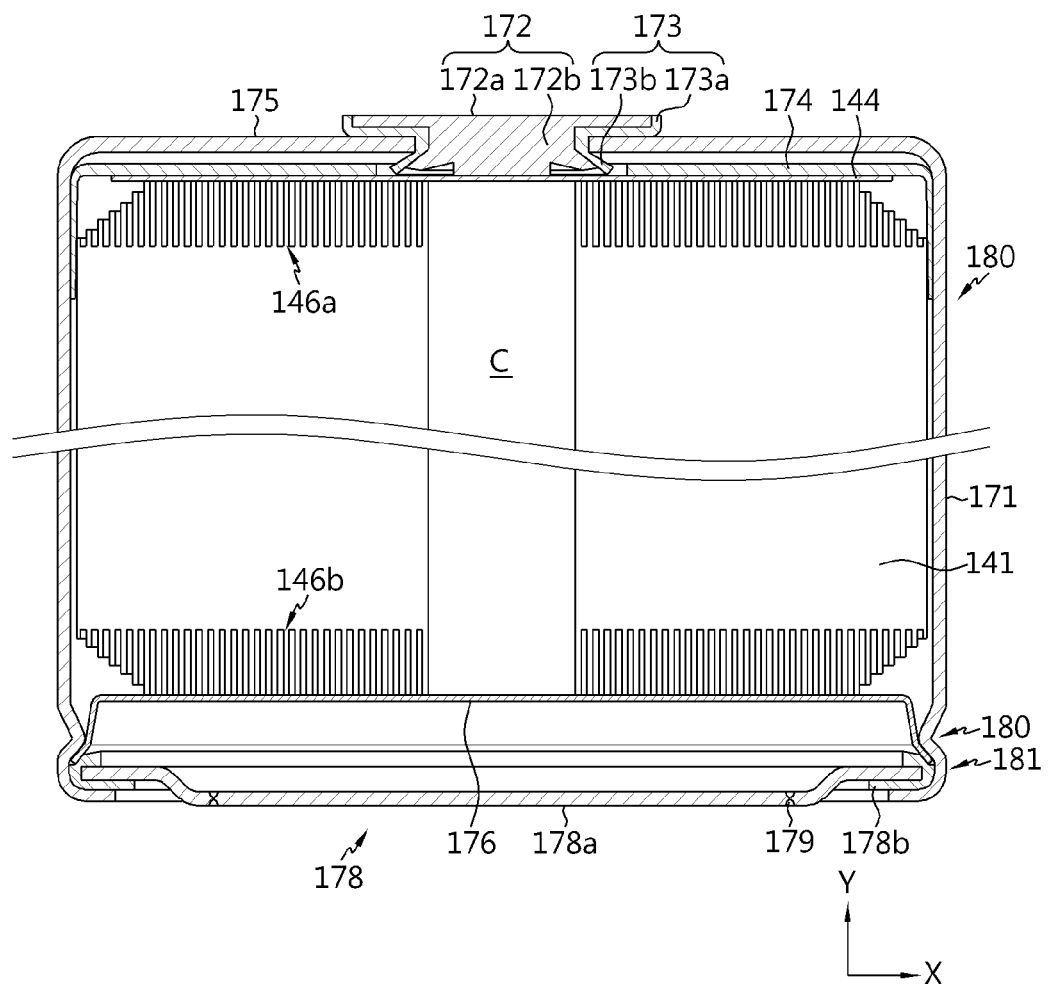
FIG. 31 is a cross-sectional view showing a cylindrical battery according to still another embodiment of the present disclosure, taken along the Y-axis direction.

FIG. 31 is a cross-sectional view showing a cylindrical battery 180 according to still another embodiment of the present disclosure, taken along the Y-axis direction.

Referring to FIG. 31, the electrode assembly 141 of the cylindrical battery 180 has substantially the same structure as that of the cylindrical battery 150 shown in FIG. 28, and the configuration other than the electrode assembly 141 is substantially the same as the cylindrical battery 170 shown in FIG. 30.

Accordingly, the configuration of the embodiments (modification) of the cylindrical batteries 150, 170 may be equally applied to the cylindrical battery 180.

In addition, the structure of the electrode assembly 141 and the structure of the uncoated portion are not limited to those shown, and may be replaced with structures of the above embodiments (modifications).

Figure 32:
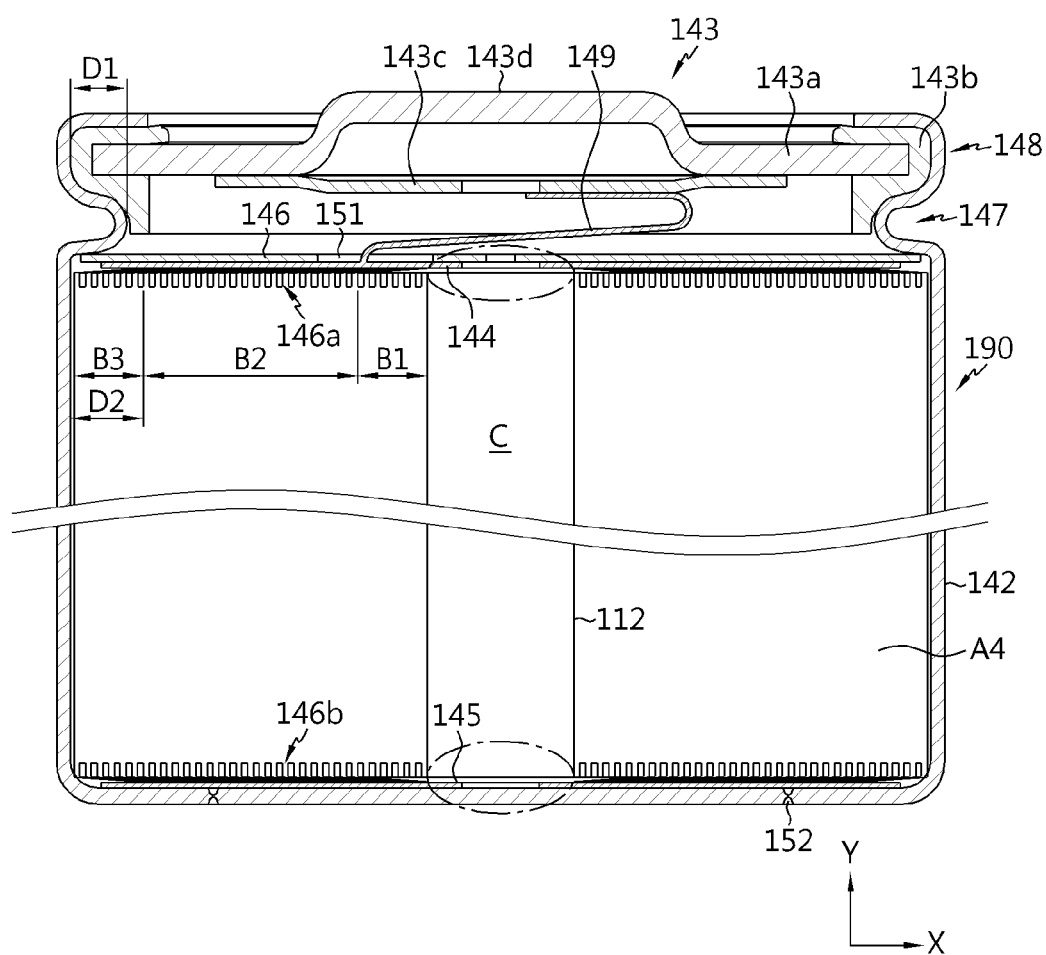
FIG. 32 is a cross-sectional view showing a cylindrical battery according to still another embodiment of the present disclosure, taken along the Y-axis direction.

FIG. 32 is a cross-sectional view showing a cylindrical battery 190 according to still another embodiment of the present disclosure, taken along the Y-axis direction.

Referring to FIG. 32, the cylindrical battery 190 includes the electrode assembly A4 shown in FIG. 24, and other configurations except for the electrode assembly A4 are substantially the same as those of the cylindrical battery 140 shown in FIG. 27.

Referring to FIG. 32, the uncoated portions 146a, 146b of electrode assembly A4 are bent from the outer circumference toward the core. At this time, since the core-side uncoated portion B1 has a lower height than other portions, it is not substantially bent. The first current collecting plate 144 may be welded to the bent surface of the uncoated portion 146a, and the second current collecting plate 145 may be welded to the bent surface of the uncoated portion 146b. When the uncoated portions 146a, 146b are bent, the bent surfaces may be formed on the upper and lower portions of electrode assembly A4, respectively, while overlapping in several layers along the Y-axis direction.

In the electrode assembly A4, the core-side uncoated portion B1 has a relatively smaller height than the other portions. In addition, as shown in FIG. 24, the bending length H of the innermost uncoated portion in the intermediate uncoated portion B2 is equal to or smaller than the radial length R of the core-side uncoated portion B1.

Therefore, even if the uncoated portion 146a is bent toward the core, the cavity 112 of the core of the electrode assembly A4 may be opened upward without being blocked (see the dotted circle).

If the cavity 112 is not blocked, there is no difficulty in the electrolyte injection process, and the electrolyte injection efficiency is improved. In addition, a welding process between the second current collecting plate 145 and the battery housing 142 may be easily performed by inserting a welding jig through the cavity 112.

When the uncoated portions 146a, 146b have a segment structure, if the width and/or height and/or separation pitch of the segments is adjusted to satisfy the numerical range of the above embodiment, when the segments are bent, the segments are overlapped in several layers to sufficiently secure the welding strength, and an empty space (gap) is not form on the bent surface.

The structures of the uncoated portions 146a, 146b may be changed as desired to structures according to the above embodiments (modifications), different from those shown in the drawings. In addition, a conventional uncoated portion structure may be applied to either one of the uncoated portions 146a, 146b without limitation.

Figure 33:
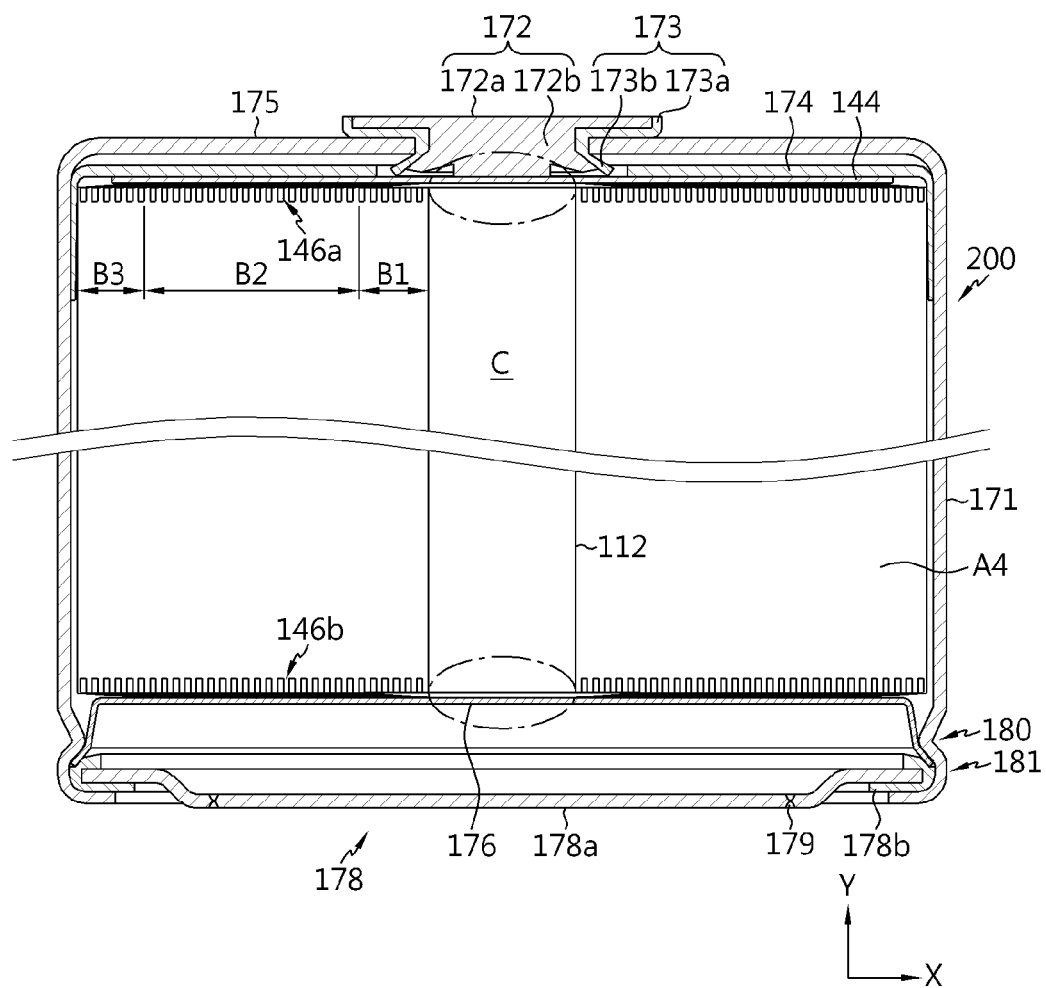
FIG. 33 is a cross-sectional view showing a cylindrical battery according to still another embodiment of the present disclosure, taken along the Y-axis direction.

FIG. 33 is a cross-sectional view showing a cylindrical battery 200 according to still another embodiment of the present disclosure, taken along the Y-axis direction.

Referring to FIG. 33, the cylindrical battery 200 includes the electrode assembly A4 shown in FIG. 24, and other configurations except for the electrode assembly A4 are substantially the same as those of the cylindrical battery 180 shown in FIG. 31.

Referring to FIG. 33, the uncoated portions 146a, 146b of the electrode assembly A4 are bent from the outer circumference toward the core. At this time, since the core-side uncoated portion B1 has a lower height than other portions, it is not substantially bent. The first current collecting plate 144 may be welded to the bent surface of the uncoated portion 146a, and the second current collecting plate 176 may be welded to the bent surface of the uncoated portion 146b.

In the electrode assembly A4, the core-side uncoated portion B1 has a relatively lower height than the other portions. In addition, as shown in FIG. 24, the bending length H of the innermost uncoated portion in the intermediate uncoated portion B2 is equal to or smaller than the radial length R of the core-side uncoated portion B1.

Therefore, even when the uncoated portions 146a, 146b are bent toward the core, the cavity 112 of the core of the electrode assembly A4 may be opened upward without being blocked (see the dotted circle).

If the cavity 112 is not blocked, there is no difficulty in the electrolyte injection process, and the electrolyte injection efficiency is improved. In addition, a welding process between the second current collecting plate 176 and the battery housing 171 may be easily performed by inserting a welding jig through the cavity 112.

When the uncoated portions 146a, 146b have a segment structure, if the width and/or height and/or separation pitch of the segments are adjusted to satisfy the numerical range of the above embodiment, when the segments are bent, the segments are overlapped in several layers to sufficiently secure the welding strength, and an empty space (gap) is not formed on the bent surface.

The structures of the uncoated portions 146a, 146b may be changed as desired to structures according to the above embodiments (modifications), different from those shown in the drawings. In addition, a conventional uncoated portion structure may be applied to either one of the uncoated portions 146a, 146b without limitation.

Figure 34:
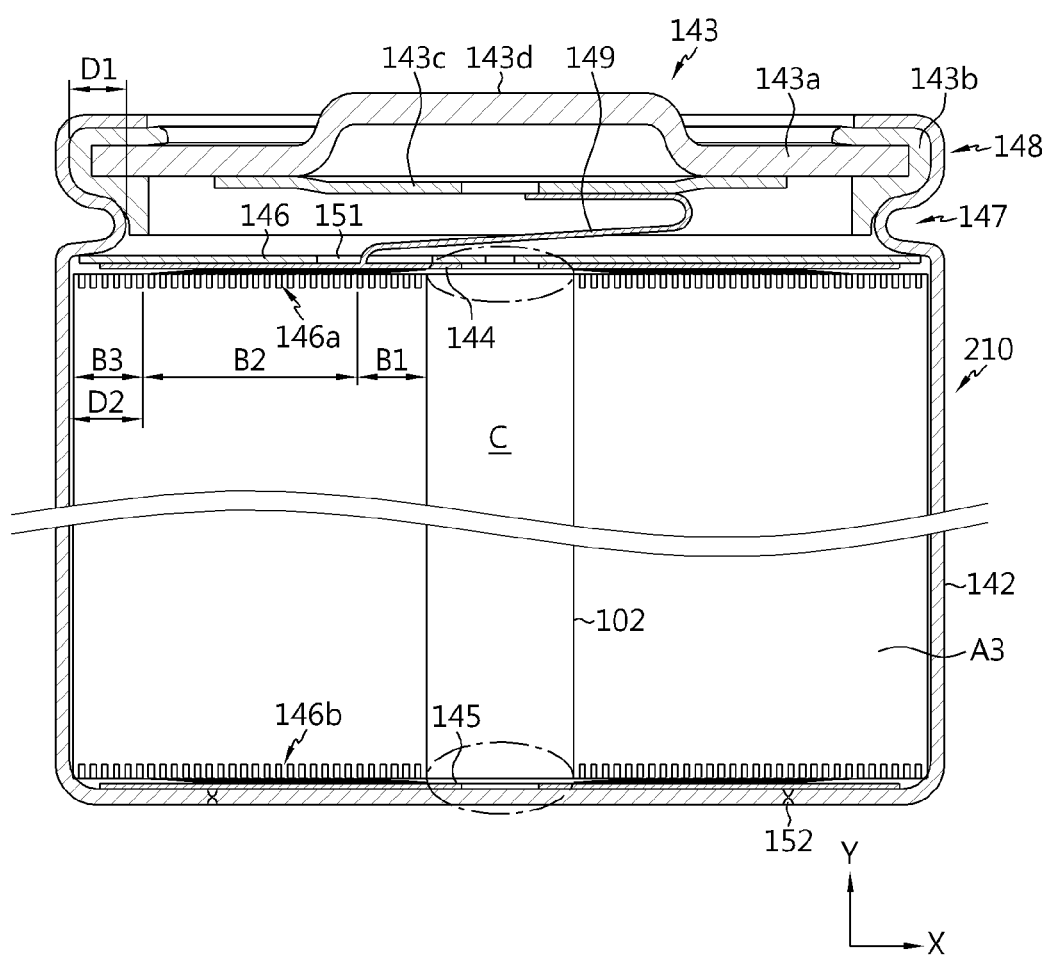
FIG. 34 is a cross-sectional view showing a cylindrical battery according to still another embodiment of the present disclosure, taken along the Y-axis direction.

FIG. 34 is a cross-sectional view showing a cylindrical battery 210 according to still another embodiment of the present disclosure, taken along the Y-axis direction.

Referring to FIG. 34, the cylindrical battery 210 includes the electrode assembly A3 shown in FIG. 23, and other configurations except for the electrode assembly A3 are substantially the same as those of the cylindrical battery 140 shown in FIG. 27.

Preferably, the uncoated portions 146a, 146b of the electrode assembly A3 are bent from the outer circumference toward the core. At this time, since the core-side uncoated portion B1 and the outer circumference uncoated portion B3 of the uncoated portion 146a have a lower height than other portions, they are not substantially bent. This is the same for the uncoated portion 146b. The first current collecting plate 144 may be welded to the bent surface of the uncoated portion 146a, and the second current collecting plate 145 may be welded to the bent surface of the uncoated portion 146b.

The height of the core-side uncoated portion B1 is relatively lower than that of the intermediate uncoated portion B2. In addition, as shown in FIG. 23, the bending length H of the innermost uncoated portion in the intermediate uncoated portion B2 is equal to or smaller than the radial length R of the core-side uncoated portion B1.

Therefore, even if the uncoated portions 146a, 146b are bent toward the core, the cavity 102 of the core of the electrode assembly A3 may be opened upward without being blocked (see the dotted circle).

If the cavity 112 is not blocked, there is no difficulty in the electrolyte injection process, and the electrolyte injection efficiency is improved. In addition, a welding process between the second current collecting plate 145 and the battery housing 142 may be easily performed by inserting a welding jig through the cavity.

Also, the height of the outer circumference uncoated portion B3 is relatively lower than that of the intermediate uncoated portion B2. Therefore, when the uncoated portion 146a is bent, the outer circumference uncoated portion B3 is substantially not bent. In addition, since the outer circumference uncoated portion B3 is sufficiently spaced from the beading portion 147, it is possible to solve the problem that the outer circumference uncoated portion B3 is damaged during the press-fitting of the beading portion 147.

When the uncoated portions 146a, 146b have a segment structure, if the width and/or height and/or separation pitch of the segments is adjusted to satisfy the numerical range of the above embodiment, when the segments are bent, the segments are overlapped in several layers to sufficiently secure the welding strength, and an empty space (gap) is not form on the bent surface.

The structures of the uncoated portions 146a, 146b may be changed as desired to structures according to the above embodiments (modifications), different from those shown in the drawings. In addition, a conventional uncoated portion structure may be applied to either one of the uncoated portions 146a, 146b without limitation.

Figure 35:
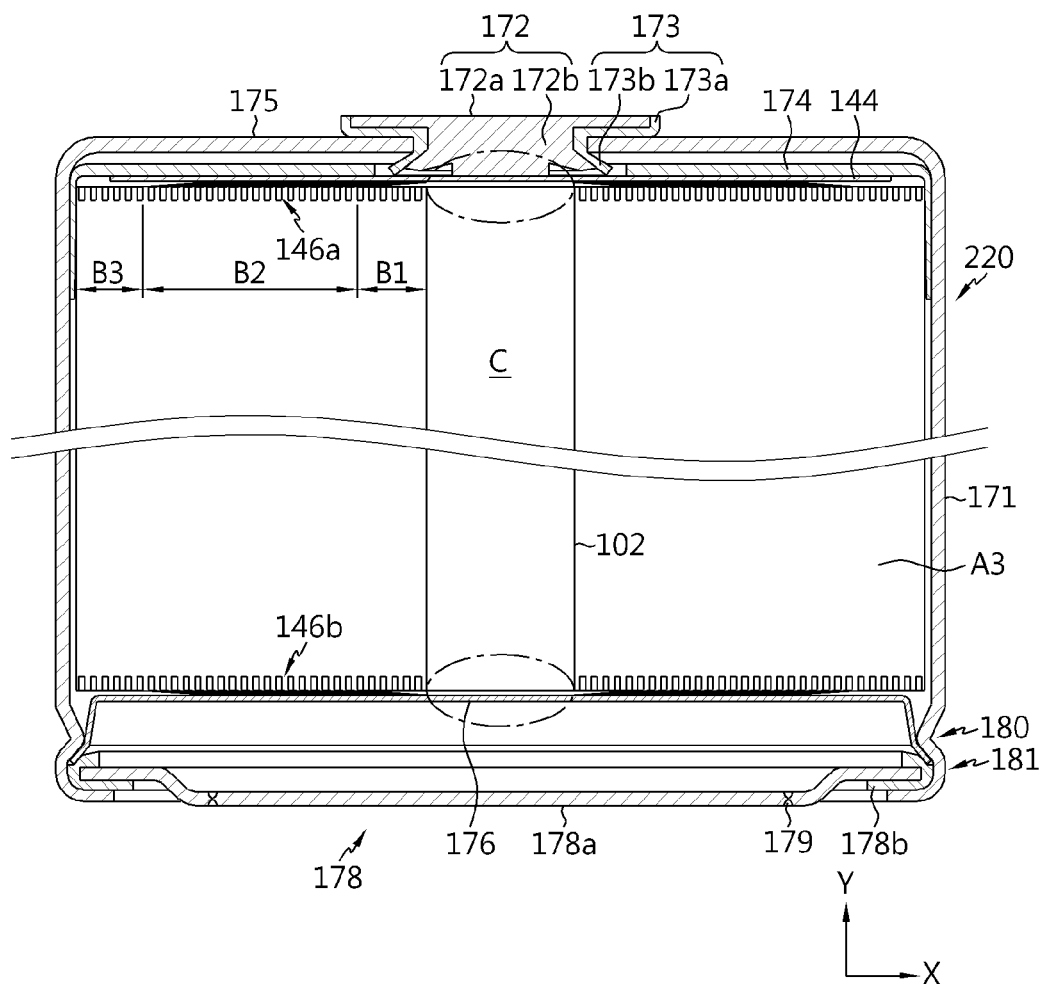
FIG. 35 is a cross-sectional view showing a cylindrical battery according to still another embodiment of the present disclosure, taken along the Y-axis direction.
Figure 39:
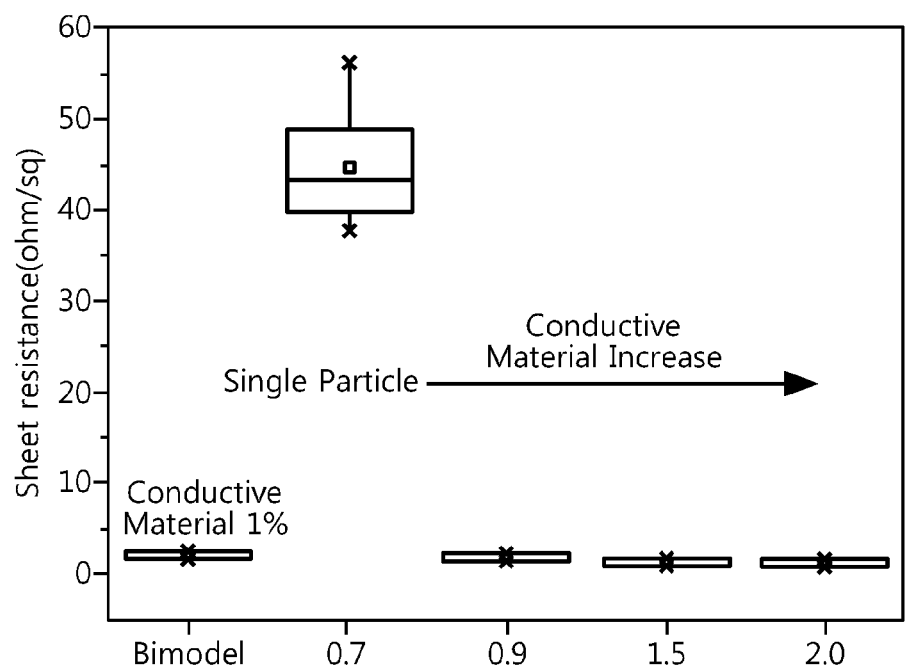
FIGS. 39 to 42 are graphs showing sheet resistance and high-temperature life characteristics for each conductive material ratio when single particle-based active material particles are applied as the positive electrode active material.
Figure 40:
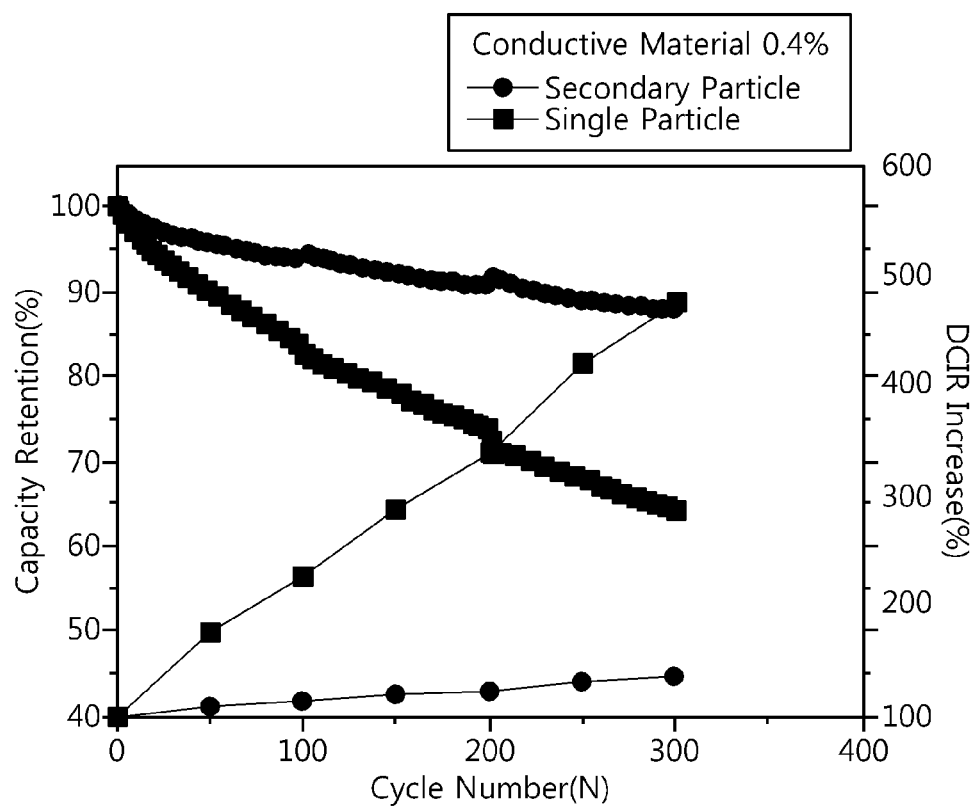
Figure 41:
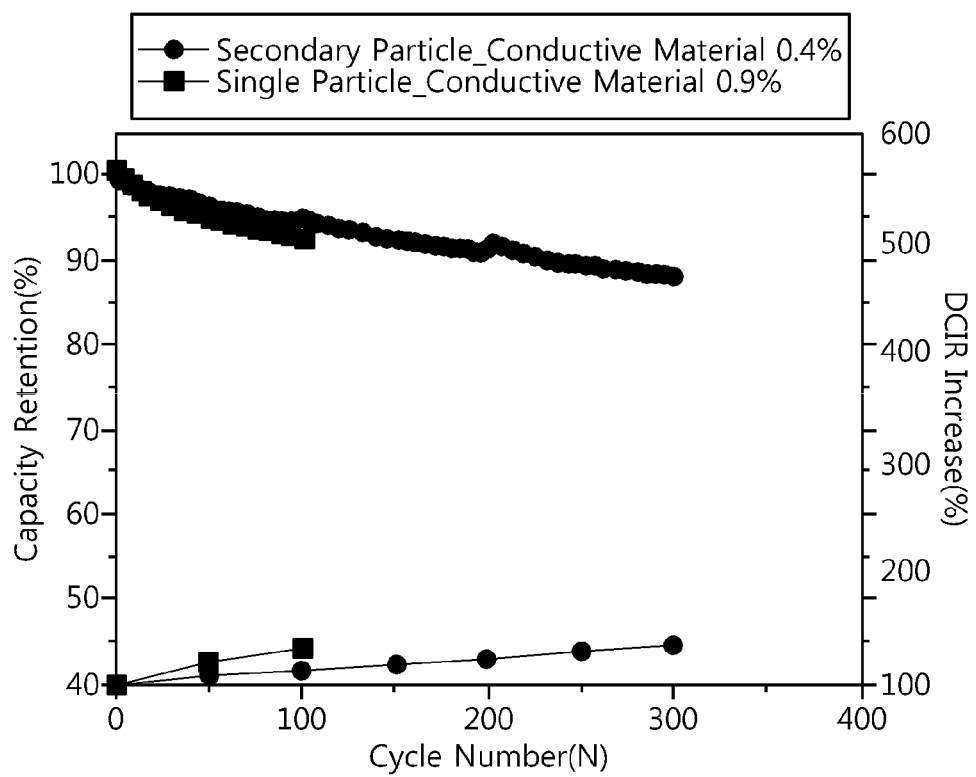

FIG. 35 is a cross-sectional view showing a cylindrical battery 220 according to still another embodiment of the present disclosure, taken along the Y-axis direction.

Referring to FIG. 35, the cylindrical battery 220 includes the electrode assembly A3 shown in FIG. 23, and other configurations except for the electrode assembly A3 are substantially the same as those of the cylindrical battery 180 shown in FIG. 31.

Preferably, the uncoated portions 146a, 146b of the electrode assembly A3 are bent from the outer circumference toward the core. At this time, since the core-side uncoated portion B1 of the uncoated portion 146a has a lower height than other portions, it is not substantially bent. This is the same for the uncoated portion 146b. The first current collecting plate 144 may be welded to the bent surface of the uncoated portion 146a, and the second current collecting plate 176 may be welded to the bent surface of the uncoated portion 146b.

In the electrode assembly A3, the height of the core-side uncoated portion B1 is relatively lower than that of the intermediate uncoated portion B2. In addition, as shown in FIG. 23, the bending length H of the innermost uncoated portion in the intermediate uncoated portion B2 is equal to or smaller than the radial length R of the core-side uncoated portion B1.

Therefore, even if the uncoated portions 146a, 146b are bent toward the core, the cavity 102 of the core of the electrode assembly A3 may be opened upward without being blocked (see the dotted circle).

If the cavity 112 is not blocked, there is no difficulty in the electrolyte injection process, and the electrolyte injection efficiency is improved. In addition, a welding process between the second current collecting plate 176 and the battery housing 171 may be easily performed by inserting a welding jig through the cavity 102.

Also, the height of the outer circumference uncoated portion B3 of the uncoated portion 146a is relatively lower than that of the intermediate uncoated portion B2. Therefore, when the uncoated portion 146a is bent, the outer circumference uncoated portion B3 is substantially not bent. Those features may also be applied to the uncoated portion 146b.

When the uncoated portions 146a, 146b have a segment structure, if the width and/or height and/or separation pitch of the segments is adjusted to satisfy the numerical range of the above embodiment, when the segments are bent, the segments are overlapped in several layers to sufficiently secure the welding strength, and an empty space (gap) is not form on the bent surface.

The structures of the uncoated portions 146a, 146b may be changed as desired to structures according to the above embodiments (modifications), different from those shown in the drawings. In addition, a conventional uncoated portion structure may be applied to either one of the uncoated portions 146a, 146b without limitation.

The cylindrical battery according to the above embodiments (modifications) may be used to manufacture a battery pack (see FIG. 13a), and the battery pack may be mounted in a vehicle (see FIG. 13b).

According to the present invention, it is possible to effectively prevent an internal short circuit from being caused by meandering of the electrodes during manufacture of the electrode assembly.

According to another present disclosure, the internal resistance of a cylindrical battery may be reduced and energy density may be increased by using the uncoated portion itself protruding on the upper and lower portions of the electrode assembly as an electrode tab.

According to another aspect of the present disclosure, by improving the uncoated portion structure of the electrode assembly to prevent interference between the electrode assembly and the inner circumference of the battery housing in the process of forming the beading portion of the battery housing, it is possible to prevent a short circuit from occurring inside the cylindrical battery due to partial deformation of the electrode assembly.

According to still another aspect of the present disclosure, by improving the structure of the uncoated portion of the electrode assembly, it is possible to prevent the uncoated portion near the bending point from being torn when the uncoated portion is bent, and it is possible to improve the welding strength by sufficiently increasing the number of overlapping layers of the uncoated portion.

According to still another aspect of the present disclosure, by improving the structure of the uncoated portion adjacent to the core of the electrode assembly, it is possible to prevent the cavity in the core of the electrode assembly from being blocked when the uncoated portion is bent, so that the electrolyte injection process and the process of welding the battery housing and the current collecting plate may be easily performed.

According to still another aspect of the present invention, it is possible to provide an electrode assembly with improved electrolyte impregnation characteristics by optimizing the position of the separator around the segmental structure of the uncoated region.

According to still another aspect of the present disclosure, it is possible to provide a cylindrical battery having a structure with low internal resistance, prevention of internal short circuit, and improved welding strength between the current collecting plate and the uncoated portion, and a battery pack and a vehicle including the cylindrical battery.

Hereinafter, an embodiment of a positive electrode active material used in the cylindrical battery according to the present disclosure will be described.

In an embodiment, the "primary particle" is a particle in which no grain boundary appears when observed in a field of view of 5000 to 20000 magnification using a scanning electron microscope (SEM) or an electron back scatter diffraction (EBSD). "Average particle diameter of primary particles" means an arithmetic average value calculated after measuring particle diameters of primary particles observed in a SEM or EBSD image.

"Secondary particle" is a particle formed by aggregating a plurality of primary particles. In the present disclosure, a secondary particle in which 10 or less primary particles are aggregated will be referred to as pseudo-single particles in order to distinguish it from a conventional secondary particle formed by aggregating tens to hundreds of primary particles.

In the present disclosure, "specific surface area" is measured by the BET method, and may be specifically calculated from the nitrogen gas adsorption amount under liquid nitrogen temperature (77K) using BELSORP-mini II of BEL Japan.

In the present disclosure, "$D_{min}$", "$D_{50}$" and "$D_{max}$" are particle size values of the cumulative volume distribution of the positive electrode active material measured using a laser diffraction method. Specifically, $D_{min}$ is a minimum particle size appearing in the cumulative volume distribution, $D_{50}$ is a particle size when the cumulative volume amount is 50%, and $D_{max}$ is a maximum particle size appearing in the cumulative volume distribution. If the positive electrode active material is a single particle, $D_{50}$ means an average particle diameter of the primary particles. In addition, when the positive electrode active material is a pseudo-single particle, $D_{50}$ means an average particle diameter of particles formed by aggregating primary particles.

The particle size value of the cumulative volume distribution may be measured by, for example, dispersing the positive electrode active material in a dispersion medium, then introducing the same into a commercially available laser diffraction particle size measuring device (e.g., Microtrac MT 3000), irradiating ultrasonic waves of about 28 kHz with output of 60 W thereto, and obtaining a cumulative volume particle size distribution graph.

In the present disclosure, "consist essentially of A" indicates that the A component and any unmentioned components that do not substantially affect the basic and novel characteristics of the present disclosure are included. The basic and novel characteristics of the present disclosure include at least one of minimizing particle breakage during battery manufacturing, minimizing gas generated by such particle breakage, and minimizing the occurrence of internal cracks. A person skilled in the art may recognize the material influence of these characteristics.

As a result of repeated research to develop a positive electrode for an electrochemical device with high safety while realizing high capacity and an electrochemical device including the same, inventors of the present discloser have confirmed that the safety of a large cylindrical battery can be dramatically improved when the positive electrode active material in the form of a single particle composed of one primary particle or a pseudo-single particle, which is an aggregate of 10 or less primary particles, is used alone as a positive electrode active material.

According to one aspect, the positive electrode includes a positive electrode current collector; and a positive electrode active material layer formed on at least one side surface of the positive electrode current collector, wherein the positive electrode active material layer may include a positive electrode active material, and optionally, a conductive material and/or a binder.

The positive electrode may have a structure in which a positive electrode active material layer is formed on at least one surface or both surfaces of a long sheet-shaped positive electrode current collector, and the positive electrode active material layer may include a positive electrode active material and a binder.

Specifically, the positive electrode may be manufactured by applying a positive electrode slurry, which is prepared by dispersing a positive electrode active material, a conductive material and a binder in a solvent such as dimethyl sulfoxide (DMSO), isopropyl alcohol, N-methyl pyrrolidone (NMP), acetone, water or the like, on one surface or both surfaces of a long sheet-shaped positive electrode current collector, removing the solvent of the positive electrode slurry through a drying process, and then roll-pressing the same. Meanwhile, when the positive electrode slurry is applied, a positive electrode including an uncoated portion (non-coated portion) may be manufactured by not applying the positive electrode slurry to a partial area of the positive electrode current collector, for example, one end of the positive electrode current collector.

In another aspect, the positive electrode active material includes single particle-based active material particles. In one embodiment, the single particle-based active material particles may be 90 wt % or more, 95 wt % or more, 98 wt % or more, or 99 wt % or more, based on 100 wt % of the positive electrode active material. In one specific embodiment, the positive electrode active material may be composed of only the single particle-based active material particles.

In this specification, the single particle-based active material particle refers to a single particle, a pseudo-single particle, or both of them. The single particle is a particle composed of one primary particle, and the pseudo-single particle is an aggregate of 10 or less primary particles.

Conventionally, it has been common to use a spherical secondary particle in which tens to hundreds of primary particles are aggregated as a positive electrode active material of a lithium battery. However, in the case of a positive electrode active material in the form of secondary particles in which many primary particles are aggregated, particle breakage in which primary particles fall off is easy to occur in the rolling process when manufacturing a positive electrode, and cracks occur inside the particles during the charging and discharging process. When particles of the positive electrode active material are broken or cracks occur inside the particles, the contact area with the electrolyte increases, so there is a problem in that gas generation due to a side reaction with the electrolyte increases. If the gas generation inside the cylindrical battery increases, the pressure inside the battery increases and there is a risk of battery explosion. In particular, when the volume of the cylindrical battery is increased, the amount of active material inside the battery increases as the volume increases, and as a result, the amount of gas generated increases significantly, so the risk of ignition and/or explosion of the battery increases further.

In contrast, the single particle-based active material particles in the form of a single particle composed of one primary particle or a pseudo-single particle in which 10 or less primary particles are aggregated have a higher particle strength than the positive electrode active material in the existing secondary particle form in which tens to hundreds of primary particles are aggregated, so particle breakage rarely occurs during the rolling process. In addition, since the number of primary particles constituting the single-particle-based active material particle is small, the volume expansion and contraction of the primary particles during charging and discharging is small, and thus the occurrence of cracks inside the particle is significantly reduced.

Therefore, when using the single particle-based active material particles as in the present disclosure, the amount of gas generated due to particle breakage and internal cracks may be significantly reduced. Accordingly, when the single particle-based active material particles are applied to a large cylindrical battery, excellent safety may be realized.

Meanwhile, the single particle and/or pseudo-single particle is included in an amount of 95 wt % to 100 wt %, preferably 98 wt % to 100 wt %, more preferably 99 wt % to 100 wt %, further preferably 100 wt %, based on the entire weight of the positive electrode active material included in the positive electrode.

When the content of single particle and/or pseudo-single particle satisfies the above range, sufficient safety may be obtained when applied to a large-sized battery. When the positive electrode active material in the form of a secondary particle is included in an amount exceeding 5 wt % in the entire positive electrode active material, the side reaction with the electrolyte increases due to fine powder generated from the secondary particle during electrode manufacturing and charging/discharging, which may deteriorate suppression of gas generation and lower the stability improvement effect when applied to a large-sized battery.

Meanwhile, positive electrode active materials including single particles and/or pseudo-single particles according to the present disclosure may have $D_{min}$ of 1.0 μm or more, 1.1 μm or more, 1.15 μm or more, 1.2 μm or more, or 1.25 μm or more, 1.3 μm or more, or 1.5 μm or more. When the $D_{min}$ of the positive electrode active material is less than 1.0 m, the linear pressure increases during the positive electrode rolling process, which may easily cause particle breakage and deteriorate thermal stability, making it impossible to secure sufficient thermal stability when applied to a large-sized cylindrical battery.

Meanwhile, considering resistance and power characteristics, $D_{min}$ of the positive electrode active material may be 3 μm or less, 2.5 μm or less, or 2 μm or less. If $D_{min}$ is too large, the lithium ion diffusion distance within the particles may increase, and thus the resistance and power characteristics may deteriorate.

For example, $D_{min}$ of the positive electrode active material may be 1.0 μm to 3 μm, 1.0 μm to 2.5 μm, or 1.3 μm to 2.0 μm.

Meanwhile, the positive electrode active material may have a $D_{50}$ of 5 μm or less, 4 μm or less, or 3 μm or less, and may be, for example, 0.5 μm to 5 μm, preferably 1 μm to 5 μm, more preferably 2 μm to 5 μm.

The positive electrode active material in the form of single particles and/or pseudo-single particles has less lithium mobility than the positive electrode active material in the form of secondary particles because there are fewer interfaces between primary particles that serve as a diffusion path for lithium ions inside the particles, and accordingly there is a problem that the resistance increases. The increase in resistance intensifies as the size of the particles increases, and when the resistance increases, capacity and power characteristics are adversely affected. Therefore, by adjusting $D_{50}$ of the positive electrode active material to 5 μm or less, it is possible to suppress an increase in resistance by minimizing the lithium ion diffusion distance inside the positive electrode active material particle.

In addition, the positive electrode active material may have $D_{max}$ of 12 μm to 17 μm, preferably 12 μm to 16 μm, and more preferably 12 μm to 15 μm. When $D_{max}$ of the positive electrode active material satisfies the above range, resistance characteristics and capacity characteristics are more excellent. If $D_{max}$ of the positive electrode active material is too large, aggregation has occurred between single particles, and the lithium movement path inside the agglomerated particles is lengthened, resulting in poor lithium mobility, which may increase resistance. Meanwhile, if $D_{max}$ of the positive electrode active material is too small by excessive crushing process, $D_{min}$ may decrease to less than 1 μm, which causes particle breakage during rolling and deteriorates thermal stability.

Meanwhile, the positive electrode active material may have a particle size distribution (PSD) represented by Formula 1 below of 3 or less, preferably 2 to 3, more preferably 2.3 to 3.

particle size distribution $(PSD) = (D_{max} - D_{min})/D_{50}$  Formula 1

When the positive electrode active material has the above particle size distribution, the electrode density of the positive electrode may be properly maintained, and particle breakage and resistance increase may be effectively suppressed.

Meanwhile, the positive electrode active material may have an average particle diameter of the primary particles of 5 μm or less, 4 μm or less, 3 μm or less, or 2 μm or less, and may be, for example, 0.5 μm to 5 μm, preferably 1 μm to 5 μm, more preferably 2 μm to 5 μm. When the average particle diameter of the primary particles satisfies the above range, the positive electrode active material in the form of a single particle and/or pseudo-single particle having excellent electrochemical properties may be formed. If the average particle diameter of the primary particles is too small, the number of aggregations of the primary particles forming the positive electrode active material increases, reducing the effect of suppressing particle breakage during rolling. If the average particle diameter of the primary particles is too large, the lithium diffusion path may be elongated, increasing resistance and deteriorating power characteristics.

In the present disclosure, the positive electrode active material preferably has a unimodal particle size distribution. Conventionally, in order to improve the electrode density of the positive electrode active material layer, bimodal positive electrode active materials in which a large particle diameter positive electrode active material with a large average particle diameter and a small particle diameter positive electrode active material with a small average particle diameter are mixed has been used frequently. However, in the positive electrode active material in the form of single particles or pseudo-single particles, when the particle size increases, the lithium movement path lengthens and the resistance increases remarkably. Thus, when large-diameter particles are mixed and used, a problem of deterioration in capacity and power characteristics may occur. Therefore, in the present disclosure, the increase in resistance may be minimized by using a positive electrode active material having a unimodal distribution.

Meanwhile, the positive electrode active material may include lithium nickel-containing oxide, and specifically, may include lithium nickel-containing oxide containing 80 mol % or more of Ni based on the total number of moles of transition metal. Preferably, the lithium nickel-containing oxide may include 80 mol % or more and less than 100 mol % of Ni, 82 mol % or more and less than 100 mol % of Ni, or 83 mol % or more and less than 100 mol % of Ni. When the lithium nickel-containing oxide having a high Ni content is used as above, high capacity may be realized.

More specifically, the positive electrode active material may include a lithium nickel-containing oxide represented by the following [Chemical Formula 1].

$Li_aNi_bCo_cM^1_dM^2_eO_2$  [Chemical Formula 1]

In Chemical Formula 1, $M^1$ may be Mn, Al or a combination thereof, and may be preferably Mn or Mn and Al.

$M^2$ is at least one selected from the group consisting of Zr, W, Y, Ba, Ca, Ti, Mg, Ta and Nb, preferably at least one selected from the group consisting of Zr, Y, Mg, and Ti, more preferably Zr, Y or a combination thereof. The $M^2$ element is not necessarily included, but when included in an appropriate amount, it may play a role of promoting grain growth or improving crystal structure stability during sintering.

The a represents the molar ratio of lithium in the lithium nickel-containing oxide, and may be $0.8 \leq a \leq 1.2$, $0.85 \leq a \leq 1.15$, or $0.9 \leq a \leq 1.2$. When the molar ratio of lithium satisfies the above range, a crystal structure of lithium nickel-containing oxide may be stably formed.

The b represents the molar ratio of nickel among all metals except lithium in the lithium nickel-containing oxide, and may be $0.8 \leq b < 1$, $0.82 \leq b < 1$, $0.83 \leq b < 1$, $0.85 \leq b < 1$, $0.88 \leq b < 1$ or $0.90 \leq b < 1$. When the molar ratio of nickel satisfies the above range, it is possible to realize high capacity by exhibiting high energy density.

The c represents the molar ratio of cobalt among all metals except lithium in the lithium nickel-containing oxide, and may be $0 < c < 0.2$, $0 < c < 0.18$, $0.01 \leq c \leq 0.17$, $0.01 \leq c \leq 0.15$, $0.01 \leq c \leq 0.12$ or $0.01 \leq c \leq 0.10$. When the molar ratio of cobalt satisfies the above range, good resistance characteristics and power characteristics may be implemented.

The d represents the molar ratio of $M^1$ element among all metals except lithium in the lithium nickel-containing oxide, and may be $0 < d < 0.2$, $0 < d < 0.18$, $0.01 \leq d \leq 0.17$, $0.01 \leq d \leq 0.15$, $0.01 \leq d \leq 0.12$, or $0.01 \leq d \leq 0.10$. When the molar ratio of $M^1$ element satisfies the above range, the structural stability of the positive electrode active material is excellent.

The e represents the molar ratio of $M^2$ element among all metals except for lithium in the lithium nickel-containing oxide, and may be $0 < e < 0.1$ or $0 < e < 0.05$.

Meanwhile, the positive electrode active material according to the present disclosure may further include, if necessary, a coating layer including at least one coating element selected from the group consisting of Al, Ti, W, B, F, P, Mg, Ni, Co, Fe, Cr, V, Cu, Ca, Zn, Zr, Nb. Mo, Sr, Sb, Bi, Si and S on the surface of the lithium nickel-containing oxide particle. Preferably, the coating element may be Al, B, Co, or a combination thereof.

When the coating layer is present on the surface of lithium nickel-containing oxide particles, contact between the electrolyte and the lithium nickel-containing oxide is suppressed by the coating layer, thereby reducing transition metal elution or gas generation due to side reactions with the electrolyte.

The positive electrode active material may be included in an amount of 80 wt % to 99 wt %, preferably 85 wt % to 99 wt %, more preferably 90 wt % to 99 wt %, based on the total weight of the positive electrode active material layer.

Meanwhile, as the positive electrode current collector, various positive electrode current collectors used in the art may be used. For example, stainless steel, aluminum, nickel, titanium, calcined carbon or aluminum, or stainless steel surface-treated with carbon, nickel, titanium, silver, or the like may be used as the positive electrode current collector. The positive electrode current collector may typically have a thickness of 3 μm to 500 μm, and fine irregularities may be formed on the surface of the positive electrode current collector to increase adhesion of the positive electrode active material. The positive electrode current collector may be used in various forms of, for example, film, sheet, foil, net, porous material, foam, or nonwoven fabric.

Meanwhile, in one embodiment of the present disclosure, all or some of the single particle-based active material particles may have a core-shell structure in which the particle surface is coated with a conductive coating layer. The conductive coating layer may cover at least some or all of the particles. The conductive coating layer includes conductive nanomaterials.

The single particle-based active material particle has a problem in that the electrical conductivity is lowered because the resistance is higher than that of the conventional secondary particle type positive electrode active material and the contact area with the conductive material is small. When an excessive amount of conductive material is added to improve electrical conductivity, aggregation occurs in the positive electrode slurry, resulting in increased viscosity, which causes poor coating properties. Therefore, in order to implement smooth coating properties, the viscosity of the positive electrode slurry must be lowered by reducing the solid content. However, if the solid content in the positive electrode slurry decreases, the active material content decreases, which may deteriorate the capacity characteristics. In the present disclosure, in order to solve this problem, the surface of the single particle-based active material is coated with a conductive nanomaterial, so that excellent electrical conductivity may be realized without adding a separate conductive material to the positive electrode slurry.

In one embodiment of the present disclosure, when the single particle-based active material coated with a conductive nanomaterial is applied as the positive electrode active material, the positive electrode active material layer may not include a conductive material on a portion other than the conductive coating layer. Since there is no need to additionally use a conductive material that causes aggregation of the positive electrode slurry as described above, the viscosity of the positive electrode slurry may be reduced, the solid content may be decreased, and the electrode coating process efficiency and electrode adhesion may be improved.

In the present disclosure, the conductive nanomaterial may be a conductive material having a nano size so as to be smoothly coated on particles, and the type is not particularly limited. For example, the conductive nanomaterial may be a carbon nanotube, carbon nanoparticle, or the like.

The conductive nanomaterial may have various shapes, and may be, for example, spherical, flaky, or fibrous.

Meanwhile, the conductive coating layer may be formed by mixing single particle-based active material particles, which are a core part, and a conductive nanomaterial, and then thermally treating the mixture. At this time, the mixing may be performed as solid mixing or liquid mixing.

In one embodiment of the present disclosure, the positive electrode active material layer contains flake graphite. When using the single particle-based active material as the positive electrode active material, if the positive electrode active material layer contains flake graphite, in the case of rolling the positive electrode active material layer, the sliding effect of the flake graphite on the positive electrode active material is provided to improve the rolling characteristics of the electrode, and the porosity of the electrode may be lowered to a desired level. Accordingly, stability, initial resistance characteristics, and charge/discharge efficiency of a battery to which the positive electrode according to the present disclosure is applied may be improved.

In one embodiment of the present disclosure, the flake graphite may be included in an amount of 0.1 wt % to 5 wt %, preferably 0.1 wt % to 3 wt %, based on 100 wt % of the positive electrode active material layer.

When the content of flake graphite satisfies the above range, the positive electrode rolling characteristics are improved and excellent electrode density may be realized. If the content of flake graphite is too small, the effect of improving the rolling properties is insignificant, and if it is too large, it may cause an increase in slurry viscosity and decrease in phase stability, and resistance may increase due to a decrease in electrode uniformity through coupling with a conductive material.

Meanwhile, the flake graphite used in the present disclosure may have an average particle diameter of 1 μm to 20 μm, preferably 2 μm to 10 μm, more preferably 3 μm to 5 μm, but is not limited thereto. If the size of the flake graphite is too small, it is difficult to realize the desired porosity, and the current density may be lowered, resulting in lower capacity. At this time, the average particle diameter of the flake graphite may be measured using a laser diffraction method (ISO 13320).

In addition, the flake graphite may have an aspect ratio of 0.1 to 500, preferably 1 to 100, more preferably 1 to 30. When the aspect ratio of flake graphite satisfies the above range, the effect of lowering electrode resistance by improving conductivity occurs.

In addition, the flake graphite may have a density of 2.0 $g/cm^3$ to 2.5 $g/cm^3$, preferably 2.1 $g/cm^3$ to 2.4 $g/cm^3$, more preferably 2.2 $g/cm^3$ to 2.3 $g/cm^3$.

Meanwhile, in the present disclosure, the porosity of the positive electrode active material layer may be 15% to 23%, preferably 17% to 23%, more preferably 18% to 23%. When the porosity of the positive electrode active material layer satisfies the above range, the electrode density increases to realize excellent capacity and the resistance decreases. If the porosity is too low, the electrolyte impregnability is low, and lithium precipitation may occur due to non-impregnation of the electrolyte. If the porosity is too high, the contact between the electrodes is not good, which increases the resistance and decreases the energy density, so the capacity improvement effect is insignificant.

The porosity value of the positive electrode active material layer may be achieved i) by the positive electrode active material containing single particle-based active material particles and ii) by adding flake graphite to the positive electrode active material.

In implementing a high loading electrode with a relatively high loading amount of the positive electrode active material, when using a positive electrode active material in the form of a single particle or pseudo-single particle as in the present disclosure, particle breakage of the active material during rolling is significantly reduced compared to the conventional positive electrode active material in the form of a secondary particle, and damage to the positive electrode current collector (Al foil) is reduced, so rolling is possible with a relatively high linear pressure. Therefore, the porosity of the positive electrode active material layer may be decreased to the numerical range as described above, so the energy density may be increased.

In addition, if the positive electrode active material layer contains flake graphite as in the present disclosure, the flake graphite may provide a sliding effect during rolling and fill the pores of the positive electrode active material layer, so the porosity of the positive electrode active material layer may be reduced to the above numerical range.

In addition, the positive electrode may have a loading amount of 570 mg/25 cm$^2$ or more, preferably 600 mg/25 cm$^2$ to 800 mg/25 cm$^2$, more preferably 600 mg/25 cm$^2$ to 750 mg/25 cm$^2$. Specifically, in the lithium secondary battery according to the present disclosure, the loading amount of the positive electrode may be secured in a relatively high level because the rolling characteristics of the electrode are improved by applying a single particle and/or pseudo-single particle positive electrode active material and flake graphite, and through this, high-capacity characteristics may be implemented.

In one embodiment of the present disclosure, the positive electrode active material layer may further include a conductive material. The conductive material is used to impart conductivity to the electrode, and any material that does not cause chemical change inside the battery and has electronic conductivity may be used without particular limitations. Specific examples may include graphite such as natural graphite or artificial graphite; carbon-containing materials such as carbon black, acetylene black, Ketjen black, channel black, furnace black, lamp black, thermal black, carbon fiber, or carbon nanotube; metal powder or metal fiber such as copper, nickel, aluminum, or silver; conductive whiskers such as zinc oxide or potassium titanate; conductive metal oxides such as titanium oxide; and conductive polymers of polyphenylene derivatives and the like, which may be used alone or as a mixture. The conductive material may be typically included in an amount of 1 wt % to 30 wt %, preferably 1 wt % to 20 wt %, more preferably 1 wt % to 10 wt %, based on the total weight of the positive electrode active material layer.

In one specific embodiment of the present disclosure, the conductive material may include carbon nanotube.

In one embodiment of the present disclosure, the positive electrode active material may include a multi-wall carbon nanotube having a large specific surface area and a small wall number as a conductive material. The multi-wall carbon nanotube may be included in an amount of 50 wt % or more, 70 wt % or more, 90 wt % or more, or 99 wt % or more, based on 100 wt % of the conductive material. In a specific embodiment of the present disclosure, the conductive material may include only the multi-walled carbon nanotube.

In the present disclosure, the multi-wall carbon nanotube has a BET specific surface area of 300 m$^2$/g to 500 m$^2$/g. The multi-wall carbon nanotube is referred to as 'new CNT' in order to be distinguished from the conventional one.

The carbon nanotube (conventional CNT) commonly used in the art had a BET specific surface area of less than 300 m$^2$/g. The SEM images and physical properties (FIG. 38) of the new CNT (FIG. 36) used in the present disclosure and the existing CNT (FIG. 37) may be compared as follows.

As can be seen from the SEM images, the new CNT applied to the present disclosure is a bundled type and has a multi-wall structure, but has a higher BET and a smaller wall number and diameter than the conventional CNT.

In the case of using the positive electrode active material in the form of a secondary particle, sufficient electrical conductivity could be achieved even if the existing CNT was used at a level of 0.4 wt % to 0.6 wt %. However, the single particle or pseudo-single particle positive electrode active material has higher resistance, compared to the conventional secondary particle type positive electrode active material, and the contact area with the conductive material is small, so the electrical conductivity is low. Thus, in order to realize sufficient electrical conductivity using the existing CNT with a BET specific surface area of less than 300 m$^2$/g, the content of the conductive material must be 0.9 wt % or more.

FIGS. 39 to 42 are graphs showing sheet resistance and high-temperature life characteristics for each conductive material ratio when single particles or pseudo-single particles are applied as the positive electrode active material.

Through the graphs, it may be understood that when a single particle or pseudo-single particle is applied as the positive electrode active material, the usage amount of conductive material should increase compared to the case of applying an existing positive electrode active material in the form of a secondary particle.

However, when the content of carbon nanotube is increased to 0.9 wt % or more, aggregation occurs in the positive electrode slurry, resulting in an increase in viscosity, and thus coating properties deteriorate. Therefore, in order to implement smooth coating properties, the viscosity of the positive electrode slurry must be lowered by reducing the solid content in the positive electrode slurry. However, when the solid content in the positive electrode slurry decreases, the content of active material decreases and the capacity characteristics deteriorate.

As a result of repeated research to solve this problem, the inventors of the present disclosure have found that when a carbon nanotube with a BET specific surface area of 300 m$^2$/g to 500 m$^2$/g is applied as a conductive material together with a positive electrode active material, which is a single particle-based active material particle, sufficient electrical conductivity can be secured with only a relatively small amount of carbon nanotube, and accordingly, the slurry viscosity can be maintained low even when the solid content of the positive electrode slurry is formed as high as 70 wt % to 80 wt %.

Specifically, the carbon nanotube used in the present disclosure may be a multi-wall carbon nanotube having a BET specific surface area of 300 m$^2$/g to 500 m$^2$/g, preferably 300 m$^2$/g to 450 m$^2$/g. When the BET specific surface area satisfies the above range, sufficient electrical conductivity may be secured even with a small amount of carbon nanotube.

In addition, the carbon nanotube may be a multi-wall carbon nanotube having a wall number of 2 to 8, preferably 2 to 6, more preferably 3 to 6.

In addition, the carbon nanotube may have a diameter of 1 nm to 8 nm, preferably 3 nm to 8 nm, more preferably 3 nm to 6 nm.

The carbon nanotube may be included in an amount of 0.7 wt % or less, preferably 0.3 wt % to 0.7 wt %, more preferably 0.4 wt % to 0.6 wt %, based on the total weight of the positive electrode active material layer. When the content of the carbon nanotube satisfies the above range, sufficient electrical conductivity may be achieved, and the solid content in the positive electrode slurry may be maintained high, so that the content of the positive electrode active material may be high in the positive electrode active material layer and, as a result, excellent capacity characteristics may be implemented.

Figures 42, 43:
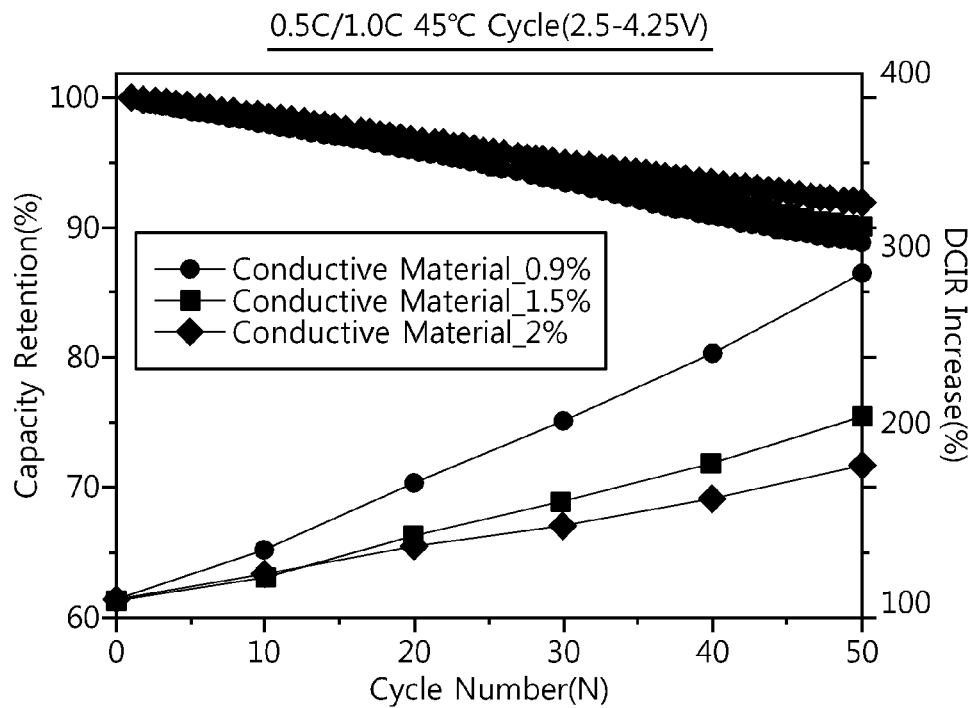
FIG. 43 is a table comparatively showing the solid content and viscosity of the positive electrode slurry and the resistance values of the MP coating layer and the MP interface layer when carbon nanotubes (new CNT) with a BET specific surface area of 300 $m^2$/g to 500 $m^2$/g are applied and when carbon nanotubes (existing CNT) with a BET of 200 $m^2$/g or more and less than 300 $m^2$/g are applied.

The table shown in FIG. 43 comparatively shows the solid content and viscosity of the positive electrode slurry and the resistance values at the MP coating layer and MP interface layer in the case where a carbon nanotube (new CNT) having a BET specific surface area of 300 m$^2$/g to 500 m$^2$/g is applied and the case where a carbon nanotube (existing CNT) having a BET of 200 m$^2$/g or more and less than 300 m$^2$/g is applied. Through the table, it may be found that when the new CNT is applied, the positive electrode slurry has a lower viscosity and excellent electrical conductivity even when the solid content of the positive electrode slurry is higher than that of the conventional CNT.

The binder serves to improve the attachment among the particles of the positive electrode active material and the adhesion between the positive electrode active material and the positive electrode current collector. Specific examples of the binder include polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer rubber (EPDM rubber), sulfonated-EPDM, styrene butadiene rubber (SBR), fluoro rubber, or various copolymers thereof, which may be used alone or as a mixture. The binder may be included in an amount of 1 wt % to 30 wt %, preferably 1 wt % to 20 wt %, more preferably 1 wt % to 10 wt %, based on the total weight of the positive electrode active material layer.

Another aspect of the present disclosure relates to an electrode assembly including the positive electrode, and a battery including the electrode assembly. The electrode assembly includes a negative electrode and a positive electrode, and the positive electrode has the above-described characteristics.

In the electrode assembly, for example, a separator may be stacked to be interposed between the negative electrode and the positive electrode to form a stacked or stacked/folded structure, or may be wound to form a jelly-roll structure. In addition, when the jelly-roll structure is formed, a separator may be additionally placed on the outer side in order to prevent the negative electrode and the positive electrode from contacting each other.

The negative electrode includes a negative electrode current collector; and a negative electrode active material layer formed on at least one side surface of the negative electrode current collector. The negative electrode may have a structure in which a negative electrode active material layer is formed on one surface or both surfaces of a long sheet-shaped negative electrode current collector, and the negative electrode active material layer may include a negative electrode active material, a conductive material, and a binder.

Specifically, the negative electrode may be manufactured by coating a negative electrode slurry, which is prepared by dispersing a negative electrode active material, a conductive material and a binder in a solvent such as dimethyl sulfoxide (DMSO), isopropyl alcohol, N-methylpyrrolidone (NMP), acetone, or water, on one surface or both surfaces of a long sheet-shaped negative electrode current collector, removing the solvent of the negative electrode slurry through a drying process, and then roll-pressing. When the negative electrode slurry is coated, a negative electrode having an uncoated portion may be manufactured by not applying the negative electrode slurry to a partial area of the negative electrode current collector, for example, one end of the negative electrode current collector.

As the negative electrode active material, a compound capable of reversible intercalation and de-intercalation of lithium may be used. Specific examples of the negative electrode active material include carbonaceous materials such as artificial graphite, natural graphite, graphitized carbon fiber, or amorphous carbon; silicon-containing materials such as Si, Si-Me alloy (where Me is at least one selected from the group consisting of Al, Sn, Mg, Cu, Fe, Pb, Zn, Mn, Cr, Ti, and Ni), $SiO_y$ (where $0<y<2$), or Si—C composites; lithium metal thin film; metal materials capable of being alloyed with lithium, such as Sn or Al; and the like, which may be used alone or as a mixture.

In the present disclosure, the negative electrode may include a silicon-containing negative electrode active material. The silicon-containing negative electrode active material may be a Si, Si-Me alloy (where Me is one selected from the group consisting of Al, Sn, Mg, Cu, Fe, Pb, Zn, Mn, Cr, Ti, and Ni), $SiO_y$ (here, $0<y<2$), Si—C composites, or a combination thereof, and may be preferably $SiO_y$ (here, $0<y<2$). Since the silicon-containing negative electrode active material has a high theoretical capacity, capacity characteristics may be improved when the silicon-containing negative electrode active material is included.

The silicon-containing negative electrode active material may be doped with $M^b$ metal, and in this case, the $M^b$ metal may be a Group 1 metal element or a Group 2 metal element, and specifically, may be Li, Mg, or the like. Specifically, the silicon-containing negative electrode active material may be Si, $SiO_y$ (here, $0<y<2$), Si—C composites, or the like, doped with $M^b$ metal. In the case of the metal-doped silicon-containing negative electrode active material, the active material capacity is somewhat lowered due to the doping element, but high energy density may be realized due to its high efficiency.

Figure 60:
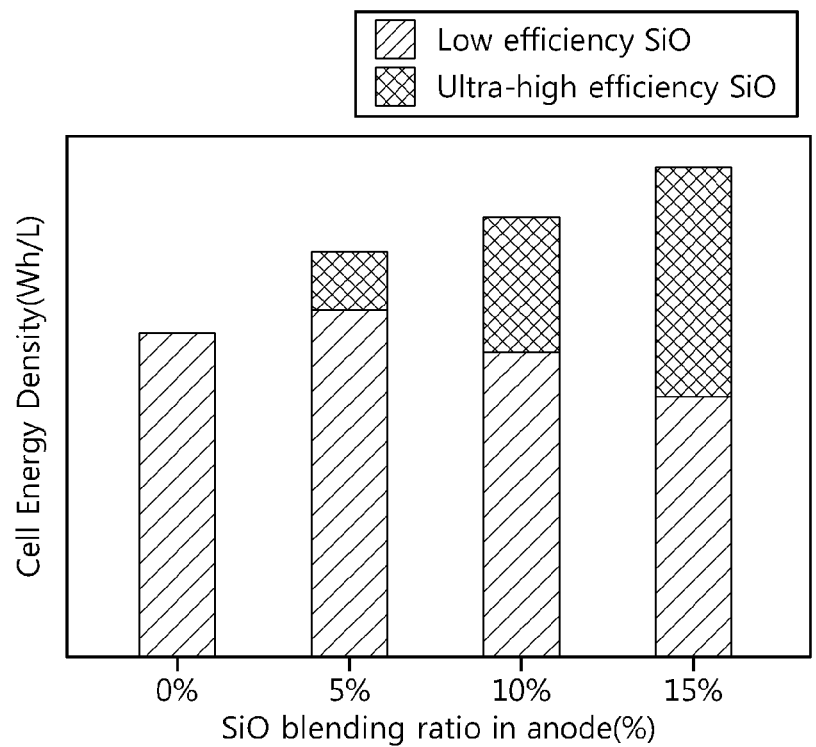
FIG. 60 is a graph showing the change in energy density depending on the content of a silicon-containing negative electrode active material and the presence or absence of doping of the silicon-containing negative electrode active material, in a battery using a mixture of a silicon-containing negative electrode active material and a carbon-containing negative electrode active material as a negative electrode active material.

FIG. 60 is a graph showing the change in energy density depending on the content of a silicon-containing negative electrode active material and the presence or absence of doping of the silicon-containing negative electrode active material, in a battery using a mixture of a silicon-containing negative electrode active material and a carbon-containing negative electrode active material as a negative electrode active material.

In FIG. 60, low efficiency SiO refers to un-doped SiO, and ultra-high efficiency SiO refers to Mg/Li-doped SiO. Through FIG. 60, it may be found that the energy density improves as the content of the silicon-containing negative electrode active material among the total negative electrode active materials increases. In addition, it may be found that as the ratio of the doped silicon-containing negative electrode active material among the silicon-containing negative electrode active materials increases, the effect of improving the energy density becomes better.

The silicon-containing negative electrode active material may further include a carbon coating layer on the particle surface. At this time, the carbon coating amount may be 20 wt % or less, preferably 1 wt % to 20 wt %, based on the total weight of the silicon-containing negative electrode active material. The carbon coating layer may be formed through a method such as dry coating, wet coating, chemical vapor deposition (CVD), physical vapor deposition (PVD), or atomic layer deposition (ALD).

In one embodiment of the present disclosure, the silicon-containing negative electrode active material may have a capacity of 1000 mAh/g to 4000 mAh/g, and an initial efficiency of about 60% to 95%.

In another embodiment of the present disclosure, $D_{50}$ of the silicon-containing negative electrode active material may be 3 um to 8 um, and $D_{min}$ to $D_{max}$ may be included in the range of 0.5 um to 30 um.

The negative electrode, if necessary, may further include a carbon-containing negative electrode active material as a negative electrode active material. The carbon-containing negative electrode active material may be, for example, artificial graphite, natural graphite, graphitized carbon fiber, amorphous carbon, soft carbon, hard carbon, or the like, but is not limited thereto.

When using a mixture of the silicon-containing negative electrode active material and the carbon-containing negative electrode active material as the negative electrode active material, the mixing ratio of the silicon-containing negative electrode active material and the carbon-containing negative electrode active material may be 1:99 to 20:80, preferably 1:99 to 15:85, more preferably 1:99 to 10:90, in weight ratio.

The negative electrode active material may be included in an amount of 80 wt % to 99 wt %, preferably 85 wt % to 99 wt %, more preferably 90 wt % to 99 wt %, based on the total weight of the negative electrode active material layer.

If necessary, the negative electrode active material may further include at least one selected from lithium metal and metal materials capable of alloying with lithium, such as Sn or Al.

As the negative electrode current collector, negative electrode current collectors generally used in the art may be used, and, for example, copper, stainless steel, aluminum, nickel, titanium, calcined carbon; copper or stainless steel surface-treated with carbon, nickel, titanium, silver, etc.; aluminum-cadmium alloy; and the like may be used. The negative electrode current collector may typically have a thickness of 3 μm to 500 μm, and, like the positive electrode current collector, fine irregularities may be formed on the surface of the current collector to enhance the bonding force of the negative electrode active material. For example, the negative electrode current collector may be used in various forms such as films, sheets, foils, nets, porous materials, foams, or nonwoven fabrics.

The conductive material is used to impart conductivity to the negative electrode, and any material that has electronic conductivity without causing chemical change inside the battery may be used without particular limitations. Specific examples of the conductive material include graphite such as natural graphite or artificial graphite; carbon-containing materials such as carbon black, acetylene black, Ketjen black, channel black, furnace black, lamp black, thermal black, carbon fiber, or carbon nanotube; metal powders or metal fibers such as copper, nickel, aluminum, or silver; conductive whiskers such as zinc oxide or potassium titanate; conductive metal oxides such as titanium oxide; and conductive polymers such as polyphenylene derivatives, which may be used alone or as a mixture. The conductive material may be typically included in an amount of 1 wt % to 30 wt %, preferably 1 wt % to 20 wt %, more preferably 1 wt % to 10 wt %, based on the total weight of the negative electrode active material layer.

The binder serves to improve the attachment among the particles of the negative electrode active material and the adhesion between the negative electrode active material and the negative electrode current collector. Specific examples of the binder include polyvinylidene fluoride (PVDF), vinylidene fluoride-hexafluoropropylene copolymer (PVDF-co-HFP), polyvinyl alcohol, polyacrylonitrile, and carboxymethyl cellulose. (CMC), starch, hydroxypropyl cellulose, regenerated cellulose, polyvinyl pyrrolidone, polytetrafluoroethylene, polyethylene, polypropylene, ethylene-propylene-diene monomer rubber (EPDM rubber), sulfonated-EPDM, styrene butadiene rubber (SBR), fluoro rubber, or various copolymers thereof, and the like, which may be used alone or as a mixture. The binder may be included in an amount of 1 wt % to 30 wt %, preferably 1 wt % to 20 wt %, more preferably 1 wt % to 10 wt %, based on the total weight of the negative electrode active material layer.

The electrode assembly further includes a separator, and the separator is disposed in the electrode assembly in a manner interposed between the negative electrode and the positive electrode. The separator separates the negative electrode from the positive electrode and provides a path for lithium ion movement. Any material used as a separator in a lithium battery may be used without particular limitations.

The separator may use a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure of two or more layers thereof used. In addition, conventional porous non-woven fabrics, for example, non-woven fabrics made of high melting point glass fibers, polyethylene terephthalate fibers, or the like may be used. In addition, a coated separator containing a ceramic component or a polymer material may be used to secure heat resistance or mechanical strength.

Another aspect of the present disclosure relates to a battery including the electrode assembly. The battery includes a battery case in which the electrode assembly and an electrolyte are accommodated together. As for the battery case, any case commonly used in the art such as a pouch type or a metal can type may be selected without particular limitation.

As the electrolyte used in the present disclosure, various electrolytes usable in lithium batteries, such as organic liquid electrolyte, inorganic liquid electrolyte, solid polymer electrolyte, gel polymer electrolyte, inorganic solid electrolyte, or molten inorganic electrolyte, may be used, and the type is not particularly limited.

Specifically, the electrolyte may include an organic solvent and a lithium salt.

The organic solvent may use any material that may serve as a medium through which ions involved in the electrochemical reaction of the battery may move without particular limitation. Specifically, as the organic solvent, ester-based solvents such as methyl acetate, ethyl acetate, γ-butyrolactone, or ε-caprolactone; ether-based solvents such as dibutyl ether or tetrahydrofuran; ketone-based solvents such as cyclohexanone; aromatic hydrocarbon-containing solvents such as benzene or fluorobenzene; carbonate-based solvents such as dimethyl carbonate (DMC), diethyl carbonate (DEC), methylethyl carbonate (MEC), ethylmethyl carbonate (EMC), ethylene carbonate (EC) or propylene carbonate (PC); alcohol-based solvents such as ethyl alcohol or isopropyl alcohol; nitriles such as R—CN (R is a C2 to C20 straight-chain, branched or cyclic hydrocarbon group, and may contain a double-bonded aromatic ring or an ether bond); amides such as dimethylformamide; dioxolanes such as 1,3-dioxolane; or sulfolanes may be used. Among them, carbonate-based solvents are preferred, and a mixture of cyclic carbonates (e.g., ethylene carbonate or propylene carbonate) having high ionic conductivity and high permittivity capable of increasing the charge and discharge performance of the battery and low-viscosity linear carbonate-based compound (e.g., ethyl methyl carbonate, dimethyl carbonate or diethyl carbonate) is more preferred.

As the lithium salt, any compound capable of providing lithium ions used in a lithium battery may be used without particular limitation. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$ or the like may be used as the lithium salt. The concentration of the lithium salt is preferably within the range of 0.1M to 5.0M, preferably 0.1M to 3.0M. When the concentration of the lithium salt is within the above range, the electrolyte has appropriate conductivity and viscosity, so it may exhibit excellent electrolyte performance, and lithium ions may move effectively.

In addition to the components of the electrolyte, the electrolyte may additionally include additives for the purpose of improving the lifespan characteristics of the battery, suppressing the decrease in battery capacity, and improving the discharge capacity of the battery. For example, haloalkylene carbonate-based compounds such as difluoroethylene carbonate, pyridine, triethylphosphite, triethanolamine, cyclic ether, ethylene diamine, n-glyme, hexamethyl phosphate triamid, nitrobenzene derivatives, sulfur, quinone imine dyes, N-substituted oxazolidinones, N,N-substituted imidazolidines, ethylene glycol dialkyl ethers, ammonium salts, pyrroles, 2-methoxy ethanol, aluminum trichloride or the like may be used alone or as a mixture as the additives, without being limited thereto. The additive may be included in an amount of 0.1 wt % to 10 wt %, preferably 0.1 wt % to 5 wt %, based on the total weight of the electrolyte.

In another embodiment of the present disclosure, the positive electrode may include a loading reduction portion with a smaller loading amount of the positive electrode active material, compared to an adjacent region. If the positive electrode has such a structure, the region of the positive electrode active material portion may be increased without worrying about precipitation of lithium. Accordingly, the energy density of the electrode assembly may be improved.

Recently, in order to realize high energy density and reduce cost, development is progressing in the direction of increasing the size of the battery. Depending on the size of the battery, as the energy increases, the resistance of battery should decrease. To reduce the resistance, a method of using the current collector of the electrode as an electrode tab rather than a method of attaching an electrode tab to the electrode may be used. At this time, due to the nature of the electrode manufacturing process of applying the electrode slurry on the electrode current collector, a portion in which the loading amount is reduced occurs at the boundary between the negative electrode active material portion coated with the negative electrode slurry and the negative electrode current collector. Considering the N/P ratio, there is a possibility that metallic lithium is precipitated on the positive electrode active material portion facing the portion where the loading amount is reduced. Here, the N/P ratio is a value obtained by dividing the capacity of the negative electrode, which is calculated considering the area and capacity per mass of the negative electrode, by the capacity of the positive electrode, which is obtained considering the area and capacity per mass of the positive electrode, and generally has a value of 1 or more. That is, the capacity of the negative electrode is adjusted large. For reference, if the N/P ratio is less than 1, metallic lithium is likely to be precipitated during charging and discharging, which causes rapid deterioration in safety of the battery during high rate charging and discharging. In other words, the N/P ratio has a significant effect on the safety and capacity of the battery. Due to the risk of metal lithium precipitation as described above, the positive electrode active material portion cannot be located on the portion of the positive electrode facing the portion where the loading amount of the negative electrode is reduced. This causes the energy density of the battery not to increase. Accordingly, in the present disclosure, the energy density is improved by increasing the region of the positive electrode active material portion.

Figure 48:
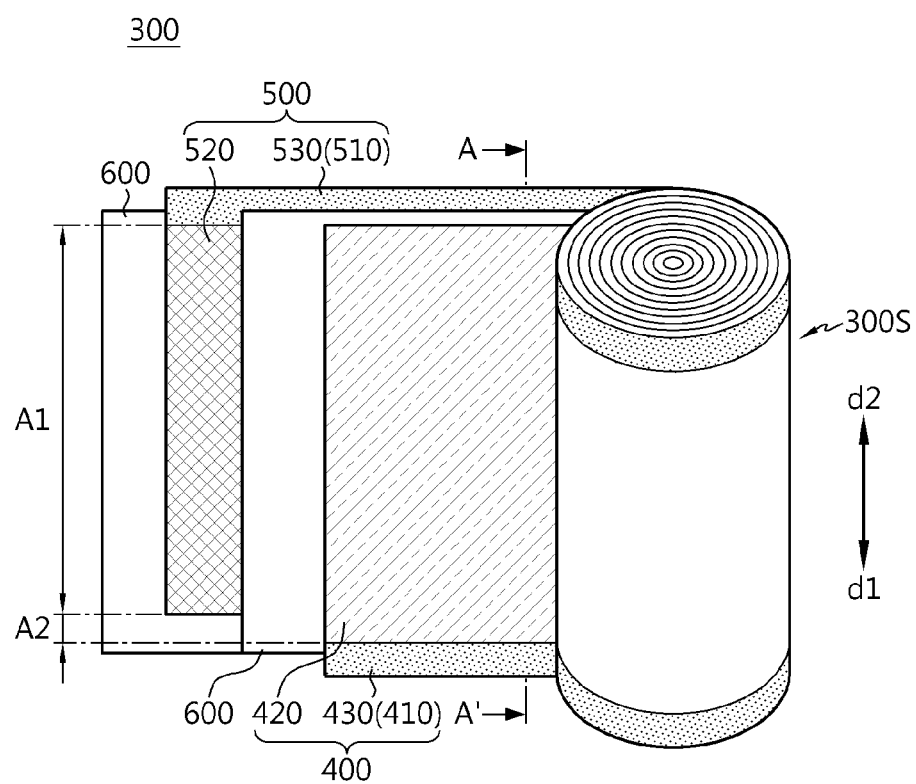
FIG. 48 is a diagram showing an electrode assembly according to an embodiment of the present disclosure.
Figure 49:
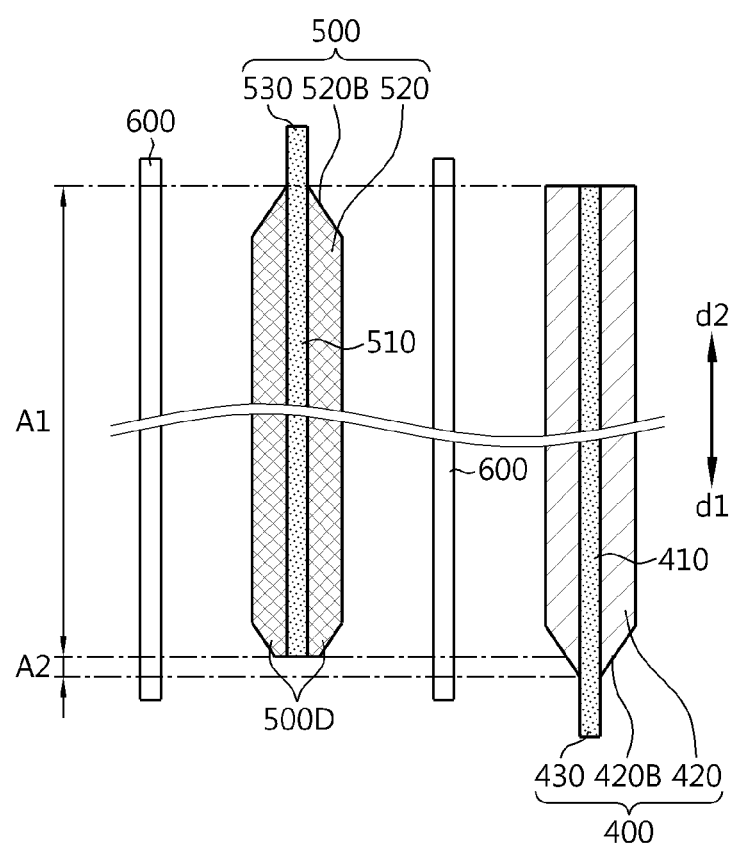
FIG. 49 is a cross-sectional view, taken along the cutting line A-A' in FIG. 34.

FIG. 48 is a diagram showing an electrode assembly according to an embodiment of the present disclosure, and FIG. 49 is a cross-sectional view, taken along the cutting line A-A' in FIG. 48.

Referring to FIGS. 48 and 49, an electrode assembly 300 according to an embodiment of the present disclosure includes a negative electrode 400, a positive electrode 500, and a separator 600. The separator 600 is located between the negative electrode 400 and the positive electrode 500. The negative electrode 400, the positive electrode 500, and the separator 600 are wound together to form a jelly-roll structure 300S. Here, the jelly-roll structure 300S refers to a structure formed by winding the negative electrode 400, the positive electrode 500, and the separator 600. In addition, when the jelly-roll structure 300S is formed, it is preferable that a separator 600 is additionally disposed on the outer side in order to prevent the negative electrode 400 and the positive electrode 500 from contacting each other.

The negative electrode 400 includes a negative electrode current collector 410 and a negative electrode active material portion 420 formed by coating a negative electrode active material on the negative electrode current collector 410. In particular, as shown in the drawings, the negative electrode active material may be coated on both surfaces of the negative electrode current collector 410 to form the negative electrode active material portion 420. In addition, in the negative electrode current collector 410, a negative electrode uncoated portion 430 to which the negative electrode active material is not applied extends in the first direction d1. The negative electrode uncoated portion 430 extends along one end of the wound negative electrode 400. In addition, the negative electrode uncoated portion 430 extends beyond the separator 600 in the first direction d1. Accordingly, the negative electrode uncoated portion 430 may be exposed at one end in the first direction of the jelly-roll structure 300S.

The positive electrode 500 includes a positive electrode current collector 510 and a positive electrode active material portion 520 formed by coating a positive electrode active material on the positive electrode current collector 510. In particular, as shown in the drawings, the positive electrode active material may be coated on both surfaces of the positive electrode current collector 510 to form the positive electrode active material portion 520. Also, in the positive electrode current collector 510, a positive electrode uncoated portion 530 to which the positive electrode active material is not applied extends in the second direction d2. The positive electrode uncoated portion 530 extends along one end of the wound positive electrode 500. In addition, the positive electrode uncoated portion 530 extends beyond the separator 600 in the second direction d2. Accordingly, the positive electrode uncoated portion 530 may be exposed at one end in the second direction of the jelly-roll structure 300S.

Here, first direction d1 and second direction d2 are directions opposite to each other. Also, the first direction d1 and the second direction d2 may be directions parallel to the height direction of the jelly-roll structure 300S.

The electrode assembly 300 according to this embodiment has a structure in which a separate electrode tab is not attached, but the negative electrode uncoated portion 430 of the negative electrode current collector 410 and the positive electrode uncoated portion 530 of the positive electrode current collector 510 themselves are used as electrode tabs in order to reduce resistance.

Although not shown in the drawings, the negative electrode uncoated portion 430 and/or the positive electrode uncoated portion 530 may have substantially the same structure of the uncoated portion of the electrode described above.

In one embodiment, the positive electrode active material portion 520 includes a loading reduction portion 500D having a smaller loading amount of positive electrode active material than an adjacent area, and the loading reduction portion 500D is located at one end in the first direction d1 of the positive electrode 500. Also, more specifically, in the loading reduction portion 500D, the loading amount of the positive electrode active material may gradually decrease in the first direction d1.

Here, the loading amount means the amount of active material applied per unit area. In a portion having a large loading amount, a lot of negative electrode active material or positive electrode active material is applied to the unit area, so the negative electrode active material portion or the positive electrode active material portion may have a relatively greater thickness. In a portion having a small loading amount, a small amount of negative electrode active material or positive electrode active material is applied to the unit area, so the negative electrode active material portion or the positive electrode active material portion may have a relatively smaller thickness.

The active material portion may be formed by applying a slurry containing an active material. In this process, a boundary portion having a gradually decreasing loading amount may be formed between the uncoated portion and the active material portion.

Specifically, the negative electrode active material portion 420 may include a negative electrode boundary portion 420B forming a boundary between the negative electrode active material portion 420 and the negative electrode uncoated portion 430. The loading amount of the negative electrode boundary portion 420B may decrease in a direction toward the negative electrode uncoated portion 430.

Similarly, the positive electrode active material portion 520 may include a positive electrode boundary portion 520B forming a boundary between the positive electrode active material portion 520 and the positive electrode uncoated portion 530. The loading amount of the positive electrode boundary portion 520B may decrease in a direction toward the positive electrode uncoated portion 530.

The negative electrode boundary portion 420B or the positive electrode boundary portion 520B in which the loading amount gradually decreases as above is naturally generated in the process of applying the slurry containing the active material to the negative electrode current collector 410 or the positive electrode current collector 510.

In this case, in a region corresponding to the positive electrode boundary portion 520B, based on a direction perpendicular to the second direction d2, the amount of the positive electrode active material may be smaller than the amount of the negative electrode active material. Since the N/P ratio has a value greater than 1, the problem of precipitation of metallic lithium does not occur.

However, there is a problem in a region corresponding to the negative electrode boundary portion 420B. In the region corresponding to the negative electrode boundary portion 420B, based on a direction perpendicular to the first direction d1, the amount of the negative electrode active material may be smaller than the amount of the positive electrode active material. This may cause a problem of precipitation of metallic lithium because the N/P ratio has a value smaller than 1.

Accordingly, in this embodiment, the loading reduction portion 500D is provided on the positive electrode 500, and the negative electrode active material portion 420 may be located in a portion corresponding to the loading reduction portion 500D based on a direction perpendicular to the first direction d1. More specifically, the negative electrode boundary portion 420B may be located at a portion corresponding to the loading reduction portion 500D based on a direction perpendicular to the first direction d1.

The loading reduction portion 500D having a smaller loading amount of positive electrode active material than adjacent areas is provided at a position corresponding to the negative electrode boundary portion 420B having a gradually decreasing loading amount, so that the region where the positive electrode active material is applied may be increased without worrying about lithium precipitation. In particular, the loading amount of the positive electrode active material may gradually decrease in the loading reduction portion 500D along the first direction d1, corresponding to the shape of the negative electrode boundary portion 420B in which the loading amount gradually decreases in a direction toward the negative electrode uncoated portion 430. Therefore, it is possible to maintain a high N/P ratio of the negative electrode 400 and the positive electrode 500 in the region where the negative electrode boundary portion 420B is formed, thereby preventing lithium precipitation.

Hereinafter, a method for manufacturing an electrode assembly according to an embodiment of the present disclosure will be described in detail with reference to FIGS. 50 to 55.

Figure 50:
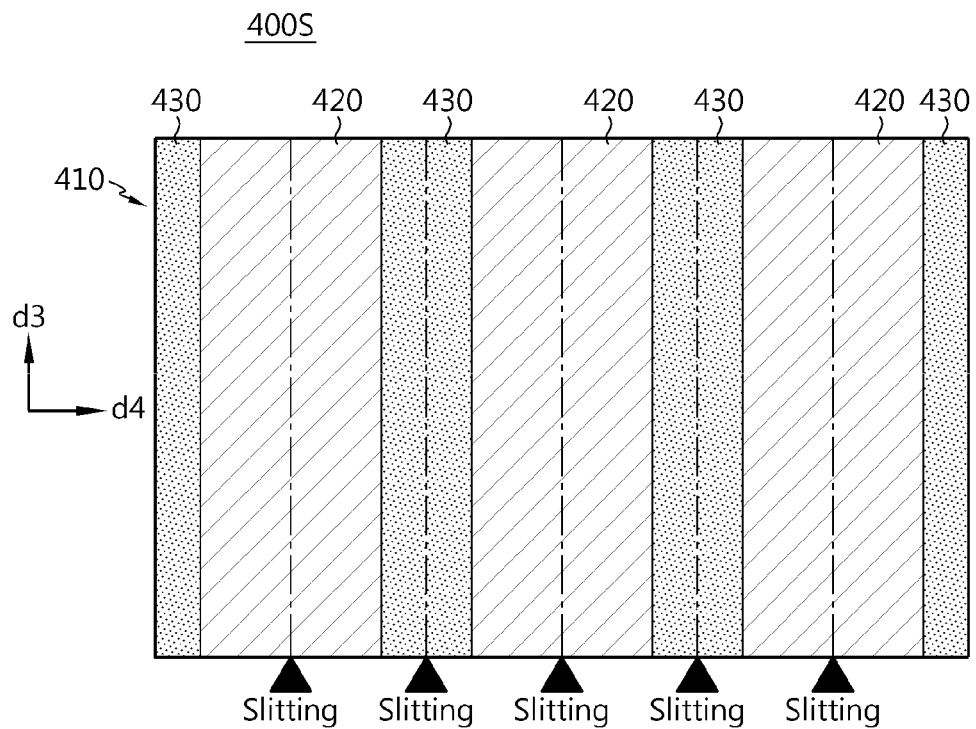
FIGS. 50 and 51 are diagrams showing a process of manufacturing a negative electrode according to an embodiment of the present disclosure.
Figure 51:
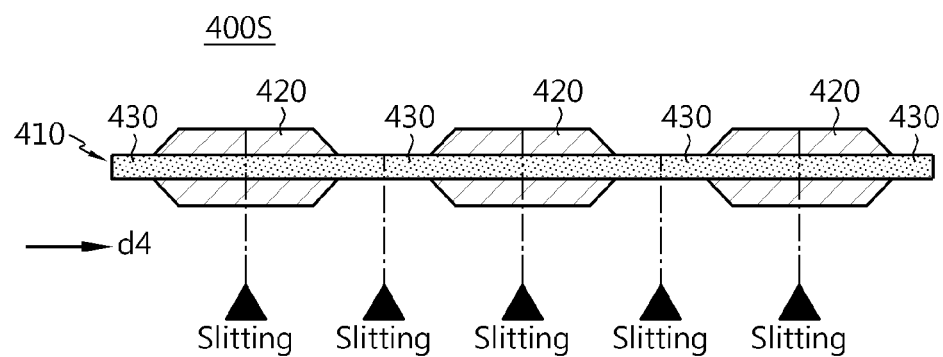

FIGS. 50 and 51 are diagrams illustrating a process of manufacturing a negative electrode according to an embodiment of the present disclosure. Specifically, FIG. 50 is a plan view showing the negative electrode sheet from above, and FIG. 51 is a front view showing the negative electrode sheet of FIG. 50 from the front.

Referring to FIGS. 50 and 51, in the method for manufacturing an electrode assembly according to an embodiment of the present disclosure includes a step of manufacturing a negative electrode sheet 400S so that a negative electrode active material portion 420 coated with a negative electrode active material and a negative electrode uncoated portion 430 not coated with a negative electrode active material are alternately located on a negative electrode current collector 410.

Specifically, the negative electrode active material portion 420 may be formed by applying the negative electrode active material to extend along the third direction d3. In addition, a plurality of negative electrode active material portions 420 may be located to be spaced apart along the fourth direction d4 by spacing the coated portions along the fourth direction d4 perpendicular to the third direction d3. That is, the coating process may be performed so that the negative electrode uncoated portion 430 is positioned between the plurality of negative electrode active material portions 420.

Here, the third direction d3 and the fourth direction d4 are directions for explanation based on the negative electrode sheet 400S, and are directions unrelated to the first direction d1 and the second direction d2 in the jelly-roll structure 300S described above.

Figure 52:
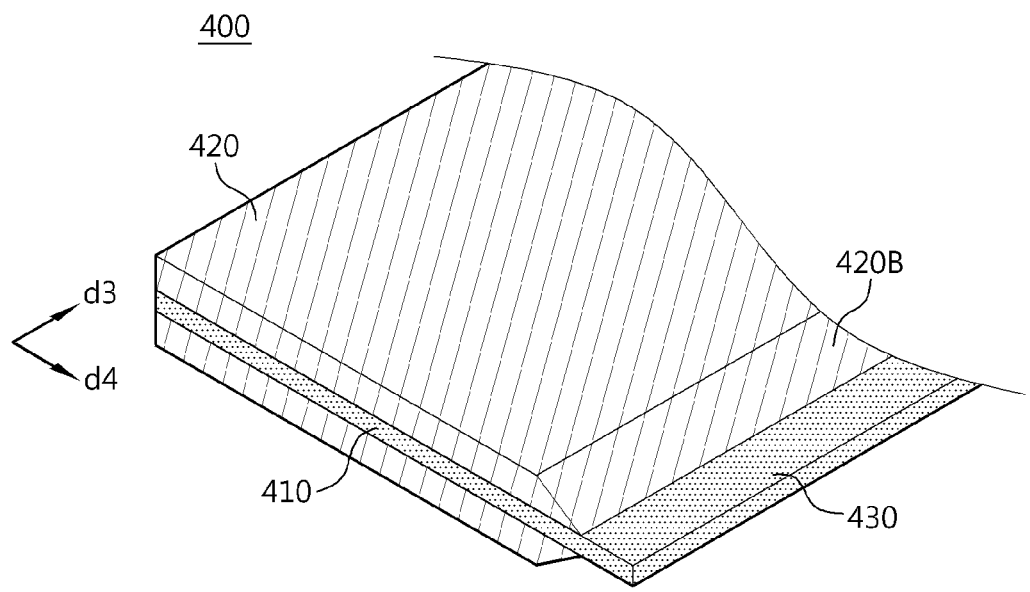
FIG. 52 is a perspective view showing a negative electrode according to an embodiment of the present disclosure.

After that, a step of manufacturing a negative electrode 400 by slitting the negative electrode uncoated portion 430 and the negative electrode active material portion 420 may be followed. FIG. 52 is a perspective view showing a negative electrode according to an embodiment of the present disclosure.

Referring to FIGS. 50 to 52, slitting may be performed in a direction parallel to the third direction d3 for the negative electrode uncoated portion 430 and the negative electrode active material portion 420, respectively, as indicated by dotted lines in FIGS. 50 and 51. Accordingly, several negative electrodes 400 as shown in FIG. 52 may be manufactured from the negative electrode sheet 400S. That is, the negative electrode 400 of FIG. 52 corresponds to one of several negative electrodes manufactured by slitting the negative electrode sheet 400S of FIGS. 50 and 51. By slitting the negative electrode uncoated portion 430 and the negative electrode active material portion 420 of the negative electrode sheet 400S, respectively, the negative electrode 400 in which the negative electrode uncoated portion 430 extends at one side may be manufactured.

When forming the negative electrode active material portion 420, a slurry containing the negative electrode active material may be applied on the negative electrode current collector 410. In the process of applying the slurry, a negative electrode boundary portion 420B having a loading amount decreasing in a direction toward the negative electrode uncoated portion 430 may be formed at the boundary between the negative electrode active material portion 420 and the negative electrode uncoated portion 430.

Figure 53:
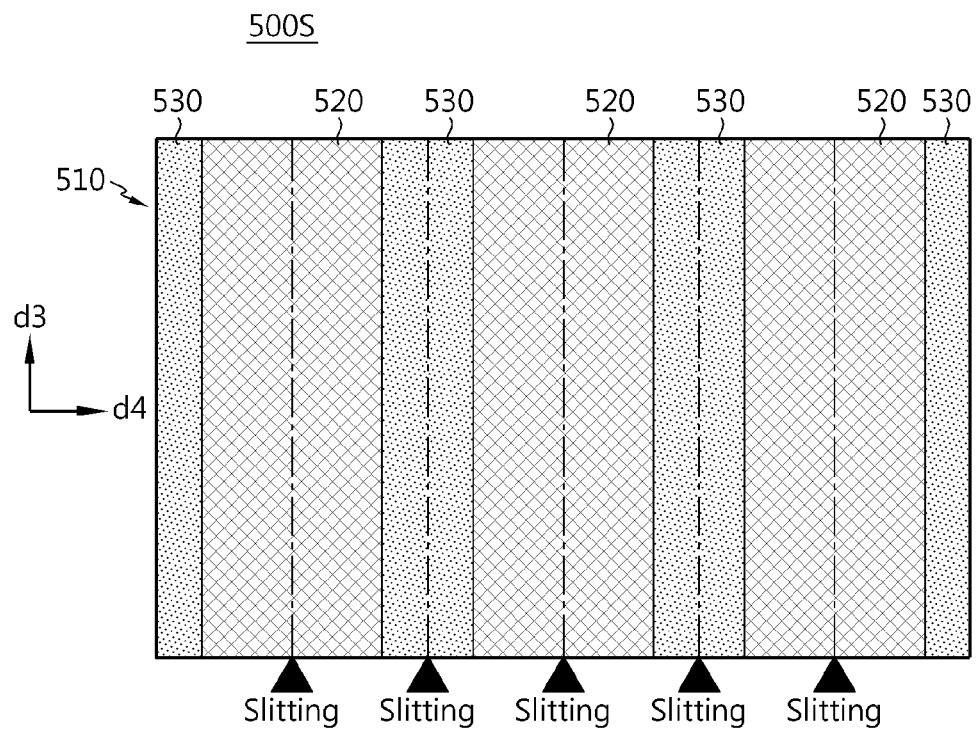
FIGS. 53 and 54 are diagrams showing a process of manufacturing a positive electrode according to an embodiment of the present disclosure.
Figure 54:
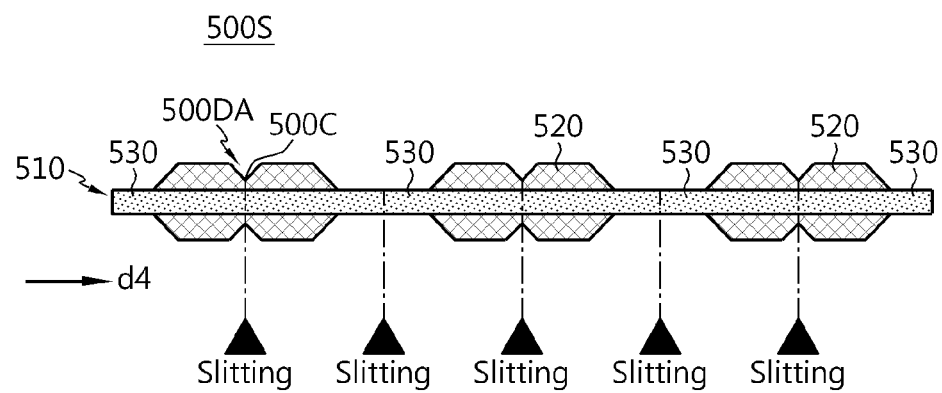

FIGS. 53 and 54 are diagrams showing a process of manufacturing a positive electrode according to an embodiment of the present disclosure. Specifically, FIG. 53 is a plan view showing the positive electrode sheet from above, and FIG. 54 is a front view showing the positive electrode sheet of FIG. 53 from the front.

Referring to FIGS. 53 and 54, the method for manufacturing an electrode assembly according to an embodiment of the present disclosure includes a step of manufacturing a positive electrode sheet 500S so that a positive electrode active material portion 520 coated with a positive electrode active material and a positive electrode uncoated portion 530 not coated with a positive electrode active material are alternately located on the positive electrode current collector 510.

Specifically, the positive electrode active material portion 520 may be formed by applying the positive electrode active material to extend along the third direction d3. In addition, a plurality of positive electrode active material portions 520 may be located to be spaced apart by adjusting the coating interval along the fourth direction d4 perpendicular to the third direction d3. That is, the coating process may be performed so that the positive electrode uncoated portion 530 is located between the plurality of positive electrode active material portions 520.

Here, third direction d3 and fourth direction d4 are directions for description based on the positive electrode sheet 500S, and are directions unrelated to the first direction d1 and the second direction d2 in the jelly-roll structure 300S described above.

Figure 55:
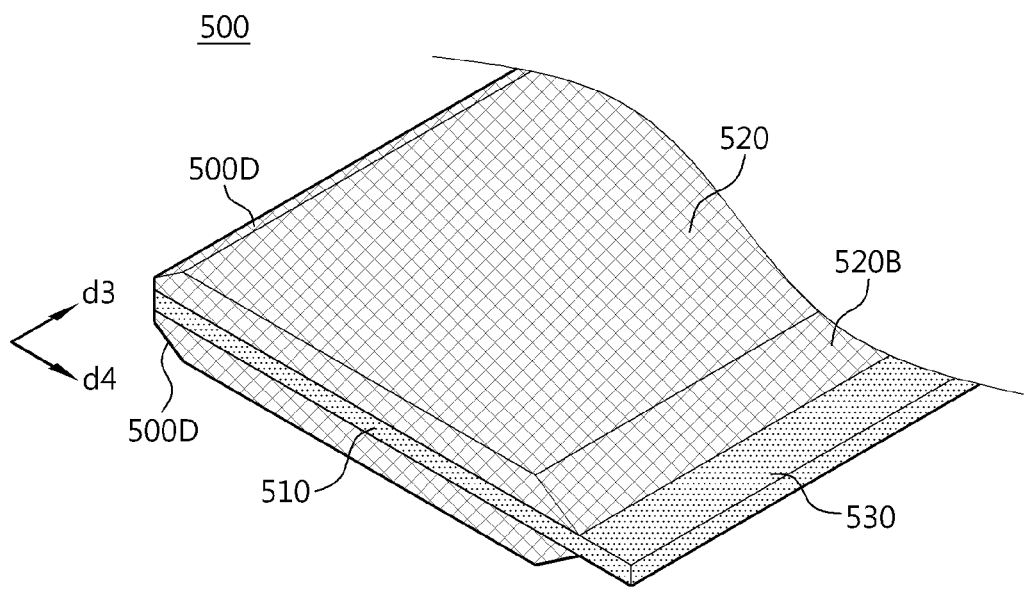
FIG. 55 is a perspective view showing a positive electrode according to an embodiment of the present disclosure.

After that, a step of manufacturing a positive electrode 500 by slitting the positive electrode uncoated portion 530 and the positive electrode active material portion 520 may be followed. FIG. 55 is a perspective view showing a positive electrode 500 according to an embodiment of the present disclosure.

Referring to FIGS. 53 to 55, slitting may be performed in a direction parallel to the third direction d3 for the positive electrode uncoated portion 530 and the positive electrode active material portion 520, respectively, as indicated by dotted lines in FIGS. 53 and 54. Accordingly, several positive electrodes 500 as shown in FIG. 55 may be manufactured from the positive electrode sheet 500S. That is, the positive electrode 500 of FIG. 55 corresponds to one of several positive electrodes manufactured by slitting the positive electrode sheet 500S of FIGS. 53 and 54. By slitting the positive electrode uncoated portion 530 and the positive electrode active material portion 520 of the positive electrode sheet 500S, respectively, the positive electrode 500 in which the positive electrode uncoated portion 530 extends at one side may be manufactured.

When forming the positive electrode active material portion 520, a slurry containing the positive electrode active material may be applied on the positive electrode current collector 510. In the process of applying the slurry, a positive electrode boundary portion 520B having a loading amount decreasing in a direction toward the positive electrode uncoated portion 530 may be formed at the boundary between the positive electrode active material portion 520 and the positive electrode uncoated portion 530.

Referring to FIGS. 48, 52 and 55 together, a step of forming a jelly-roll structure 300S by winding the negative electrode 400 and the positive electrode 500 together with the separator 600 may be followed. At this time, in the jelly-roll structure 300S, the negative electrode uncoated portion 430 may extend beyond the separator 600 in a first direction d1, and the positive electrode uncoated portion 530 may extend beyond the separator 600 in a second direction d2 opposite to the first direction d1.

Referring to FIGS. 53 to 55 again, in the method for manufacturing an electrode assembly according to an embodiment of the present disclosure, the positive electrode sheet 500S includes a loading reduction area 500DA in which the loading amount of the positive electrode active material is smaller than that of the adjacent area. There is no particular limitation in the method of forming the loading reduction area 500DA, and for example, it may be formed by adjusting the degree of coating of the slurry.

In the step of manufacturing the positive electrode 500, the loading reduction area 500DA of the positive electrode active material portion 520 is slit. The slitted loading reduction area 500DA forms a loading reduction portion 500D having a smaller loading amount of the positive electrode active material than the adjacent area in the jelly-roll structure 300S shown in FIGS. 48 and 49.

Specifically, a loading reduction area 500DA having a smaller loading amount of the positive electrode active material than the adjacent area is formed in the positive electrode active material portion 520 formed on the positive electrode sheet 500S. As shown in FIG. 54, the loading reduction area 500DA may be formed in the center of the positive electrode active material portion 520. Meanwhile, the loading reduction area 500DA may be configured such that the loading amount of the positive electrode active material gradually decreases toward the center portion 500C of the loading reduction area 500DA, and in the step of manufacturing the positive electrode 500, the loading reduction portion 500D according to this embodiment may be provided by slitting the center portion 500C of the loading reduction area 500DA.

That is, in applying the slurry containing a positive electrode active material, by forming the loading reduction area 500DA and slitting the center portion 500C of the loading reduction area 500DA, several positive electrodes 500 having the loading reduction portion 500D may be manufactured.

Referring to FIG. 55, the loading reduction portion 500D may be provided at one end of the manufactured positive electrode 500, and the positive electrode uncoated portion 530 may be provided at the other end of the positive electrode 500 opposite to the one end.

Referring to FIGS. 48 and 49, when the positive electrode 500 is wound to form a jelly-roll structure 300S, the loading reduction portion 500D may be located at one end in the first direction d1 of the positive electrode 500, and the positive electrode uncoated portion 530 may be located at one end in the second direction d2 of the positive electrode 500.

In addition, as the center portion 500C of the loading reduction area 500DA is slitted, the loading amount of the positive electrode active material in the loading reduction portion 500D may gradually decrease along the first direction d1.

In addition, in the jelly-roll structure 300S, the negative electrode active material portion 420 may be located at a portion corresponding to the loading reduction portion 500D based on a direction perpendicular to the first direction d1. More specifically, in the jelly-roll structure 300S, the negative electrode boundary portion 420B may be located at a portion corresponding to the loading reduction portion 500D based on a direction perpendicular to the first direction d1.

The corresponding positional relationship between the loading reduction portion 500D and the negative electrode boundary portion 420B has already been described above and thus will not be described again.

Hereinafter, with reference to FIGS. 56 to 59, an electrode assembly according to a comparative example will be described, and advantages of the electrode assembly according to this embodiment compared to the electrode assembly according to the comparative example will be described.

Figure 56:
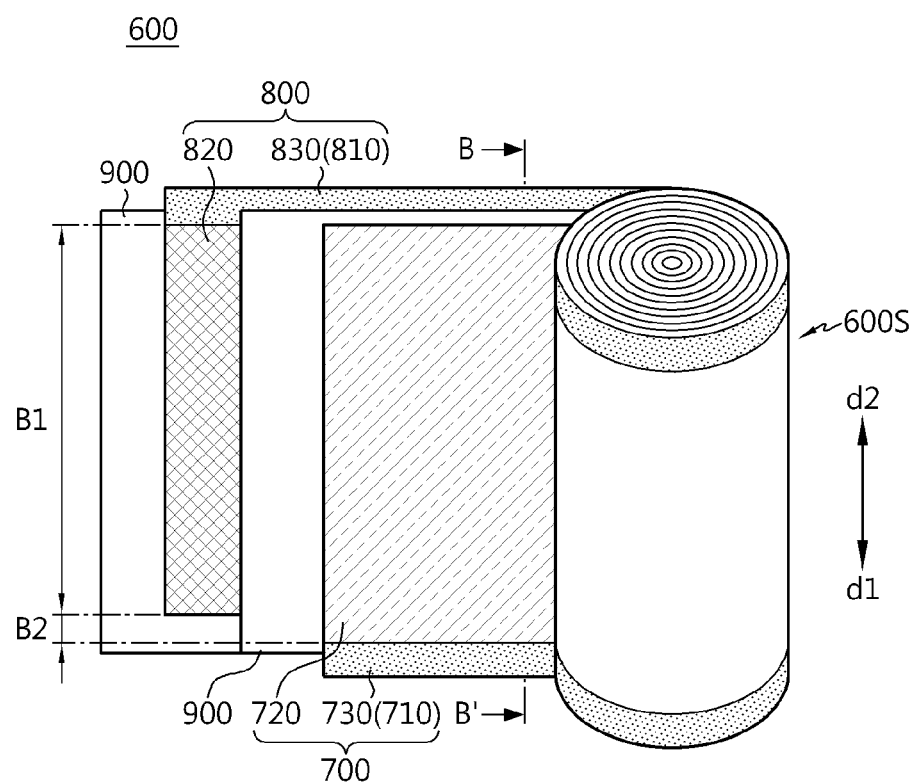
FIG. 56 is a diagram showing an electrode assembly according to a comparative example.
Figure 57:
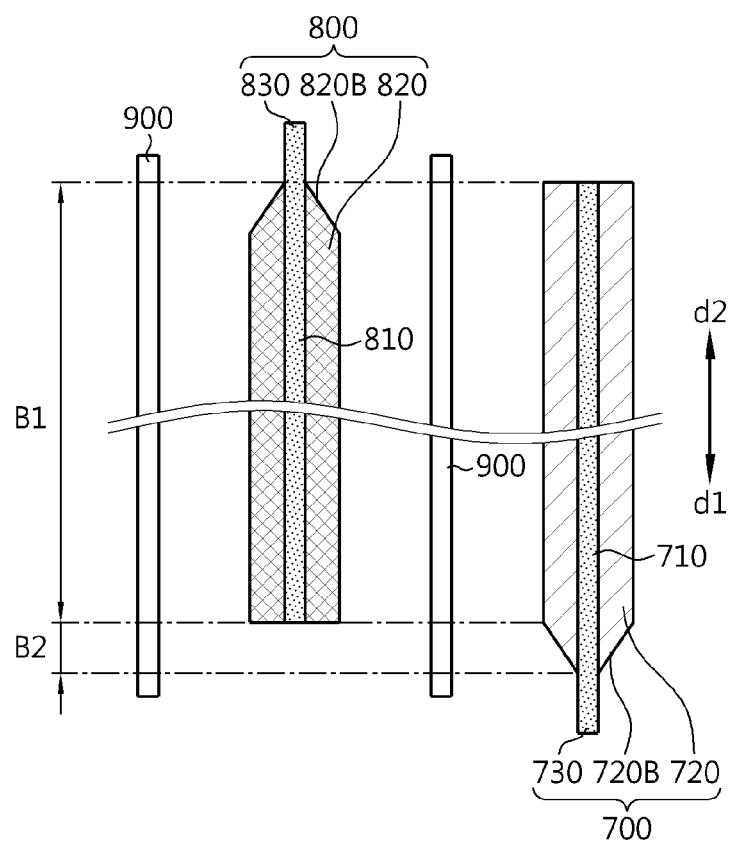
FIG. 57 is a cross-sectional view, taken along the cutting line B-B' in FIG. 56.

FIG. 56 is a diagram showing an electrode assembly according to a comparative example. FIG. 57 is a cross-sectional view, taken along the cutting line B-B' in FIG. 56.

Referring to FIGS. 56 and 57, the electrode assembly 600 according to the comparative example includes a negative electrode 700, a positive electrode 800 and a separator 900, and the negative electrode 700, the positive electrode 800 and the separator 900 are wound to form a jelly-roll structure 600S.

The negative electrode 700 may include a negative electrode current collector 710, a negative electrode active material portion 720, and a negative electrode uncoated portion 730. In addition, the negative electrode uncoated portion 730 may extend in the first direction d1, and the negative electrode active material portion 720 may include a negative electrode boundary portion 720B that forms a boundary between the negative electrode active material portion 720 and the negative electrode uncoated portion 730 and has a gradually decreasing loading amount.

Figure 58:
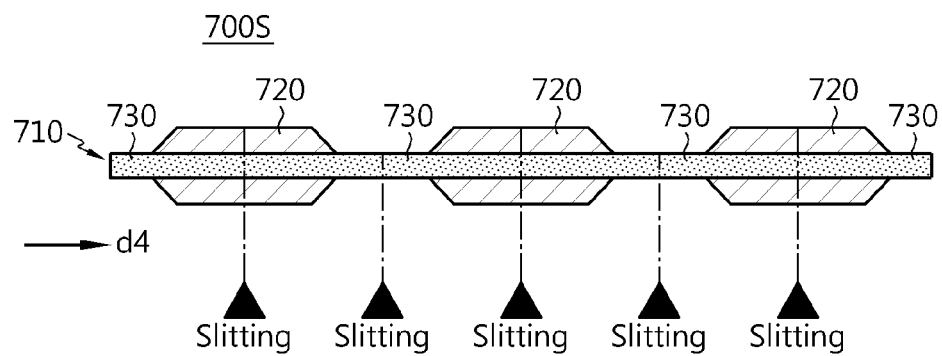
FIG. 58 is a diagram showing a process of manufacturing a negative electrode according to a comparative example.

FIG. 58 is a diagram showing a process of manufacturing a negative electrode 700 according to a comparative example.

Referring to FIG. 58, after the negative electrode sheet 700S is manufactured so that the negative electrode active material portion 720 and the negative electrode uncoated portion 730 are alternately positioned along the fourth direction d4, a plurality of negative electrodes 700 may be manufactured by slitting the negative electrode uncoated portion 730 and the negative electrode active material portion 720.

Meanwhile, referring to FIGS. 56 and 57 again, the positive electrode 800 may include a positive electrode current collector 810, a positive electrode active material portion 820, and a positive electrode uncoated portion 880. In addition, the positive electrode uncoated portion 830 may extend in the second direction d2 opposite to the first direction d1, and the positive electrode active material portion 820 may include a positive electrode boundary portion 820B that forms a boundary between the positive electrode active material portion 820 and the positive electrode uncoated portion 830 and has a gradually decreasing loading amount.

Figure 59:
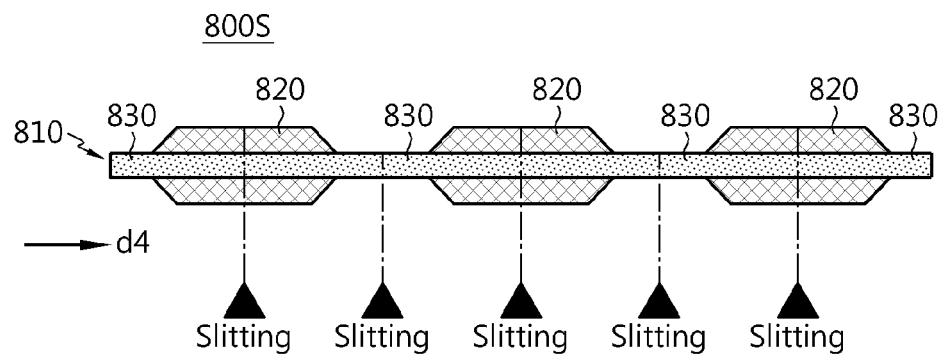
FIG. 59 is a diagram showing a process of manufacturing a positive electrode according to a comparative example.

FIG. 59 is a diagram showing a process of manufacturing a positive electrode 800 according to a comparative example.

Referring to FIG. 59, after the positive electrode sheet 800S is manufactured so that the positive electrode active material portion 820 and the positive electrode uncoated portion 830 are alternately positioned along the fourth direction d4, a plurality of positive electrodes 800 may be manufactured by slitting the positive electrode uncoated portion 830 and the positive electrode active material portion 820.

After that, the negative electrode 700 and the positive electrode 800 manufactured as above may be wound together with the separator 900 to manufacture an electrode assembly 600 according to the comparative example.

That is, the electrode assembly 600 according to the comparative example may have a structure similar to that of the electrode assembly 300 according to this embodiment, except for the loading reduction portion 500D (see FIG. 49).

Referring to FIGS. 56 and 57, in the case of the electrode assembly 600 according to the comparative example, the positive electrode active material portion 820 cannot be located in a portion corresponding to the negative electrode boundary portion 720B, based on a direction perpendicular to the first direction d1. If the positive electrode active material portion 820 extends to a portion corresponding to the negative electrode boundary portion 720B, the corresponding portion has a low N/P ratio value and is highly likely to precipitate metallic lithium. Therefore, in order to prevent lithium precipitation, the length of the positive electrode active material portion 820 must be limited. That is, the positive electrode active material portion 820 can be formed only in the region B1 shown in the drawing, and the positive electrode active material portion 820 cannot be formed in the region B2. This results in reducing the length of the positive electrode active material portion 820 due to the negative electrode boundary portion 720B.

Meanwhile, referring to FIGS. 48 and 49, in the case of the electrode assembly 300 according to this embodiment, based on the direction perpendicular to the first direction d1, the positive electrode active material portion 520, particularly the loading reduction portion 500D, may be located in a portion corresponding to the negative electrode boundary portion 420B. Since the loading reduction portion 500D having a smaller loading amount of the positive electrode active material than the adjacent area is provided at a position corresponding to the negative electrode boundary portion 420B, the N/P ratio in the corresponding portion may be maintained high and lithium precipitation may be prevented. Accordingly, the positive electrode active material portion 520 may be formed as much as the region A1, and the region A2 in which the positive electrode active material portion 520 cannot be formed may be reduced. For example, the width of the positive electrode 500 in the height direction compared to the width of the negative electrode 400 in the height direction may be increased to 98% or more.

If the region A1 of FIGS. 48 and 49 is compared with the region B1 of FIGS. 56 and 57, in the electrode assembly 300 according to this embodiment, the length of the positive electrode active material portion may be increased as much as the loading reduction portion 500D, and thus a higher energy density may be provided in a limited space compared to the electrode assembly 600 according to the comparative example.

Another aspect of the present disclosure relates to a cylindrical battery, which includes a jelly-roll type electrode assembly having a structure in which a positive electrode, a negative electrode, and a separator interposed between the positive electrode and the negative electrode are wound in one direction; a cylindrical battery housing in which the electrode assembly is accommodated; and a battery cap serving as a sealing body disposed at the upper portion of the battery housing to seal the battery housing. Here, the positive electrode is prepared according to the present disclosure and includes single particle-based active material particles having an average particle diameter $D_{50}$ of 5 μm or less as the positive electrode active material. The cylindrical battery may further include an electrolyte, and the above description may be referred to for the electrolyte.

The electrode assembly may have a stack type, stack/folding type, or jelly-roll type structure as described above. In one specific embodiment of the present disclosure, in the electrode assembly, the positive electrode may have a loading reduction portion as described above.

In the case of a conventional cylindrical battery, current is concentrated on a strip-shaped electrode tab, resulting in great resistance, high heat generation, and poor current collection efficiency.

As the demand for high-capacity batteries increases with the recent development of electric vehicle technology, the development of bulky large-sized cylindrical batteries is required. In the case of a conventional small cylindrical battery generally used in the art, that is, a cylindrical battery having a form factor of 1865 or 2170, resistance or heat generation does not seriously affect battery performance because the capacity is small. However, when the specifications of the conventional small cylindrical battery are applied as they are to a large cylindrical battery, a serious problem may occur in battery safety.

As the size of the battery increases, the amount of heat and gas generated inside the battery also increases, and the temperature and pressure inside the battery rise due to such heat and gas, which may cause the battery to ignite or explode. In order to prevent this, heat and gas inside the battery must be properly discharged to the outside, and for this, the cross-sectional area of the battery, which serves as a passage for discharging heat to the outside of the battery, must increase to match the increase in volume. However, in general, since the increase in cross-sectional area does not reach the increase in volume, as the size of the battery increases, the amount of heat generated inside the battery increases, resulting in problems such as increased risk of explosion and reduced output. In addition, when rapid charging is performed at a high voltage, a large amount of heat is generated around the electrode tab for a short period of time, and the battery may ignite. Accordingly, the present disclosure proposes a cylindrical battery having a high safety while having a large volume to implement a high capacity.

In addition, since a high loading electrode to which the positive electrode active material in the form of single particle or pseudo-single particle is applied may be applied to the cylindrical battery, the initial resistance characteristics and charge/discharge efficiency of the cylindrical battery may be improved.

The cylindrical battery according to the present disclosure significantly reduces gas generation compared to the prior art by applying a positive electrode active material in the form of single particle or pseudo-single particle. Accordingly, even a large cylindrical battery having a form factor ratio of 0.4 or more may exhibit excellent safety.

The cylindrical battery according to the present disclosure may preferably be a battery having a tab-less structure that does not include an electrode tab, but is not limited thereto.

In the battery of the tab-less structure, for example, each of the positive electrode and the negative electrode includes an uncoated portion on which an active material layer is not formed, and may have a structure in which the positive electrode uncoated portion and the negative electrode uncoated portion are respectively located at the upper and lower ends of the electrode assembly, a collector plate is coupled to the positive electrode uncoated portion and the negative electrode uncoated portion, and the collector plate is connected to an electrode terminal.

When the cylindrical battery is formed in a tab-less structure as described above, since the concentration of current is less than that of the conventional battery equipped with an electrode tab, heat generation inside the battery may be effectively reduced, thereby improving the thermal safety of the battery.

Hereinafter, the present disclosure will be described in more detail through specific examples.

Example 1

A single particle type positive electrode active material $Li[Ni_{0.9}Co_{0.06}Mn_{0.03}Al_{0.01}]O_2$ having a unimodal particle size distribution with an average particle diameter $D_{50}$ of 3 μm: carbon nanotube: PVDF binder were mixed in N-methyl pyrrolidone at a weight ratio of 97.8:0.6:1.6 to prepare a positive electrode slurry. The positive electrode slurry was coated on one surface of an aluminum current collector sheet, dried at 120° C., and then rolled to prepare a positive electrode.

A negative electrode active material (graphite:SiO=95:5 mixture by weight):conductive material (super C), styrene-butadiene rubber (SBR):carboxymethyl cellulose (CMC) were mixed in water at a weight ratio of 96:2:1.5:0.5 to prepare a negative electrode slurry. The negative electrode slurry was coated on one surface of a copper current collector sheet, dried at 150° C., and then rolled to prepare a negative electrode.

A separator was interposed between the positive electrode and the negative electrode prepared as above, stacked in the order of separator/positive electrode/separator/negative electrode, and then wound to prepare a jelly-roll type electrode assembly. The electrode assembly prepared as described above was inserted into a cylindrical battery can, and an electrolyte was injected thereto to prepare a 4680 cell.

Comparative Example 1

A 4680 cell was manufactured in the same manner as in Example 1, except that secondary particle type $Li[Ni_{0.9}Co_{0.05}Mn_{0.04}Al_{0.01}]O_2$ having a bimodal particle size distribution with a large particle average diameter $D_{50}$ of 9 μm and a small particle average diameter $D_{50}$ of 4 μm was used as the positive electrode active material.

Experimental Example 1

A hot box test was performed on the 4680 cells manufactured by Example 1 and Comparative Example 1.

Specifically, each of the 4680 cells manufactured by Example 1 and Comparative Example 1 was placed in a hot box chamber at room temperature, heated to 130° C. at a heating rate of 5° C./min, and maintained for 30 minutes to perform a hot box evaluation, and the temperature change of the battery over time was measured. For accurate evaluation, the hot box evaluation was performed twice on the cell of Example 1. The measurement results are shown in FIGS. 45a and 45b.

Figure 45A:
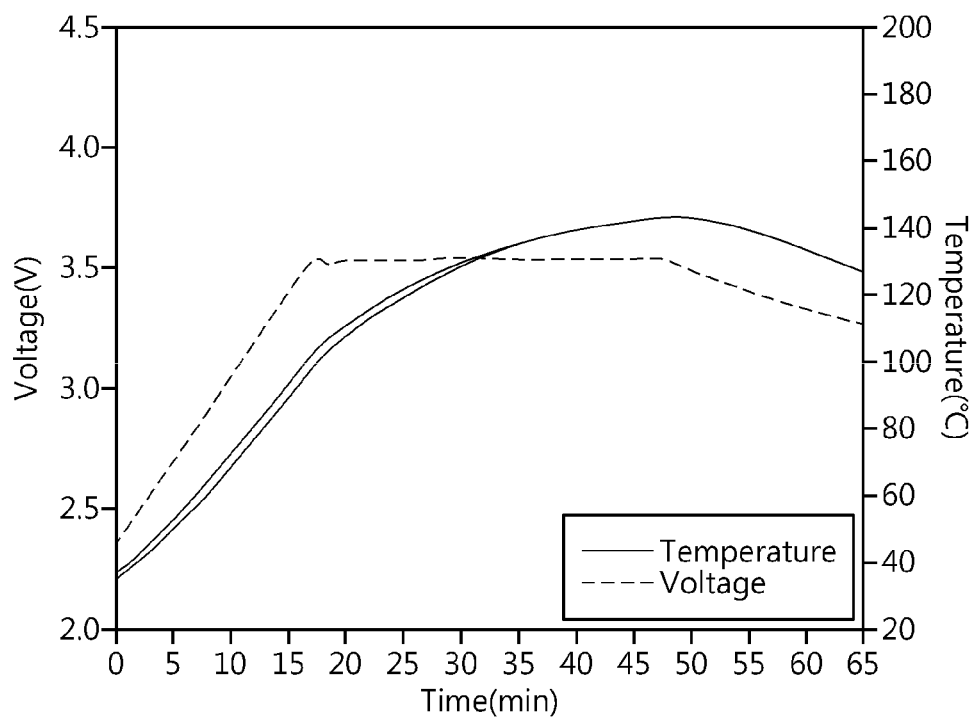
FIG. 45a is a graph showing a hot box test result of a 4680 cell manufactured by Example 1 of the present disclosure.
Figure 45B:
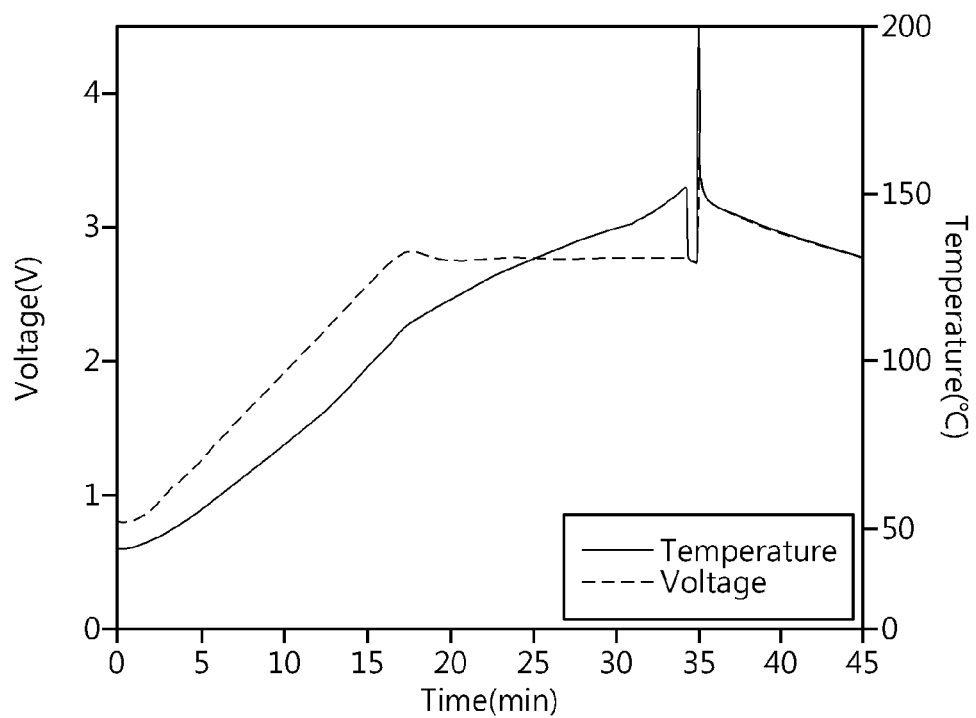
FIG. 45b is a graph showing a hot box test result of a 4680 cell manufactured by Comparative Example 1.

FIG. 45a is a graph showing a hot box test result of the 4680 cell manufactured by Example 1 of the present disclosure, and FIG. 45b is a graph showing a hot box test result of the 4680 cell manufactured by Comparative Example 1.

Through FIGS. 45a and 45b, it may be found that in the case of the lithium secondary battery of Example 1 using the single particle positive electrode active material, the voltage and temperature of the battery were maintained stably until 65 minutes, whereas in the lithium secondary battery of Comparative Example 1, the temperature of the battery rapidly increased after 35 minutes.

Example 2-1

Figure 44A:
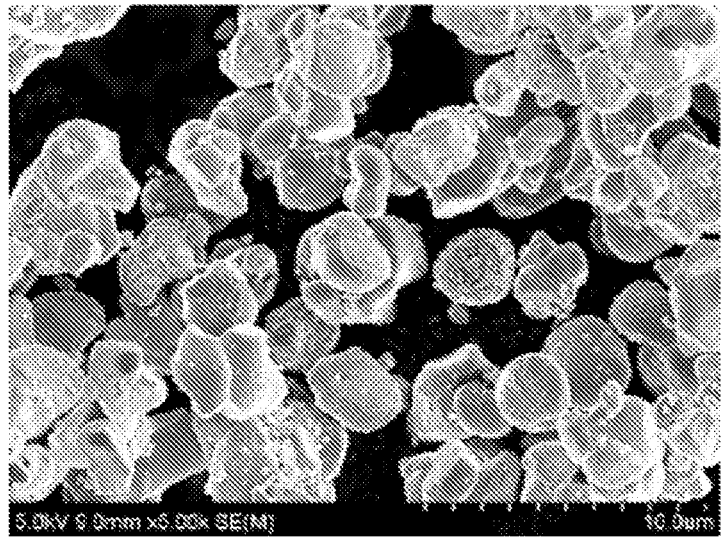
FIG. 44a is a SEM picture showing a positive electrode active material used in Example 2-1 of the present disclosure.

A positive electrode active material (composition: $Li[Ni_{0.9}Co_{0.06}Mn_{0.03}Al_{0.01}]O_2$), which has a unimodal particle size distribution where $D_{min}$=1.78 μm, $D_{50}$=4.23 μm, and $D_{max}$=13.1 μm and in which single particles and pseudo-single particles were mixed was prepared. FIG. 44a shows a SEM picture of the positive electrode active material used in Example 2-1.

The positive electrode active material:carbon nanotube:PVDF binder were mixed in N-methyl pyrrolidone at a weight ratio of 97.8:0.6:1.6 to prepare a positive electrode slurry. The positive electrode slurry was coated on one surface of an aluminum current collector sheet, dried at 120° C., and then rolled to prepare a positive electrode.

A negative electrode active material (graphite:SiO=95:5 mixture by weight) conductive material (super C):styrene-butadiene rubber (SBR):carboxymethyl cellulose (CMC) were mixed in water at a weight ratio of 96:2:1.5:0.5 to prepare a negative electrode slurry. The negative electrode slurry was coated on one surface of a copper current collector sheet, dried at 150° C., and then rolled to prepare a negative electrode.

A separator was interposed between the positive electrode and the negative electrode prepared as above, stacked in the order of separator/positive electrode/separator/negative electrode, and then wound to prepare a jelly-roll type electrode assembly. The electrode assembly prepared as described above was inserted into a battery can, and an electrolyte was injected thereto to prepare a 4680 cell.

Example 2-2

Figure 44B:
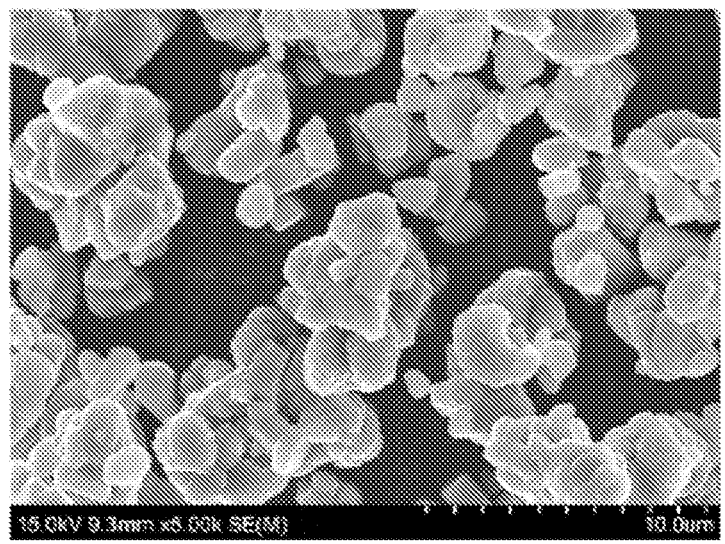
FIG. 44b is a SEM picture showing a positive electrode active material used in Example 2-2 of the present disclosure.

A 4680 cell was manufactured in the same manner as in Example 2-1, except that a positive electrode active material (composition: $Li[Ni_{0.9}Co_{0.06}Mn_{0.03}Al_{0.01}]O_2$), which has a unimodal particle size distribution where $D_{min}$=1.38 μm, $D_{50}$=4.69 μm, and $D_{max}$=18.5 m and in which single particles and pseudo-single particles were mixed was used as the positive electrode active material. FIG. 44b shows a SEM picture of the positive electrode active material used in Example 2-2.

Comparative Example 2-1

A 4680 cell was manufactured in the same manner as in Example 2-1, except that a secondary particle type positive electrode active material (composition: $Li[Ni_{0.9}Co_{0.05}Mn_{0.04}Al_{0.01}]O_2$) having a bimodal particle size distribution with a large particle average diameter $D_{50}$ of 9 μm and a small particle average diameter $D_{50}$ of 4 μm was used as the positive electrode active material.

Comparative Example 2-2

A 4680 cell was manufactured in the same manner as in Example 2-1, except that a positive electrode active material (composition: $Li[Ni_{0.9}Co_{0.06}Mn_{0.03}Al_{0.01}]O_2$), which has a unimodal particle size distribution where $D_{min}$=0.892 μm, $D_{50}$=3.02 μm, and $D_{max}$=11 μm and in which single particles and pseudo-single particles were mixed was used as the positive electrode active material.

Figure 44C:
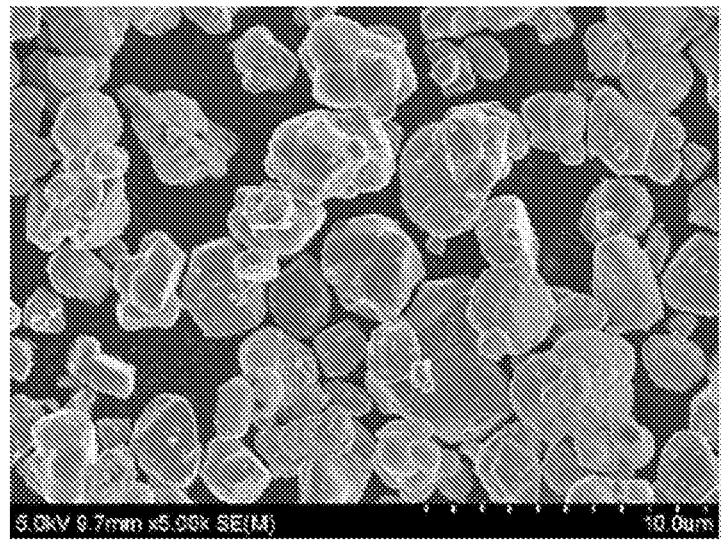
FIG. 44c is a SEM picture showing a positive electrode active material used in Comparative Example 2-2 of the present disclosure.

FIG. 44c shows a SEM picture of the positive electrode active material used in Comparative Example 2-2.

Experimental Example 2-1

A hot box test was performed on the 4680 cells manufactured by Examples 2-1 and 2-2 and Comparative Examples 2-1 and 2-2.

Specifically, each of the 4680 cells manufactured by Example 2-1 and Comparative Example 2-1 was placed in a hot box chamber at room temperature, heated up to 130° C. at a heating rate of 5° C./min, and maintained for 30 minutes, and then the temperature change of the cell was measured. A case in which thermal runaway and ignition did not occur during the test was marked as Pass, and a case in which thermal runaway and/or ignition occurred was marked as Fail. Also, for the accuracy of the test, the test was performed more than twice for the cells of Examples 2-1 and 2-2.

Figure 45C:
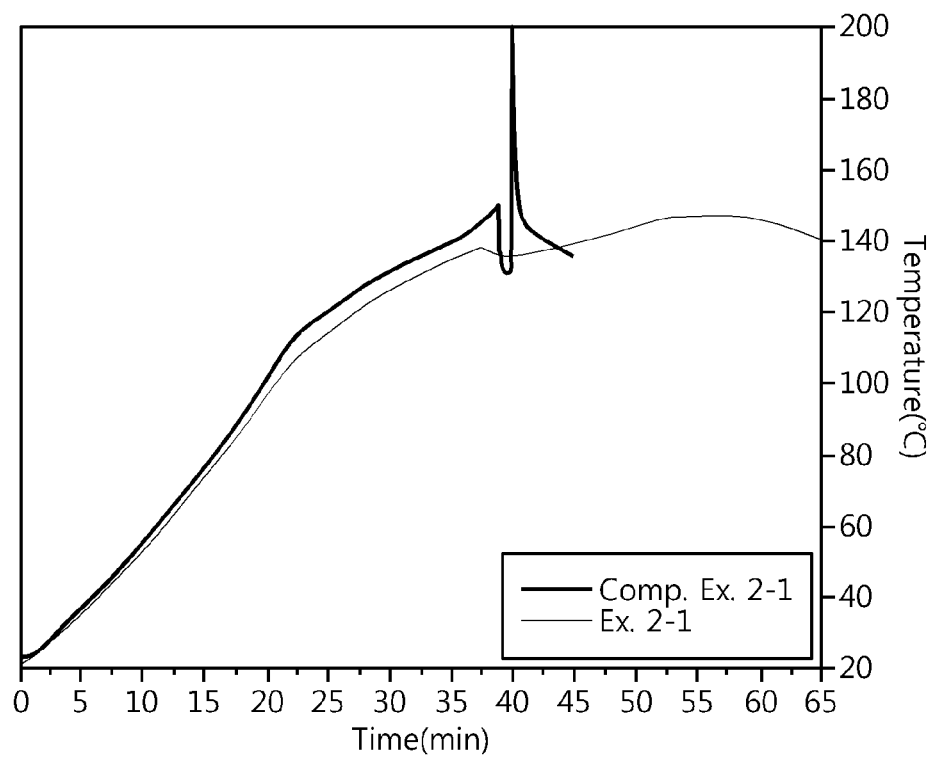
FIG. 45c is a graph showing hot box test results of Sample 1 of Example 2-1 of the present disclosure and a 4680 cell manufactured by Comparative Example 2-1.

Measurement results are shown in Table 1 below and FIGS. 45c and 45d. FIG. 45c is a graph showing hot box test results of Sample 1 of Example 2-1 and the 4680 cell manufactured by Comparative Example 2-1, and FIG. 45d is a graph showing hot box test results of Samples 2 and 3 of Example 2-1, Samples 1 and 2 of Example 2-2, and the 4680 cell manufactured by Comparative Example 2-2.

TABLE 1

|  | Sample # | Venting time (min) | Maximum temperature (° C.) | Hot box test result |
|---|---|---|---|---|
| Example 2-1 | 1 | 16 | 139 | Pass |
|  | 2 | 20.9 | 141 | Pass |
|  | 3 | 23.7 | 137 | Pass |
| Example 2-2 | 1 | 16.0 | 148 | Pass |
|  | 2 | 15.8 | 147 | Pass |
| Comparative Example 2-1 | 1 | 17 | not measurable | Fail |
| Comparative Example 2-2 | 1 | 16.2 | not measurable | Fail |

Figure 45D:
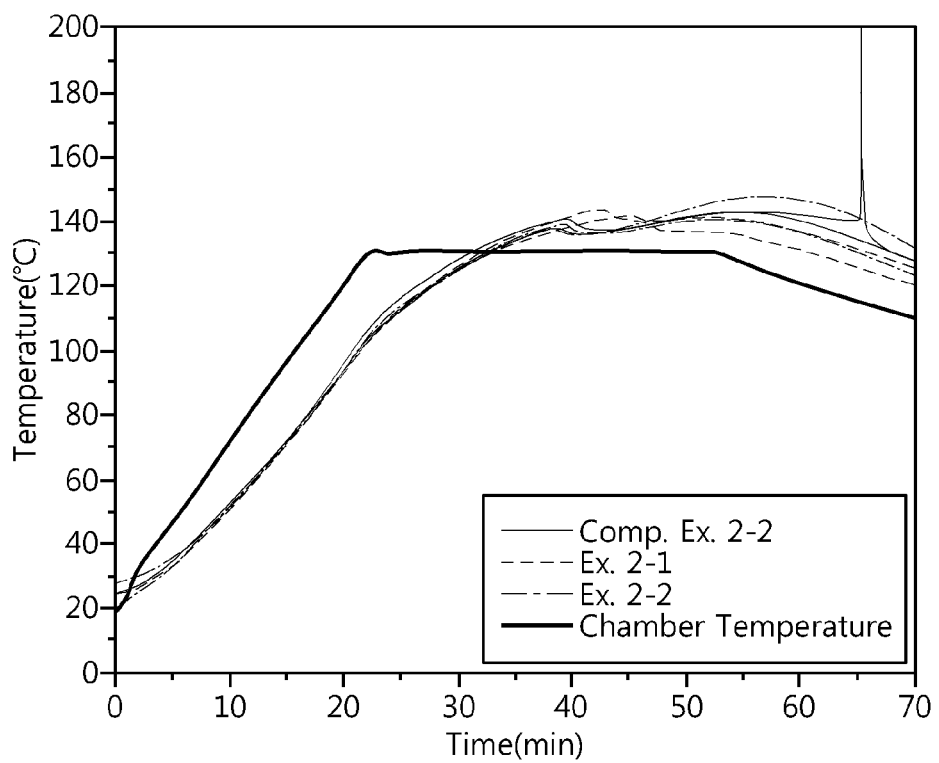
FIG. 45d is a graph showing hot box test results of Samples 2 and 3 of Example 2-1 of the present disclosure, Samples 1 and 2 of Example 2-2, and a 4680 cell manufactured by Comparative Example 2-2.

Referring to Table 1 and FIGS. 45c and 45d, it may be found that, in the case of the 4680 cell of Example 2-1 to which the positive electrode active material in the form of a single particle/pseudo-single particle with $D_{min}$ of 1.0 μm or more was applied, the voltage and temperature of the battery were maintained stably until 65 minutes, while in the case of the 4680 cells of Comparative Example 2-1 in which a secondary particle was applied as the positive electrode active material and Comparative Example 2-2 in which a positive electrode active material in the form of a single particle/pseudo-single particle with $D_{min}$ of less than 1.0 μm was applied, the battery temperature of the 4680 cell rapidly increased.

Experimental Example 2-2

Figure 46A:
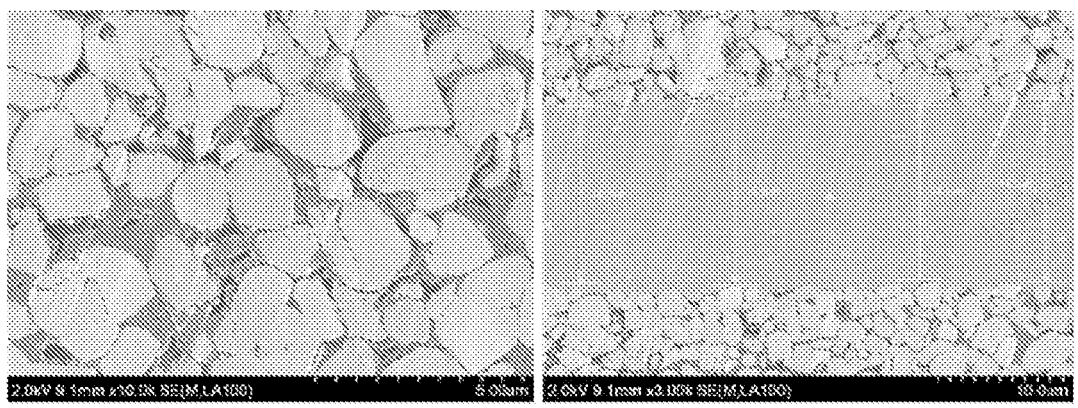
FIG. 46a is a cross-sectional SEM picture of the positive electrode manufactured in Example 2-1 of the present disclosure.

After rolling the positive electrodes manufactured in Example 2-1 and Comparative Example 2-1, in order to check the degree of breakage of the positive electrode active material particles, the positive electrode was cut with an ion milling device and the cross section was photographed with a SEM. FIG. 46*a* shows a cross-sectional SEM picture of the positive electrode manufactured in Example 2-1, and FIG. 46*b* shows a cross-sectional SEM picture of the positive electrode manufactured in Comparative Example 2-1.

Figure 46B:
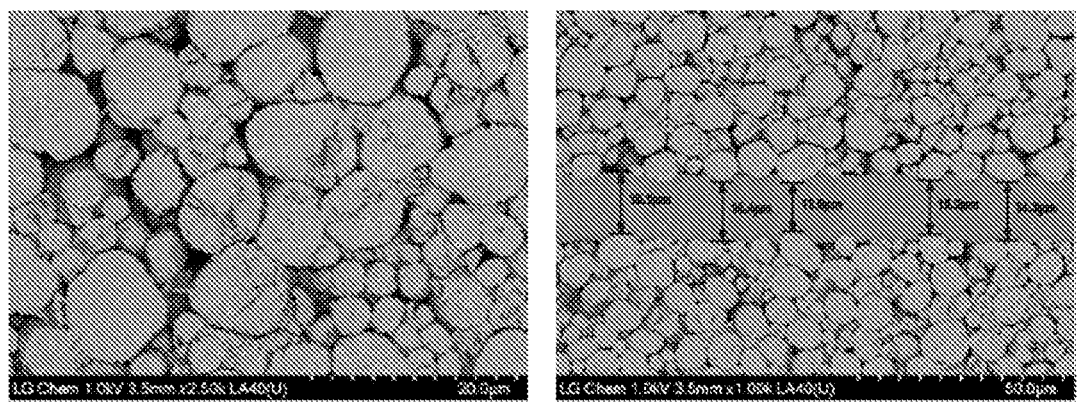
FIG. 46b is a cross-sectional SEM picture of the positive electrode manufactured in Comparative Example 2-1.

Through FIGS. 46*a* and 46*b*, the positive electrode of Example 2-1 has almost no particle breakage of the positive electrode active material even after rolling, whereas in the positive electrode of Comparative Example 2-2 using secondary particles, a number of cracks were observed in the particles of the positive electrode active material after rolling.

Example 3-1

A positive electrode active material powder (composition: Li[Ni$_{0.9}$Co$_{0.06}$Mn$_{0.03}$Al$_{0.01}$]O$_2$), which has a unimodal particle size distribution where $D_{min}$=1.78 μm, $D_{50}$=4.23 μm, $D_{max}$=13.1 μm and in which single particles and pseudo-single particles were mixed, flake graphite (SFG6L), conductive material (multi-wall carbon nanotube), and PVDF binder were mixed in N-methyl pyrrolidone at a weight ratio of 96.3:1.5:0.4: 1.8 to prepare a positive electrode slurry. The positive electrode slurry was coated on one surface of an aluminum current collector sheet, dried, and rolled at a linear pressure of 3.0 ton/cm to prepare a positive electrode. The porosity of the positive electrode active material layer of the positive electrode prepared as described above was measured, and the porosity was measured to be 17.5%.

Example 3-2

A positive electrode was manufactured in the same manner as in Example 3-1, except that the positive electrode active material, flake graphite, conductive material, and binder were mixed in a weight ratio of 97.2:0.6:0.4: 1.8, and the porosity of the positive electrode active material layer was measured. The porosity of the positive electrode active material layer was measured to be 19%.

Example 3-3

A positive electrode was manufactured in the same manner as in Example 3-1, except that the positive electrode active material, flake graphite, conductive material, and binder were mixed in a weight ratio of 97.4:0.4: 0.4:1.8, and the porosity of the positive electrode active material layer was measured. The porosity of the positive electrode active material layer was measured to be 20%.

Example 3-4

A positive electrode was manufactured in the same manner as in Example 3-1, except that the positive electrode active material, flake graphite, conductive material, and binder were mixed in a weight ratio of 97.6:0.2: 0.4:1.8, and the porosity of the positive electrode active material layer was measured. The porosity of the positive electrode active material layer was measured to be 21%.

Comparative Example 3-1

A positive electrode was prepared in the same manner as in Example 3-1, except that the positive electrode slurry was prepared by mixing the positive electrode active material, conductive material, and binder in N-methyl pyrrolidone at a weight ratio of 97.8:0.4: 1.8 without adding flake graphite, and the porosity of the positive electrode active material layer was measured. The porosity of the positive electrode active material layer was measured to be 24%.

Comparative Example 3-2

A positive electrode was manufactured in the same manner as in Example 3-1 except that the positive electrode active material, conductive material, and binder were mixed in N-methyl pyrrolidone at a weight ratio of 97.8:0.4: 1.8 to prepare a positive electrode slurry, and rolled at a line pressure of 2.0 ton/cm without adding flake graphite, and the porosity of the positive electrode active material layer was measured. The porosity of the positive electrode active material layer was measured to be 30%.

Experimental Example 3-1—Measurement of Charge/Discharge Capacity and Charge/Discharge Efficiency Coin half-cells including the positive electrodes according to Examples 3-1 to 3-4 and Comparative Examples 3-1 and 3-2 were manufactured, charged up to 4.25V under a 0.2 C current condition, and then discharged to 2.5V under a 0.2 C current condition, and the charge capacity (mAh/g) and discharge capacity (mAh/g) of each coin half-cell were measured. The measurement results are shown in Table 2 below.

TABLE 2

| | Add amount of flake graphite (wt %) | Porosity (%) | Charging capacity (mAh/g) | Discharging capacity (mAh/g) | Efficiency (%) |
|---|---|---|---|---|---|
| Example 3-1 | 1.5 | 17.5 | 230.3 | 209.3 | 90.9 |
| Example 3-2 | 0.6 | 19 | 229.4 | 206.9 | 90.2 |
| Example 3-3 | 0.4 | 20 | 230.4 | 207.3 | 90.0 |
| Example 3-4 | 0.2 | 21 | 229.1 | 205.5 | 89.7 |
| Comparative Example 3-1 | 0 | 24 | 229.1 | 204.2 | 89.1 |
| Comparative Example 3-2 | 0 | 30 | 225.4 | 199.7 | 88.6 |

Through Table 2, it may be found that Examples 3-1 to 3-4 using a positive electrode to which flake graphite is added shows lower porosity and excellent capacity characteristics compared to Comparative Examples 3-1 to 3-2.

Experimental Example 3-2—Check Resistance Characteristics

While charging the coin half-cells including the positive electrodes according to Example 3-3, Comparative Example 3-1, and Comparative Example 3-2 to 4.2V, resistance characteristics according to SOC were measured. The experimental results are shown in FIG. 47*a*.

Figure 47A:
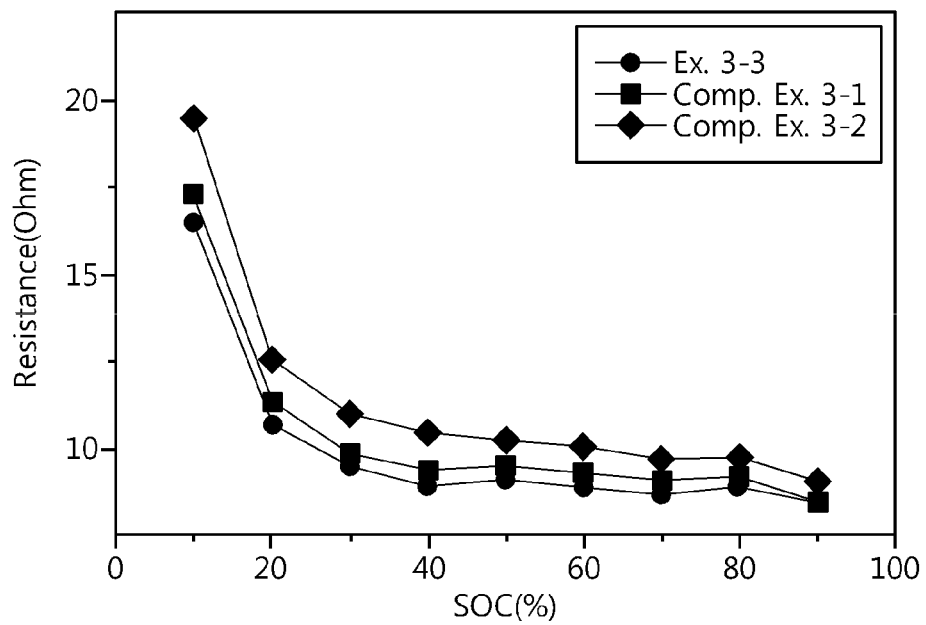
FIG. 47a is a graph showing the results of measuring resistance characteristics according to SOC while charging a coin half-cell including a positive electrode according to Example 3-3 of the present disclosure, Comparative Example 3-1 and Comparative Example 3-2 to 4.2V.

Referring to FIG. 47a, it may be found that the resistance value of Example 3-3, in which flake graphite is added to the positive electrode active material layer, is lower than those of Comparative Example 3-1 and Comparative Example 3-2, which do not include flake graphite, based on SOC10%. This shows that when flake graphite is added to the positive electrode active material layer, resistance characteristics at low SOC are improved.

Experimental Example 3-3—Measurement of High-Temperature Life Characteristics and Resistance Increase Rate A separator was interposed between the positive electrode and the negative electrode according to Example 3-1, Example 3-3, and Comparative Example 3-1, and stacked in the order of separator/positive electrode/separator/negative electrode, and then wound to prepare a jelly-roll type electrode assembly. The electrode assembly prepared as described above was inserted into a cylindrical battery can, and then an electrolyte was injected thereto to manufacture a 4680 cell.

At this time, a negative electrode active material (graphite:SiO=95:5 mixture by weight):conductive material (super C):styrene-butadiene rubber (SBR):carboxymethyl cellulose (CMC) were mixed in water at a weight ratio of 96:2: 1.5:0.5 to prepare a negative electrode slurry, and then the negative electrode slurry was coated on to one surface of a copper current collector sheet, dried at 150° C., and then rolled to prepare a negative electrode.

Based on one cycle in which the 4680 cell prepared as described above was charged to 4.2V at 40° C. at 0.5 C and then discharged to 2.5V at 0.5 C, 50 cycles of charge and discharge were performed, and then capacity retention and resistance increase rate (DCIR increase) were measured. The measurement results are shown in FIG. 47b.

Figure 47B:
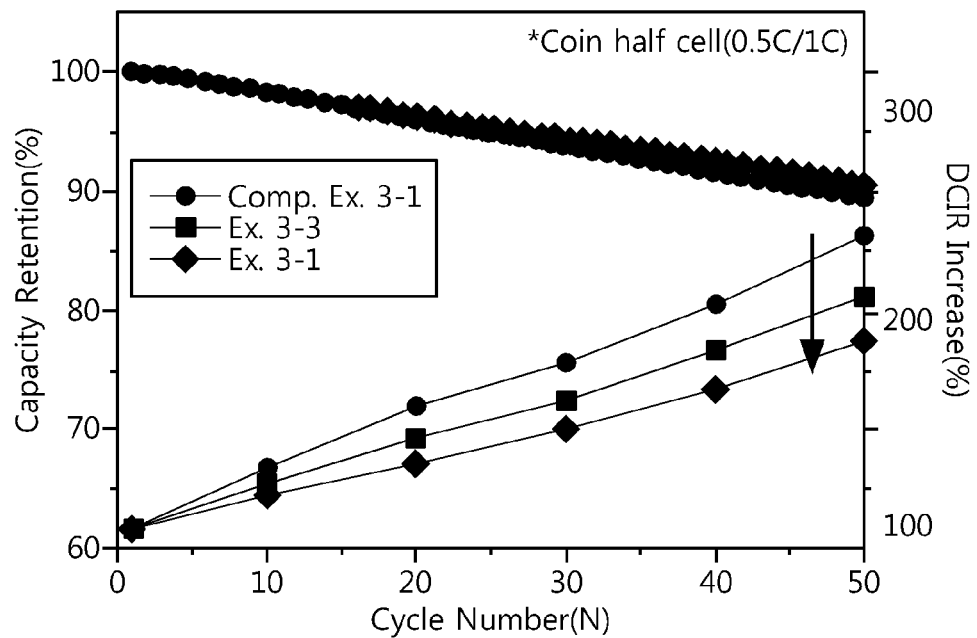
FIG. 47b is a graph showing the measurement result of capacity retention and resistance increase (DCIR increase) obtained through a charge/discharge cycle experiment for a 4680 cell according to Example 3-1 and Example 3-3 of the present disclosure, and Comparative Example 3-1.

Referring to FIG. 47b, in the case of the secondary batteries of Examples 3-1 and 3-3, it is shown that the change in capacity retention according to the number of cycles is smaller than that of the secondary battery of Comparative Example 3-1, and the change in resistance increase rate according to the number of cycles is also small.

Finally, the effect of the separation distance of the end in the width direction of the separator and the datum line on the impregnability of the electrolyte was evaluated.
<Design Conditions of an Electrode>
A positive electrode and a negative electrode were manufactured to have the electrode structure shown in FIG. 17a. An aluminum thin film with a thickness of 15 m was used as a positive electrode current collector, and a copper thin film with a thickness of 10 μm was used as a negative electrode current collector.

The current collector of the positive electrode has a length of 4000 mm along the winding direction and a width of 75 mm along the winding axis direction. The current collector of the negative electrode has a length of 4000 mm along the winding direction and a width of 80 mm along the winding axis direction.

In the positive electrode and negative electrode, the length of the core-side uncoated portion B1 is 350 mm, the length of the intermediate uncoated portion B2 is 3500 mm, and the length of the outer circumference uncoated portion B3 is 150 mm.

In the positive electrode and the negative electrode, the length along the winding direction of each group is 500 mm, the height of the segment included in Group 1 is 5 mm, and the height of the segments included in Groups 2 to 7 are 6 mm identically.

In the intermediate uncoated portion B2, the widths of the segments along the winding direction are 5 mm identically, and the separation pitch of the segments is 0.5 mm.
<Preparation of a Negative Electrode>
Earthen natural graphite having an average particle diameter ($D_{50}$) of 11 μm, carbon black, carboxymethyl cellulose (CMC) and styrene-butadiene rubber (SBR) were mixed with water in a weight ratio of 94:1.5:2:2.5 to prepare a slurry for a negative electrode active material layer with a concentration of 50 wt % of the remaining components except for water. The prepared slurry was applied to a region of the copper thin film corresponding to the coated portion using a slot die at a running speed of 40 m/min. The width in the winding axis direction of the coated portion was 70 mm and the width in the winding axis direction of the uncoated portion was 10 mm. The loading amount of the negative electrode active material was 16 mg/cm$^2$ based on the electrode area. The copper thin film coated with the slurry for a negative electrode active material layer was dried by passing through a hot air oven with a length of 60 m. The temperature of the oven was controlled to maintain 130° C. The dried electrode was roll-pressed to obtain a negative electrode coated with a negative electrode active material layer. Finally, the uncoated portion of the negative electrode was laser-notched to form segments with the above conditions, and the notching depth was adjusted such that the bottom of the notching valley substantially corresponds to the datum line DL (FIG. 17b).
<Preparation of a Positive Electrode>
Li(Ni$_{0.6}$Mn$_{0.2}$Co$_{0.2}$)O$_2$ (NCM-622) as a positive electrode active material, carbon black as a conductive material, and polyvinylidene fluoride (PVdF) as a binder were added to water serving as a dispersion medium in a weight ratio of 96:2:2 to prepare a slurry for a positive electrode active material. The prepared slurry was coated on an aluminum thin film, and then dried and rolled under the same conditions as the negative electrode to prepare a positive electrode. The width in the winding axis direction of the coated portion was 65 mm and the width in the winding axis direction of the uncoated portion was 10 mm. The positive electrode active material layer was formed such that the NP ratio of the battery was 1.18 (118%, about 27.7 cm$^2$) in consideration of the theoretical discharge capacity of the NMC 622. The uncoated portion of the positive electrode was laser-notched to form segments with the above conditions, and the notching depth was adjusted such that the bottom of the notching valley substantially corresponds to the datum line DL (FIG. 17b).
<Preparation of a Separator>
After adding about 5 weight % of polyvinylidene fluoride-hexafluoropropylene copolymer (PVdF-HFP) to tetrahydrofuran (THF), it was dissolved at a temperature of 50° C. for about 12 hours or more to prepare a polymer solution. BaTiO$_3$ powder having a particle diameter of about 400 nm was added and dispersed to this polymer solution at a total solid content of 20 weight % to prepare a mixed solution (BaTiO$_3$/PVdF-HFP=80:20 (weight ratio)). The prepared mixed solution was coated on both surfaces of a polypropylene porous substrate using the doctor blade method. After coating, the THF was dried to obtain a final organic/inorganic composite porous separator. The final separator had a thickness of about 30 m. As a result of measurement with a porosimeter, the pore size and porosity of the final organic/inorganic composite porous film were 0.4 μm and 60%, respectively.

<Preparation of an Electrode Assembly>

The separator, the negative electrode, the separator, and the positive electrode were laminated in order and wound to prepare a jelly-roll type electrode assembly.

In Example 4-1, the winding condition was adjusted such that the end of the separator in the width direction was located at 30% (1.5 mm) of the height of the minimum bending segment (Group 1) with respect to the datum line in the outer direction of the electrode assembly.

In Example 4-2, the winding condition was adjusted such that the end of the separator in the width direction was located at 10% (0.5 mm) of the height of the minimum bending segment (Group 1) with respect to the datum line in the outer direction of the electrode assembly.

In Comparative Example 4-1, the winding condition was adjusted such that the end of the separator in the width direction was located at 50% of the height of the minimum bending segment (Group 1) with respect to the datum line in the outer direction of the electrode assembly.

<Preparation of a 4680 Cell>

The segments of Groups 1 to 7 exposed on the upper and lower portions of the electrode assembly of Example 4-1 were bent toward the core, and then the positive and negative current collector were welded to the upper and lower curved surfaces, respectively. Then, a cylindrical battery shown in FIG. 35 was manufactured. That is, the electrode assembly to which the positive electrode current collector and the negative electrode current collector were welded was inserted into a battery housing having external terminals installed in advance, the positive electrode current collector and the external terminal were welded, and the edge of the negative electrode current collector was welded to the beading portion. Then, the battery housing was introduced into the chamber of the electrolyte injection device, and the battery housing was erected so that the opening of the battery housing faces in a direction opposite to gravity. Next, $LiPF_6$ was dissolved to a concentration of 1.0M in an organic solvent in which ethylene carbonate (EC), dimethyl carbonate (DMC) and diethyl carbonate (DEC) were mixed in a composition of 1:2:1 (volume ratio) to prepare a non-aqueous electrolyte. Then, after the electrolyte was injected through the opening of the battery housing, the pressure of the chamber was risen to 800 kPa for 20 seconds, maintained for 150 seconds, and lowered again to −90 kPa for 20 seconds, and then the substantial vacuum condition was maintained for 20 seconds. After the electrolyte impregnation process was completed, the opening of the battery housing was sealed with the sealing body a gasket to complete the manufacture of the cylindrical cell.

The 4680 cells of Example 4-2 and Comparative Example 4-1 were also manufactured by applying substantially the same manufacturing process as above.

Next, the 4680 cells of Examples 4-1, 4-2 and Comparative Example 4-1 were disassembled to obtain positive and negative electrodes, respectively. Afterwards, samples with a size of 10 cm² were obtained by cutting out the negative electrode and the positive electrode at a total of 9 points, respectively. When the electrodes are spread out, among nine samples, three samples were taken in the region adjacent to the core of the electrode assembly, three samples were taken in the region adjacent to the outer circumference of the electrode assembly, and three samples were taken in the central region of the electrode based on the winding direction. In taking three samples from each sampling area, one sample was taken from the lower end, the center, and the upper end of the active material layer along the winding axis direction, respectively.

The electrolyte impregnation amount was determined from the difference between the weight of the control sample and the weight of the collected sample. The control samples were prepared in the same manner as the electrodes used in Examples 4-1 and 4-2 and Comparative Example 4-1, and were obtained from the positive electrodes and the negative electrodes at the same sampling areas.

The electrolyte impregnation amount of the electrode assembly was determined as the sum average value (A+B) calculated by adding the average value (A) of the electrolyte impregnation amounts for the nine samples obtained from the positive electrode and the average value of the electrolyte impregnation amounts for the nine samples obtained from the negative electrode (B).

The electrolyte impregnation amount of the electrode assembly of Example 4-1 was 60.3 mg, the electrolyte impregnation amount of the electrode assembly of Example 4-2 was 59.6 mg, and the electrolyte impregnation amount of the electrode assembly of Comparative Example 4-1 was 56.3 mg. It was found that the electrolyte impregnation amounts in Examples 4-1 and 4-2 were higher than that of Comparative Example 4-1.

In addition, the sum of the electrolyte impregnation amount of the positive electrode sample and the negative electrode sample collected in the center point of the active material layer based on the winding axis direction among the sample collection region adjacent to the core of the electrode assembly was 55.1 mg for the electrode assembly of Example 4-1, 59 mg for the electrode assembly of Example 4-2, and 47.7 mg for the electrode assembly of Comparative Example 4-1. From this, it can be found that the electrolyte impregnation amounts of Examples 4-1 and 4-2 are higher than that of Comparative Example 4-1 even near the core of the electrode assembly having a relatively low electrolyte impregnation amount.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An electrode assembly comprising a first electrode, a second electrode, and a separator interposed therebetween that are wound around a winding axis in a winding direction to define a core and an outer circumference of the electrode assembly, wherein each of the first electrode and the second electrode includes an uncoated portion not coated with an active material layer at a long side end, and a coated portion coated with the active material layer in a region other than the uncoated portion, wherein the first electrode includes an insulation layer configured to cover a boundary of the uncoated portion and the coated portion along the winding direction;

wherein the uncoated portion of the first electrode includes a plurality of segments separated from each other by cutting lines repeatedly formed along the winding direction, wherein at least a part of the plurality of segments is bent along a radial direction of the electrode assembly to define a bent surface at an end of the electrode assembly along the winding axis, and wherein, when a line parallel with the winding direction and passing through a point having a smallest height of the uncoated portion of the first electrode with respect to the coated portion of the first electrode is a datum line and the segment with the smallest height among the segments defining the bent surface is a minimum segment, a separation distance between one end of the separator and the datum line along the winding axis is 30% or less of the smallest height of the minimum segment.

2. The electrode assembly according to claim 1, wherein the position of the datum line corresponds to a bottom position of the cutting line.

3. The electrode assembly according to claim 1, wherein the separation distance between the one end of the separator and the datum line is 1.5 mm or less.

4. The electrode assembly according to claim 1, wherein the insulation layer is provided on opposite surfaces of the first electrode, and
wherein one end of the insulation layer along the winding axis is located at a same height as the one end of the separator along the winding axis or is located beyond the one end of the separator along the winding axis.

5. The electrode assembly according to claim 1, wherein one end of the second electrode along the winding axis facing the insulation layer with the separator interposed therebetween does not protrude beyond the separator along the winding axis.

6. The electrode assembly according to claim 1, wherein a first sliding portion in which a thickness of the active material layer is reduced is included in a boundary region between the coated portion and the uncoated portion of the first electrode,
wherein a second sliding portion in which a thickness of the active material layer is reduced is included in a boundary region between the coated portion and the uncoated portion of the second electrode, and
wherein the first sliding portion and the second sliding portion are located in opposite directions along the winding axis.

7. The electrode assembly according to claim 6, wherein the coated portion of the first electrode includes a loading reduction portion in which a loading amount of the active material is reduced, and
wherein the position of the loading reduction portion corresponds to the position of the second sliding portion.

8. The electrode assembly according to claim 6, wherein the insulation layer covers at least a part of the first sliding portion.

9. The electrode assembly according to claim 1, wherein the insulation layer located on a side facing the core among opposite sides of the uncoated portion of the first electrode extends to an end of the uncoated portion of the first electrode along the winding axis.

10. The electrode assembly according to claim 1, wherein the insulation layer located on a side opposite to a side facing the core among opposite sides of the uncoated portion of the first electrode extends to a bending point of the uncoated portion of the first electrode.

11. The electrode assembly according to claim 1, wherein a length of the coated portion of the first electrode along the winding axis is shorter than a length of the coated portion of the second electrode along the winding axis, and
wherein opposite ends of the coated portion of the second electrode along the winding axis are located beyond opposite ends of the coated portion of the first electrode along the winding axis.

12. The electrode assembly according to claim 1, wherein at least one of height along the winding axis and width in the winding direction of the plurality of segments increases stepwise individually or by group from the core toward the outer circumference of the electrode assembly.

13. The electrode assembly according to claim 1, wherein the plurality of segments include a plurality of segment groups from the core toward the outer circumference of the electrode assembly, and the segments belonging to a same segment group of the plurality of segment groups are identical in terms of at least one of width in the winding direction, height along the winding axis, and separation pitch in the winding direction.

14. The electrode assembly according to claim 13, wherein the segments belonging to the same segment group increase stepwise in terms of at least one of the width in the winding direction, the height along the winding axis, and the separation pitch in the winding direction from the core toward the outer circumference of the electrode assembly.

15. The electrode assembly according to claim 1, wherein the plurality of segments are bent in the radial direction and overlapped in several layers along the winding axis.

16. The electrode assembly according to claim 1, wherein the uncoated portion of the first electrode includes a core-side uncoated portion adjacent to the core of the electrode assembly, an outer circumference uncoated portion adjacent to the outer circumference of the electrode assembly, and an intermediate uncoated portion interposed between the core-side uncoated portion and the outer circumference uncoated portion,
wherein at least one of the core-side uncoated portion and the outer circumference uncoated portion has a relatively smaller height along the winding axis than the intermediate uncoated portion, and
wherein a radial length of the core-side uncoated portion is equal to or greater than a bending length of an innermost segment of the intermediate uncoated portion.

17. The electrode assembly according to claim 1, wherein a gap is provided between a bottom of the cutting line of each segment and the active material layer.

18. The electrode assembly according to claim 1, wherein the active material layer of the first electrode includes a positive electrode active material including a single particle, a pseudo-single particle, or a combination thereof,
$D_{min}$, which is a minimum particle size in a cumulative volume distribution of the positive electrode active material, is 1.0 mm or more;
in the cumulative volume distribution of the positive electrode active material, $D_{50}$, which is a particle size when a cumulative volume amount is 50%, is 5.0 um or less, and
$D_{max}$, which is a maximum particle size in the cumulative volume distribution of the positive electrode active material, is 12 mm to 17 mm.

19. The electrode assembly according to claim 18, wherein the positive electrode active material has a unimodal particle size distribution showing a single peak in a cumulative volume particle size distribution graph, and a particle size distribution (PSD) represented by the following formula is 3 or less:

$$PSD=(D_{max}-D_{min})/D_{50}.$$

20. The electrode assembly according to claim 18, wherein the single particle, the pseudo-single particle, or the combination thereof is present in an amount of 95 wt % to 100 wt % based on a total weight of the positive electrode active material present in the active material layer of the first electrode.

21. The electrode assembly according to claim 18, wherein the positive electrode active material comprises a lithium nickel-containing oxide containing 80 mol % or more of Ni based on a total number of moles of a transition metal.

22. The electrode assembly according to claim 18, wherein the active material layer of the first electrode has a porosity of 15% to 23%, and
    wherein the active material layer of the first electrode comprises flake graphite in a weight ratio of 0.05 wt % to 5 wt %.

23. The electrode assembly according to claim 18, wherein the active material layer of the first electrode further comprises carbon nanotubes.

24. The electrode assembly according to claim 18, wherein the active material layer of the second electrode comprises a silicon-containing negative electrode active material and a carbon-containing negative electrode active material, and
    wherein the silicon-containing negative electrode active material and the carbon-containing negative electrode active material are present in a weight ratio of 1:99 to 20:80.

25. A cylindrical battery, comprising:
an electrode assembly according to claim 1;
a battery housing configured to accommodate the electrode assembly through an opening formed in one side and electrically connected to the uncoated portion of the second electrode;
a terminal electrically connected to the uncoated portion of the first electrode and at least partially exposed outside the battery housing; and
a sealing body configured to cover the opening of the battery housing.

26. A battery pack, comprising a plurality of cylindrical batteries according to claim 25.

27. A vehicle, comprising the battery pack according to claim 26.

* * * * *